US006996542B1

(12) United States Patent
Landry

(10) Patent No.: US 6,996,542 B1
(45) Date of Patent: Feb. 7, 2006

(54) SYSTEM AND METHOD FOR PAYING BILLS AND OTHER OBLIGATIONS INCLUDING SELECTIVE PAYOR AND PAYEE CONTROLS

(75) Inventor: George W. Landry, Plano, TX (US)

(73) Assignee: Midwest Payment Systems, Cincinnati, OH (US)

(*) Notice: Subject to any disclaimer, the term of this patent is extended or adjusted under 35 U.S.C. 154(b) by 0 days.

(21) Appl. No.: 09/332,846

(22) Filed: Jun. 14, 1999

Related U.S. Application Data

(62) Division of application No. 08/889,606, filed on Jul. 8, 1997, now Pat. No. 5,956,700, which is a division of application No. 08/253,364, filed on Jun. 3, 1994, now Pat. No. 5,649,117.

(51) Int. Cl.
G06F 17/60 (2006.01)
(52) U.S. Cl. .............................. 705/40; 705/34; 705/39; 705/44
(58) Field of Classification Search .................. 705/34, 705/39, 40, 44, 78, 42; 380/24; 235/379
See application file for complete search history.

(56) References Cited

U.S. PATENT DOCUMENTS

| | | | | |
|---|---|---|---|---|
| 4,484,304 A | | 11/1984 | Anderson et al. | 395/329 |
| 4,799,156 A | | 1/1989 | Shavit et al. | 364/401 |
| 4,823,264 A | | 4/1989 | Deming | 364/408 |
| 5,111,395 A | | 5/1992 | Smith et al. | 395/245 |
| 5,121,945 A | | 6/1992 | Thomson | 283/58 |
| 5,220,501 A | * | 6/1993 | Lawlor et al. | 705/40 |
| 5,222,018 A | | 6/1993 | Sharpe et al. | 364/406 |
| 5,283,829 A | * | 2/1994 | Anderson | 705/40 |
| 5,383,113 A | * | 1/1995 | Kight et al. | 705/40 |
| 5,465,206 A | | 11/1995 | Hilt et al. | 395/240 |
| 5,483,445 A | * | 1/1996 | Pickering | 705/40 |
| 5,649,117 A | * | 7/1997 | Landry | 705/40 |
| 5,659,597 A | | 8/1997 | Bareis et al. | |
| 5,699,528 A | * | 12/1997 | Hogan | 705/40 |
| 5,832,460 A | * | 11/1998 | Bednar et al. | 705/27 |
| 5,855,003 A | | 12/1998 | Ladden et al. | |
| 5,930,700 A | | 7/1999 | Pepper et al. | |
| 5,956,700 A | * | 9/1999 | Landry | 705/40 |

OTHER PUBLICATIONS

Dialog reference, file 16 #04476226, Well, Compass add Wrinkles. American Banker, p6. Jun. 25, 1996.*
Dialog reference. File # 636 #01109314, Baxter Healthcare Prepares To rnasition ASAP Poprietary Format to X12 Standard, EDI News, v3, n11, pN/A, May 31, 1989.*

(Continued)

*Primary Examiner*—Raquel Alvarez
(74) *Attorney, Agent, or Firm*—Wood, Herron & Evans, LLP

(57) ABSTRACT

A system and method for paying bills without requiring interaction with the payors disclosed. The system includes a payor control interface, a communications interfacee, a bill generator, and a TCF message generator. The bill generator generates bill records from payor and payee information stored within the system for recurring bills. The bill generator may also generate bill records from the payor and payee information and from bill data messages received from payees. The generated bill records are used by the TCF message generator to generate the EFT messages for transferring funds electronically between payors and payees. Payors may alter the payment amount and date for a bill as well as reverse payment of a bill already paid. Payees are also able to alter recurring bill records or may present bill data so that bill records reflecting variable obligation amounts may be generated.

15 Claims, 74 Drawing Sheets

OTHER PUBLICATIONS

Automated Bill Payment Programs, *STOP Paying Your Bills by Mail or in Person*, Sales Flyer and Enrollment Form, date unknown.

Michigan Automated Clearing House Association, *Join the Automatic Bill Payment Plan*, Sales Flyer and Enrollment Form, Feb. 1997.

Moore, Linda K.S., *European Electronic Overview*, Consumer Bill Payments Update '92; Apr. 22, 1992.

White, George C., *Consumer Bill Payments "Front End" Overview*, Consumer Bill Payments Update '92; Apr. 22, 1992.

Manelski, Dr. Denis, *Bill & Pay Minitell*, Consumer Bill Payments Update '92; Apr. 22, 1992.

Pence, Daniel M., *TV Answer Bill Paying*, Consumer Bill Payments Update '92; Apr. 22, 1992.

Backus, John C., *ScanFone by US Order*, Consumer Bill Payments Update '92; Apr. 22, 1992.

Mile, Paul J., *Screenphone to ATM Networks Online Resources*, Consumer Bill Payments Update '92; Apr. 22, 1992.

Pope, Dennis J., *"Back End" Options to Merchants*, Consumer Bill Payments Update '92; Apr. 22, 1992.

White, George C., *Bill Payment Initiation from Retail Stores*, Consumer Bill Payments Update '92; Apr. 22, 1992.

Sgambati, Glen P., *Bill Payment Consolidation Service*, Consumer Bill Payments Update '92; Apr. 22, 1992.

Passaro, Victor, *Citibank Enhanced Telephone*, Consumer Bill Payments Update '92; Apr. 22, 1992.

White, George C., *Electronic Payments Commentary*, Consumer Bill Payments Update '92; Apr. 22, 1992.

Shipley, Chris, *"I Threw Away My Checkbook"*, PC Computing, Nov. 1990.

* cited by examiner

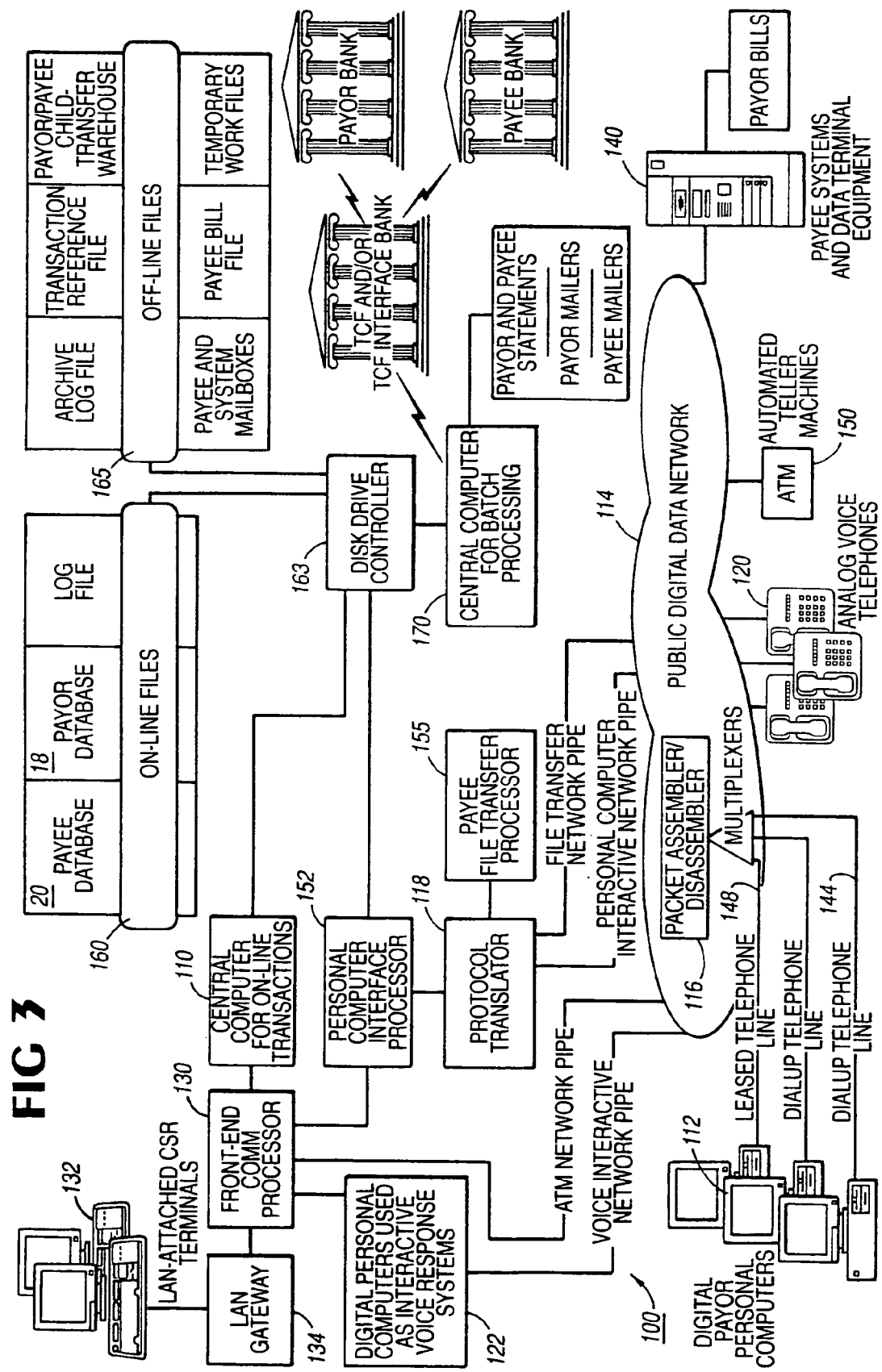

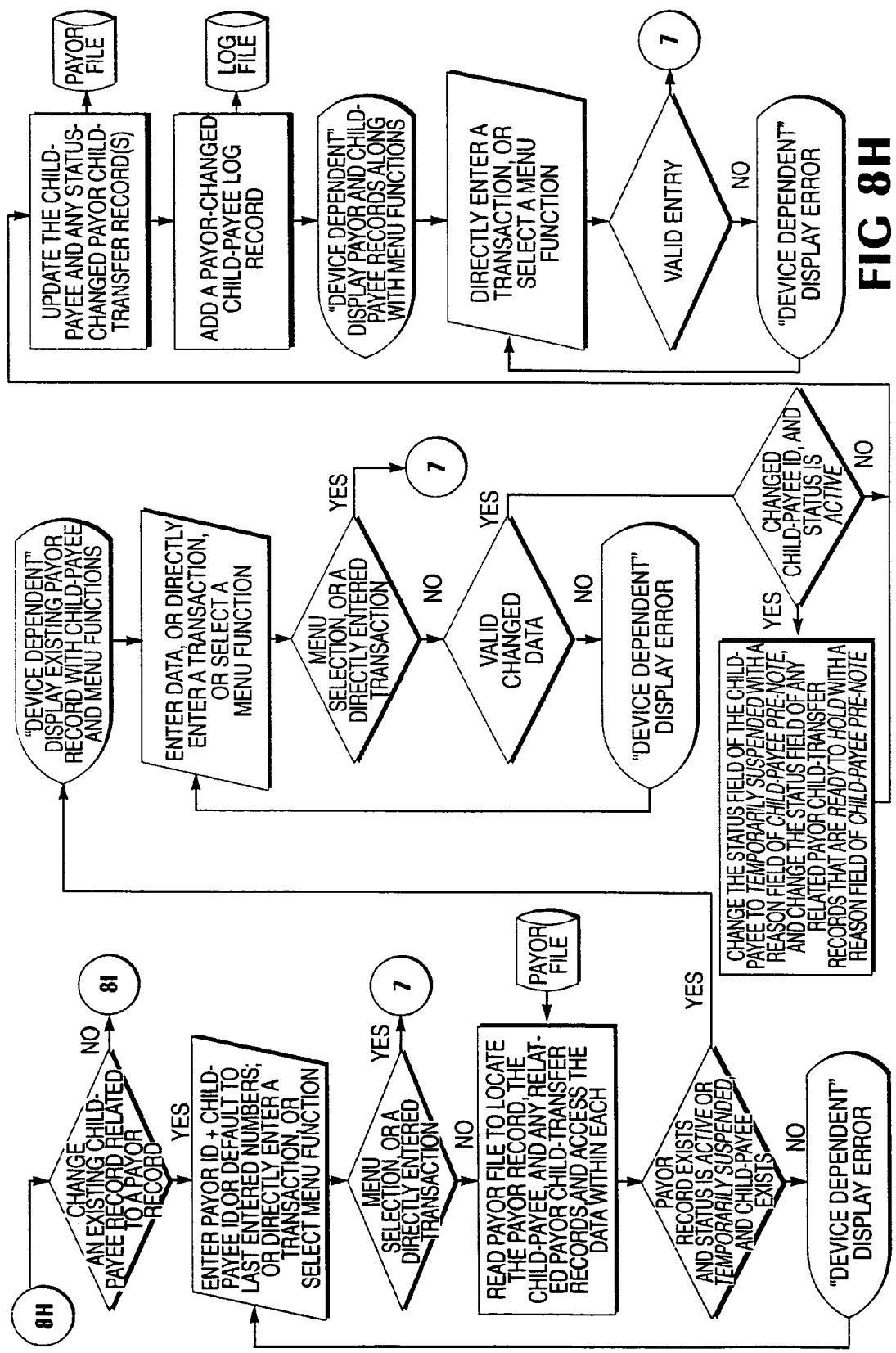

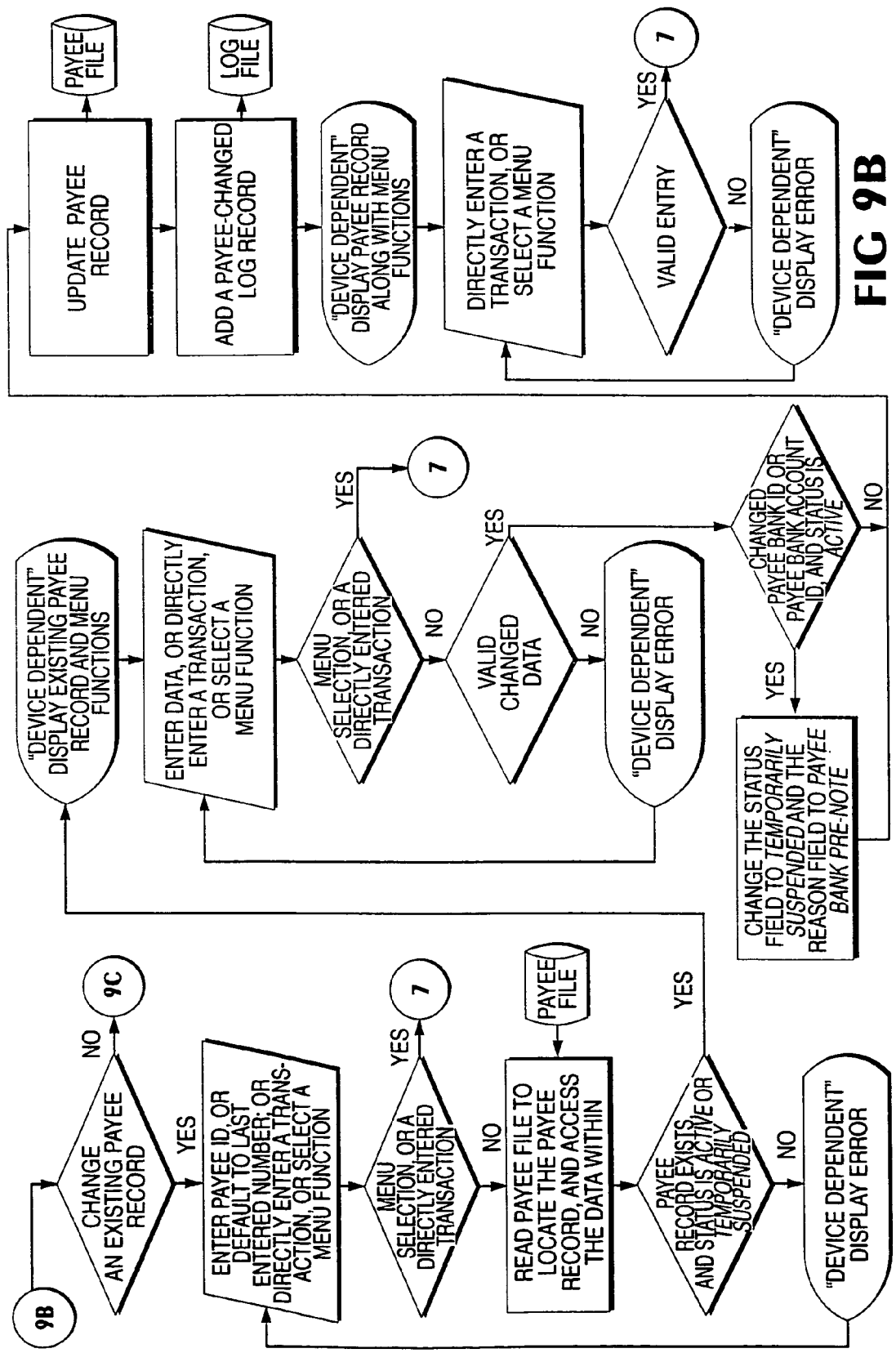

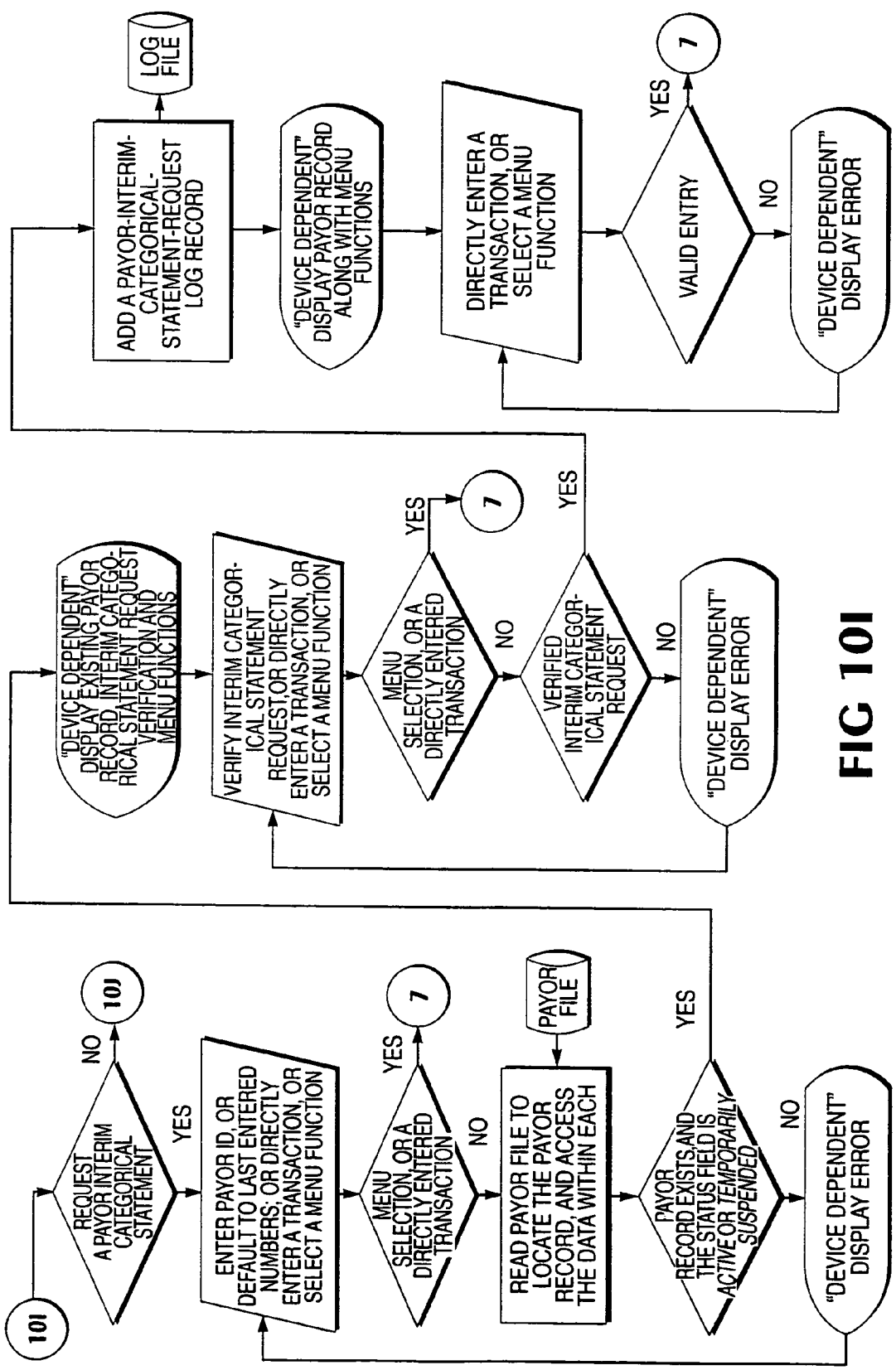

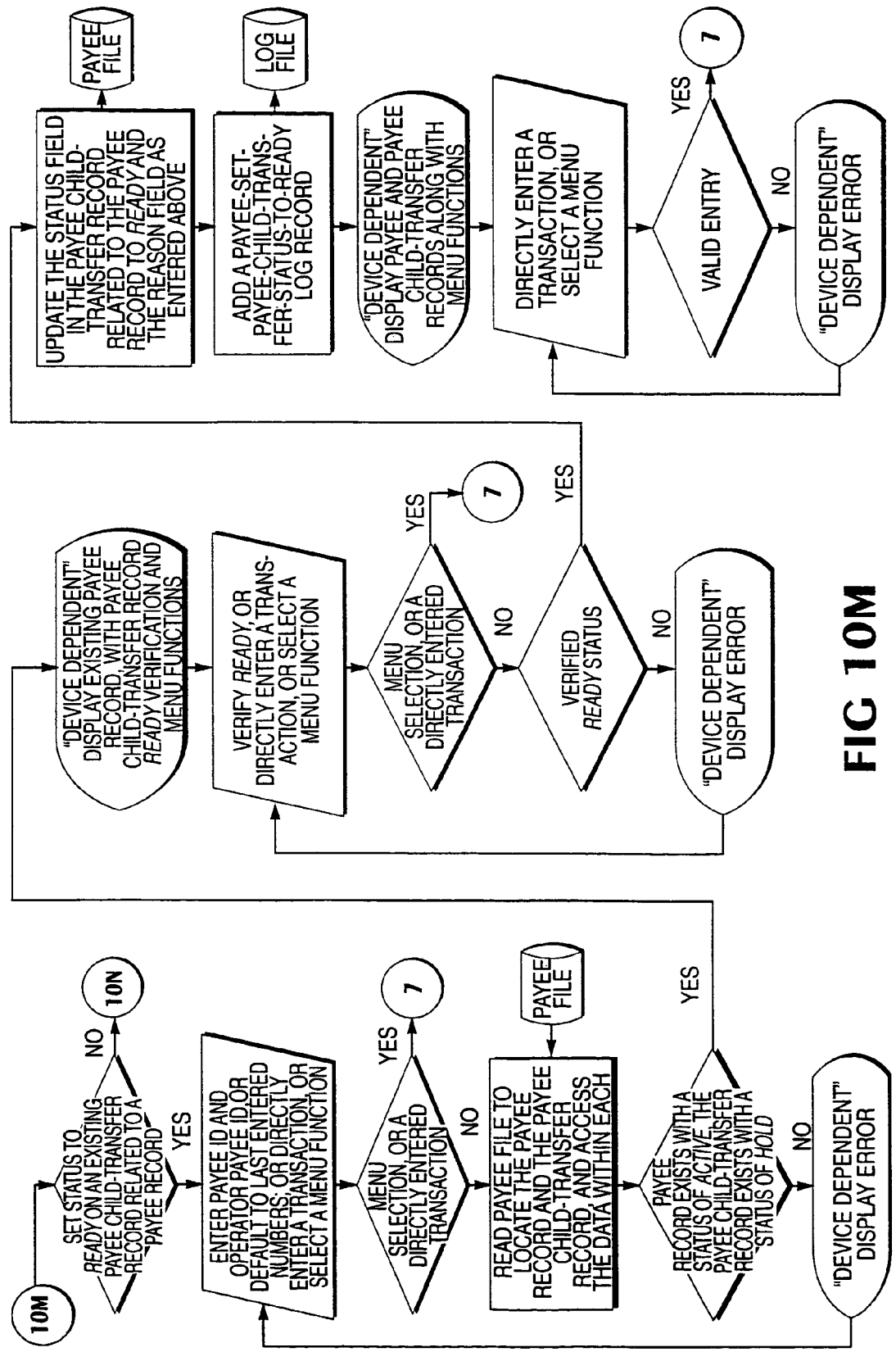

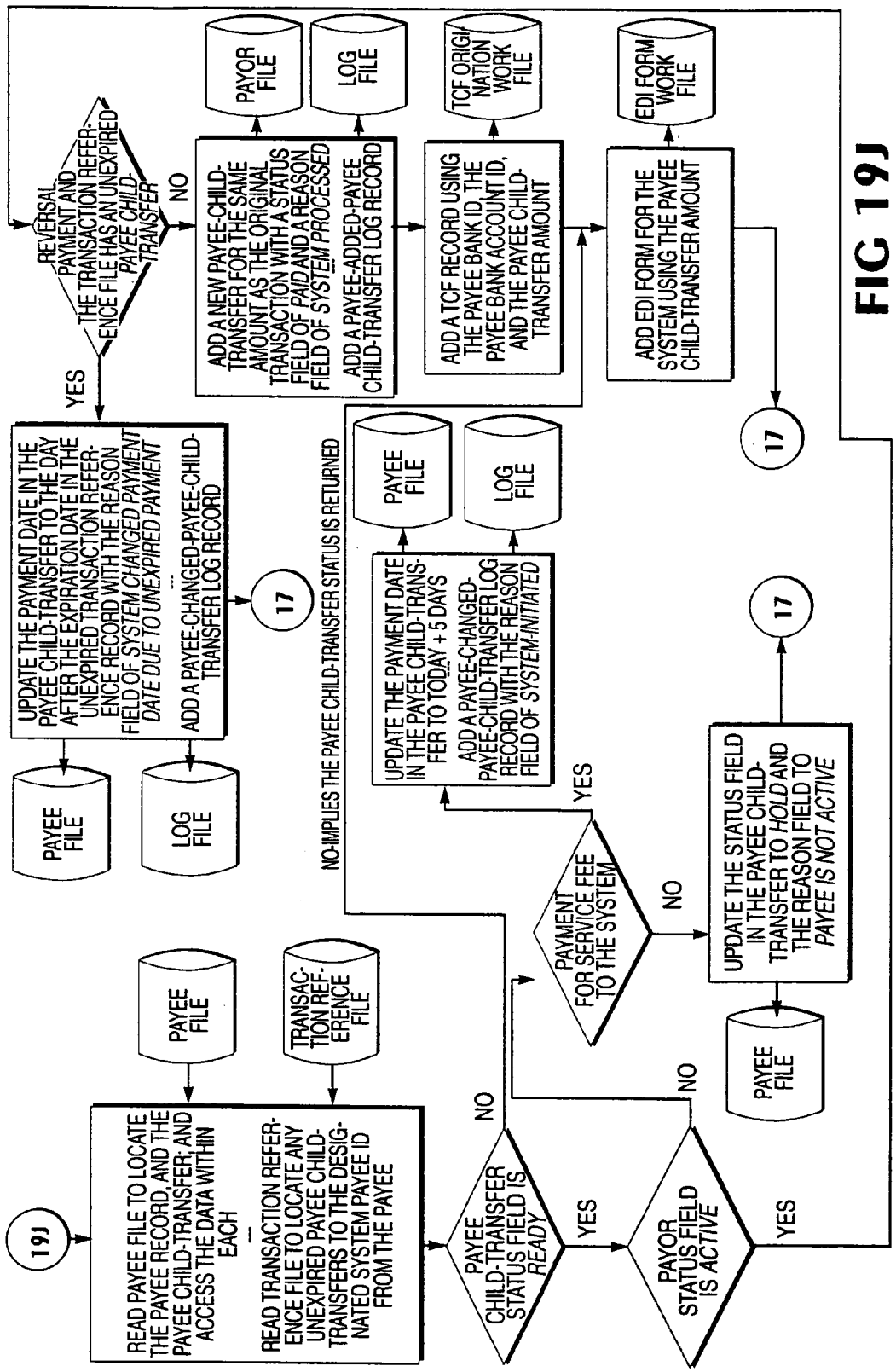

SYSTEM AND METHOD FOR PAYING BILLS AND OTHER OBLIGATIONS INCLUDING SELECTIVE PAYOR AND PAYEE CONTROLS

This application is a divisional of previously filed application Ser. No. 08/889,606, filed Jul. 8, 1997, now U.S. Pat. No. 5,956,700, which is a divisional of application Ser. No. 08/253,364, file Jun. 3, 1994, now U.S. Pat. No. 5,649,117.

FIELD OF THE INVENTION

This invention relates to systems for paying bills or other voluntary or involuntary obligations of payors, and, more particularly, to systems that interact with payors or payees.

BACKGROUND OF THE INVENTION

Systems that facilitate the payment of bills are well known. While these systems utilize a variety of components to implement a number of different procedures, they all possess some drawback that limits the flexibility of the system. To understand these various systems and their limitations, an explanatory background discussion is helpful.

Bill payments usually involve at least two parties, a payor and a payee. A payee is a person or entity that receives cash, government tender or other acceptable tender from a payor, to satisfy a bill for goods, services or obligations rendered or to be rendered to the payor or other persons. Obligations may be any type of debt owed to another and include such items as voluntary payor donations. A payor is the person or other entity that provides the funds or tender for such bill payment on behalf of itself or others. A bill may be presented at regular or irregular time intervals, may be oral or in a written format, and may take the form of a voluntary or involuntary obligation.

In most situations, the payee has the responsibility to determine the amount and due date for payment of a bill. Voluntary donations and bill payments of this nature are typical exceptions to this rule. If a bill is presented in written form it is also usually the responsibility of the payee to provide for delivery of the bill to the payor. This can be accomplished either directly between the payor and payee or indirectly through such third parties as the postal service. Once a bill is delivered to the payor it is usually the responsibility of the payor to deliver payment to the payee. This process usually involves one or more third parties. For example, if a check is deposited with the postal service it is delivered to a payee which relays it to a bank and the banking system is used to collect the payment. In its simplest form bill payment consists of the payor personally presenting cash to the payee.

Bill payment may be classified into two very general categories, positive and negative. Positive bill payments require the payor to "do something" or take a positive action before bill payment is performed. For example, positive action includes such methods as delivering cash or checks to a payee or authorizing payment of a bill by a third party by using a personal computer or telephone. Positive payment systems also include those in which a payor specifies a payment action on one date which is implemented on another date. Negative action or negative bill payment requires the payor to "do nothing" in order to pay a bill. In other words, the payor does something to "stop" a bill from being paid. Each category may be further divided into the additional sub-categories of single payee and multiple payee. Single/multiple payee category status is usually determined from the perspective of the payor. Positive pay systems, operated by a third party, are usually associated with multiple payees. Negative pay systems are usually associated with a single payee. Each of these sub-categories may be further sub-divided into additional categories such as electronic/paper, fixed/variable, provisional/final and partial/full.

The electronic/paper sub-category is usually used to define a system that principally utilizes electronic data messages to transfer funds while paper systems typically use written instruments for this purpose. The fixed/variable sub-category usually refers to whether the amount of the bill is fixed or varies for each billing cycle. Provisional/final sub-category typically indicates whether the payment action by a payor may be reversed after payment is tendered. Finally, the partial/full sub-category defines whether the payor may submit less than the full amount of the payee's bill.

Positive Action Bill Payment

The traditional positive action bill payment situation occurs where the payor, after becoming aware of the contents of the bill, takes positive action to pay the bill by mailing payment documentation back to the payee along with a check, money order, or other payment instrument, by paying the bill in person at the payee's facilities, or by paying the bill in person at an appropriate financial institution or other third party agent of the payee. Regardless of the method, the payor is required to take positive action to pay each bill, even if the bill is for the same amount and it recurs month after month. Positive action bill payment has a number of disadvantages, including its labor intensive nature resulting from the various manual processes and procedures a payor performs to implement it and the relatively high costs in invoice preparation, delivery, check charges, and check clearing processes for the payee.

Other positive bill payment arrangements have been directed toward addressing some of the above mentioned disadvantages. One such arrangement includes utilizing bills and invoices which comprise a detachable stub portion, which, when returned to the payee, may be used to initiate an electronic funds transfer. Such systems have been implemented in certain European countries as a single document billing/bill paying procedure, however, these documents often do not provide the payee with a negotiable instrument upon receipt, and generally do not meet the requirements of the check clearing processes of the Federal Reserve System in the United States. Such systems and related single document financial data processing procedures are described in U.S. Pat. No. 5,121,945, which issued to E. Thomson et al. on Jun. 16, 1992.

In the Thomson et al. patent, the disadvantages of the European type systems are overcome with a single document described as being generated by the supplier of goods or services which includes a bill, a maintenance section (to allow for payment changes or to select an option among conventional payment methods), and a pre-printed check which may be utilized by the payor as a fully qualified negotiable instrument for payment of the debt. To pay a bill, a payor simply signs the check and returns it to the supplier, without writing a separate personal check or implementing other alternate payment procedures. However, this system requires positive action by the payee to present each bill to a payor and requires action by the payee to initiate bill payment. This system follows relatively standard check payment and clearance procedures once the instrument is directed to the payor's financial institution. The patent teaches the use of such a system with a single payee.

In an effort to further address these limitations, various financial establishments have provided their customers with the option of paying variable and fixed bills electronically. These systems are typically positive action systems in which the customer usually initiates payment by communicating with the system via an authorized automated teller machine (ATM) or telephone. Systems that permit a payor to authorize payment on one date through such communication with the actual payment being performed on a second date are still classified as positive systems because the payor must take action to pay each bill. Typically, a system of this type requires that the payor's and payee's financial institutions communicate with the system. Some ATM bill paying systems have required that the actual bill be supplied to the payor by the payee to ensure proper payment. Telephone bill paying systems are somewhat more automated but still require the payor to enter through a telephone keypad or computer keyboard most of the critical billing information such as payor identification, bill amount, payee code or account number, etc. While these systems offer a payor access to multiple payees and may facilitate bill paying by debiting a payor's account and crediting the appropriate payee's account, the payment mechanisms require substantial human interaction for each bill. This interaction is required for each bill presented in each billing cycle, even if the obligation represented by the bill is a fixed recurring debt. While these systems may permit a payor to cancel a bill payment action entered by a payor within a predetermined waiting period, these systems do not permit a payor to reverse a bill payment once processing of the bill payment action has commenced.

Other positive action bill payment schemes have been developed whereby a subscriber (i.e., payor) obtains special communications devices and/or hardware to pay bills electronically from the payor's home. Such user initiated remote access systems include CheckFree, a personal computer based bill paying service available from CheckFree Corporation of Columbus, Ohio, and On-Line Banker Service offered by On-Line Resources, Ltd. of Washington, D.C. Other similar services are mentioned in the background section of U.S. Pat. No. 5,283,829, which issued to M. Anderson on Feb. 1, 1994.

The Anderson patent describes billing equipment which generates a bill with a unique approval number. Once a subscriber receives the bill, he or she may approve the payment via an interactive voice response unit by using the unique approval number for that particular payment. This procedure, however, requires the service or goods provider (i.e., the payee), to use specialized equipment to generate each invoice with its unique approval number. The subscriber then positively initiates each particular payment in a manner similar to the electronic funds transfer procedures of various other systems previously available, with the exception that sensitive account numbers or other personal information are not required to implement payment of the particular bill. Similarly, the On-Line Resources method and system mentioned above for remote distribution of financial services is described in U.S. Pat. No. 5,220,501 as a positive payment system, wherein the user must input payment information for each particular debt to be paid.

Finally, U.S. Pat. No. 4,484,304, which issued to R. Anderson et al., describes a transaction execution system similar to a variety of automatic teller machine (ATM) networks which allow for remote banking, including payment of particular bills and invoices of participant payees.

While the Anderson et al. system appears to offer an alleged improvement to conventional ATM networks by allowing multiple financial institutions to use the same host and remote terminals, it suffers many of the same shortcomings of other prior systems, including a requirement that specific payments must be manually entered by the user. There is also no provision for reversal of payments after they have been made.

Although there have been certain variations on the positive action bill payment procedures and systems, these arrangements still require the payor to take positive action to initiate payment of the bill even if the payor receives such a bill from the payee each month. In addition, positive action bill payment systems are cumbersome, costly, and inconvenient because manual processes are usually required to pay each bill. Nor do most of these systems empower the payor to manage the time for or amount of payment of bills including the reversal of payments previously made.

Negative Action Bill Payment

In a single payee negative action bill payment arrangement, the payee usually gets authorization directly from the payor to automatically debit the payor's account at the payor's financial institution on a periodic basis (e.g., monthly) for the payee's fixed bill amount or possibly a variable bill amount. For example, some insurance companies offer to automatically debit the payor's account at the payor's financial institution for the payor's monthly insurance premium payment. This automatic debit is usually accomplished through the Automated Clearing House (ACH) processes, or similar processes, which generally comprise a computer-based clearing and settlement operation often operated by a Federal Reserve Bank, and whose purpose is the exchange of electronic transactions among participating entities. As seen in the above example, the payor's insurance premium is automatically paid each period and the payor takes negative action, or no action, to pay such a bill. However, these systems require the payee's financial institution to generate the electronic funds transfer (EFT) debit messages to initiate bill payment. The payor's financial institution receives the debit message via the ACH and verifies whether the payor's authorization is still active as well as whether the presented debit message conforms to the payor authorized parameters. This procedure is performed for each bill presented for each billing cycle.

Additionally, these single payee negative action bill payment arrangements are typically offered by the payee (or the payee's agent on behalf of the payee) to the payor directly, and therefore the payor deals with each individual payee in order to receive such service. Disputes or problems regarding payments are handled directly between the payor and each applicable payee.

While this arrangement only requires payor action for the initial authorization to pay the payee debit messages, its acceptance in the industry has been unspectacular, as payors recognize that their control of the timing and amount of the payment is often forfeited in exchange for the need to respond to bills presented by each payee. For example, many of these systems have no flexibility regarding the payor's ability to determine when the bill is paid, and the payer is relegated to conforming to each individual payee system's predetermined dates and times for payment. Moreover, the payor has little or no control over each periodic payment, other than to completely terminate the bill payment service with the payee. In addition, other than to initially authorize a bill payment amount, the payor cannot change or alter the amount of the payments. In addition, there is usually no way for the payor to independently reverse a payment that has already been made without the cooperation and/or permission of the payee. Due to the relatively low acceptance of these systems, the fees generated by the number of participants and the corresponding volume of message traffic in such systems are also relatively low and the overall costs are higher. An example of a common electronic funds transfer system is disclosed in U.S. Pat. No. 4,823,264, which issued to G. Deming on Apr. 18, 1989.

A modification of this negative action system is to have a third party provide the debit messages from multiple payees to multiple payors. In this type of system, the payor usually authorizes the third party provider to automatically debit the payor's account at the payor's financial institution on a periodic basis (e.g., monthly) for a payee's fixed bill amounts. The provider also establishes a recurring data file of fixed payment amounts along with a corresponding payment date for each bill of each participating payee. Such systems are used to make recurring fixed payments such as preset mortgage payments, installment loan payments, leasing payments, or the like. This automatic debit is usually accomplished through the Automated Clearing House (ACH) processes, or similar processes, as described above. Like the systems described above, the payor's bill is automatically paid each period and the payor takes negative action, or no action, to pay such bill. However, such systems still suffer the limitation that payors do not exert control over payment of the payee bills after the initial authorization and payees do not modify the recurring data file without the use of manual processes by the third party provider.

Financial industry acceptance of these fixed negative action systems has been unspectacular for many of the same reasons cited above. These systems do not accommodate bills or debts that vary in amount from month to month based upon customer usage and the payees in such a system often have to be financial institution accounts (e.g., mortgage loans, installment loans, leasing account, etc.) and may also have to be at the financial institution which is the provider of the payment arrangement, thus further limiting the convenience and applicability of these options.

Similar to negative action bill payment arrangements, a variety of other accounting and automated fund collection systems have been available in various forms, such as shown and described in U.S. Pat. No. 5,222,018 (which issued to M. Sharpe et al.) and U.S. Pat. No. 5,111,395 (which issued to R. Smith et al.). The M. Sharpe et al. system for centralized processing of account and payment functions is directed to a procedure for determining an accounting for costs of shipping transactions. The system maintains a database for participating shippers and carriers and debits and credits the shipper and carrier accounts in order to keep track of shipping services requested and delivered. Periodically, the system issues statements of accounts receivable to the carriers and statements of accounts payable to the shippers. This accounting system thereby is directed to simplifying accounting for a relatively large number of transactions which can be reported in periodic statements of accounts to be settled between the carriers and shippers.

The R. Sharpe et al. system allows the shippers to maintain funds with a predetermined trustee bank, so the central processing center of the system may issue instructions to that bank to appropriately debit the shippers' accounts and issue payment to carriers accordingly. The actual payment is made in a traditional manner through the trustee bank, such as through electronic fund transfers and the like. While this system does provide for simplified accounting and account tracking procedures, it includes deficiencies similar to other systems described above in that it lacks provisions for the shippers to control the timing of payments, modification of billing payment amounts, and/or reversal of payments after they are made.

Consequently, while a variety of bill payment systems directed to positive/negative, single payee/multiple payee, and interactive systems and methods, have been provided in various forms to address shortcomings for general billing and bill payment procedures, these systems and methods have suffered from significant drawbacks of inconvenience, high costs, lack of universal applicability and acceptance by payors, lack of flexibility, and lack of control over payment amounts and payment timing by the payors. Many previously known systems are limited in that they require positive action by the payor to implement payments, are available only for certain types of bills and debts of predetermined amounts, require implementation of specialized equipment by individual providers of services and/or goods, rely solely upon Federal Reserve Bank ACH systems to accomplish payments between various financial institutions, and/or compromise the payor's ability to control payment amount, timing or reversal of payment, or access to information regarding the current status of upcoming or previous payments.

Given such disadvantages of currently available bill payment procedures and systems, there is a need for a payment system that reduces the payor's time spent in paying bills, reduces the cost of paying bills, increases service, increases payor control over the bill payment process and standardizes the interface between the payor and multiple payees thus significantly reducing or eliminating the financial and operational interaction between a payor and each payee. In addition, there is a need for a system to eliminate the necessity for multiple payees to make delivery of their respective bills to consumer payors and to allow the possibility of single delivery of bills from multiple payees to a payor.

SUMMARY OF THE INVENTION

The limitations of previously known bill paying systems are overcome by a system constructed in accordance with the principles of the present invention. A bill payment system having payor control that is constructed in accordance with the principles of the present invention comprises storage for payee information for each of a plurality of payors, said payor information including child-payee information identifying one of said payees authorized to receive a transfer of funds from one of said payors, a recurring obligation amount, and a recurring minimum time billing interval; a bill generator for generating at a first predetermined time a bill record from said payor information for one of said payees, said generated bill record including an obligation amount and payment date so that said generated bill record corresponds to a transfer of funds between said one of said payors and said one of said payees to pay said recurring obligation amount on said payment date corresponding to said minimum time interval, said generated bill record being stored within said payor information for said one of said payors; and a TCF message generator for generating at a second predetermined time EFT messages corresponding to said generated bill record to effect said transfer of funds.

The system of the invention utilizes data receiving and processing equipment with any of a number of interactive systems and communication equipment to efficiently implement a bill processing and payment system which automatically tracks, pays, and reports bills for a plurality of individual payees without requiring action from the payors, yet provides each payor significant control over payments and a mechanism to fully or partially reverse payments made by the system within an applicable provisional period.

In a further aspect of the present invention, the bill generator uses bill data received for one or more payees, along with the payor information, and payee information to generate the bills. The payee information and bill data preferably includes provisional periods, bill amounts and due dates. The payor information for each payor preferably includes payor determined preferences for payment timing, maximum payment amount, and minimum interval for billing and/or payment for each particular payee.

The payor control interface responds to payor control messages to modify the timing, amount, and billing and/or payment interval for automatic payments of particular bills and to implement full or partial reversal of payments made within an applicable provisional period. Preferably interactive equipment is coupled to the payor control interface to allow the payor electronic access from remote locations. The payor control interface further preferably includes a report generator which may include a printer or the like that formats data concerning payments made, payments due to be made, payments held or cancelled, payments reversed by the payor, and payor control preferences for each such payee. This formatted data is provided to payor through the payor control interface or through a hard copy device.

The system of the present invention implements a method for generating bill records from payor information, payee information, and bill data received from payees and paying the obligations represented by the generated bill records at a predetermined time unless the payor transmits payor control messages that modify the generated bill and its corresponding payment. These modifications include changing the date of payment, to place a hold on, cancel, or modify the payment of a particular bill, or to reverse a payment already made within the applicable provisional period.

It is an object of the present invention to provide a negative multiple payee system which receives bill data from multiple payees concerning one or more payors and initiates payment of variable bills for a payor at a predetermined time.

It is an object of the present invention to provide a negative multiple payee system which receives payor control messages that include bill data from payors concerning multiple payees and/or bill data messages from multiple payees that include bill data for multiple payors and that initiates payment of fixed bills for a payor at a predetermined time.

It is an object of the present invention to provide a multiple payee system that reduces the need for the payor to directly communicate with the payee.

It is an object of the present invention to provide a multiple payee system which permits a payor, once the payor information is initially established on the system, to authorize additional system payees for which the payor is already a customer through interactive means and without the need for additional payor sign-up.

It is an object of the present invention to provide a multiple payee system wherein the interaction between a payor and the system is standardized for the payor relative to all payees.

It is an object of the present invention to provide a multiple payee system which provides a payor more control over bill payment than currently available in other commonly used payment systems and methods.

It is an object of the present invention to provide a multiple payee system which empowers the pavor with the ability to fully or partially reverse a payment that was previously made by the system within a provisional period applicable to a particular payee.

It is an object of the present invention to provide a multiple payee system which provides the payor with access to system information regarding payments made to payees, payments scheduled to be made to payees and other payor and payee information.

These and other objectives met by the present invention may be discerned by reading the detailed description and reviewing the accompanying drawings.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 3 is a simplified schematic diagram of a preferred embodiment of the system for receiving and paying bills of payors shown in FIG. 1;

FIGS. 8A–8L are flowcharts illustrating preferred payor activities for the system shown in FIG. 3;

FIGS. 9A–9E are flowcharts illustrating a preferred set of payee activities for the system shown in FIG. 3;

FIGS. 17, 18, and 19A–19K are flowcharts illustrating further detail and processing of various log record processing for the system shown in FIG. 3;

DETAILED DESCRIPTION OF THE INVENTION

Figure 1:
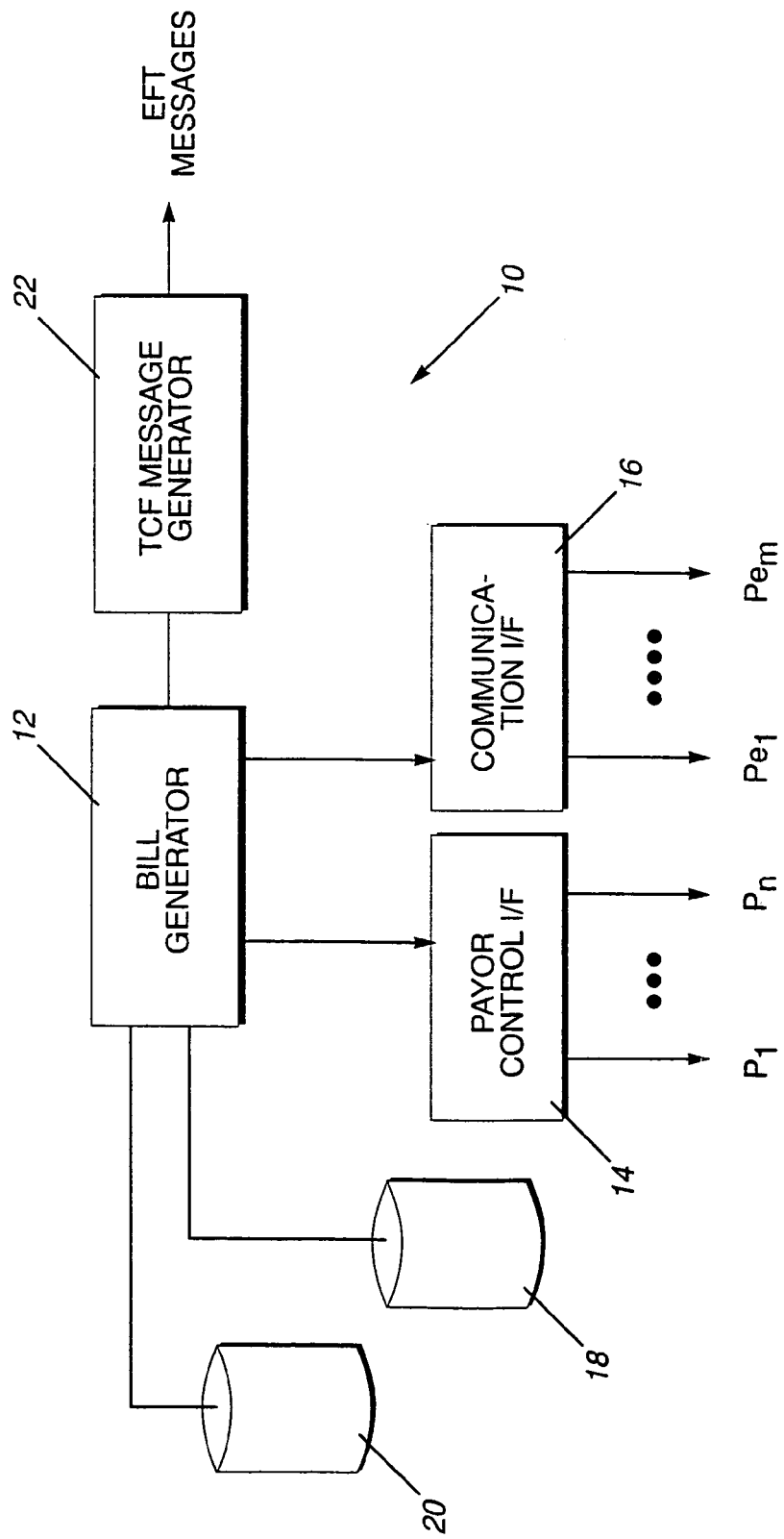
FIG. 1 is a block diagram of a system for paying the bills of multiple payors to multiple payees in accordance with the principles of the present invention.

For clarity and understanding, certain terms and phrases are used herein to describe the system structure and operation of the method of the present invention. These terms and phrases are briefly defined as:

Bank
A financial institution, government agency, brokerage firm or other entity where a BankAccount is located. When Bank is prefixed with the word Operator, Payor or Payee, such term shall mean the Bank of the respective prefixed entity (e.g. "PayorBank", the Bank of the Payor).

BankAccount
A checking, savings, credit card, brokerage, government benefits or any other account located at a Bank which can be debited or credited. When BankAccount is prefixed with the word Operator, Payor or Payee, such term shall mean the BankAccount of the respective prefixed entity (e.g. "Payee BankAccount", the BankAccount of the Payee).

BankAccountID
The number or other information identifying a BankAccount. When BankAccountID is prefixed with the word Operator, Payor or Payee, such term shall mean the BankAccountID of the respective prefixed entity's BankAccount (e.g. "Payor BankAccountID", the BankAccountID of the Payor BankAccount).

BankID
The number or other information identifying a Bank. When BankID is prefixed with the word Operator, Payor or Payee, such term shall mean the BankID of the respective prefixed entity's Bank (e.g. "Operator BankID", the BankID of the OperatorBank).

Bill
A Standard Bill, Contract Bill, Voluntary Obligation and/or Other Obligation.

Bill Data
Information received from the Payee, information received from the Payor or information otherwise established on the inventive system which contains certain fundamental components of a Bill such as an amount and due date.

Child-Payee
A record related to a Payor Record identifying a valid Payee for such Payor.

Child-PayeeID
The number or other unique identifier (i) assigned by the Payee and which identifies a Payor to a Payee; or (ii) assigned by the inventive system for its own purposes and which associates a Payor to a Payee.

Child-Transfer

Log Record
A Log Record containing Payor Child-Transfer information or Payee Child-Transfer information.

Contract Bill
An oral or written agreement or understanding under which a payment amount or series of payment amounts are due.

CSR
A customer service representative of the Operator.

EDI
The exchange, between Persons, of computer processable data in a standard format. Standards activities undertaken by the Accredited Standards Committee (ASC) X.12 Electronic Data Interchange within the American National Standards Institute (ANSI) encompass any subject area for which EDI standards can be developed.

EDI Form
The data that is exchanged in order to convey meaning between Persons engaged in EDI, consisting of a specific group of segments, or records, within a transaction set that represents a business document (e.g. invoices, purchase orders, inventory inquiries, bills of lading, payments, and others between suppliers and customers).

Log File
A file containing Log Records.

Log Record
A record that contains information relating to a specific transaction or process in the inventive system which is used to communicate between different components of the inventive system.

Member Payee
A Payee that has entered into an agreement with the Operator whereby such Payee has certain obligations and agrees to follow certain rules and requirements relative to the inventive system.

Minimum Interval
A minimum acceptable time period in which the inventive system accepts successive payments to, and/or Bills or Bill Data from, a particular Payee or Payor.

Multiple Payee System or Multiple Payee
A Bill payment system or arrangement where the Payor enters into an agreement with a Person that offers to act as an agent of the Payor and grant certain rights to such Payor whereby Payors can make payment to such Person and such Person independently makes payment to two or more Payees that are not directly or indirectly under common control or ownership. Multiple Payee Systems are viewed from the perspective of the Payor.

Negative
The concept associated with Payors that one or more events automatically happen (e.g. payment of Bills are automatically initiated) unless the Payor takes action to stop such event or events from happening.

NonMember Payee
A Payee that is not a Member Payee.

Operator
The Person or Persons that own and operate the inventive system and which is the initiator of all monetary transfers of funds.

Other Obligation
Any situation, commitment or arrangement under which a payment amount or series of payment amounts are expected to be paid.

Payee
A Person that is the intended original end recipient of a monetary transfer of funds from a Payor. Any derivative from such monetary transfer of funds (e.g., reversal, return, re-try, adjustment, etc.) does not change the status of the Person as a Payor or Payee. When the term "Payee" alone is used it refers to both Member Payees and NonMember Payees.

Payee Child-Activity
A record related to the Payee Record which contains Operator fee information used to generate Payee Child-Transfer record(s) for purposes of assessing Operator fees to a Payee.

Payee Child-Transfer
A record related to a Payee Record which contains information used to initiate a monetary transfer of funds between a Payee and the Operator.

Payee File or Database
The file or database containing Payee Records.

Payee Information
Information provided by or on behalf of a Payee such as the Payee name, address, Payee BankID and Payee BankAccountID.

Payee Record
Record or records containing Payee Information for a particular Payee.

PayeeID
The number or other unique identifier assigned by the inventive system to identify the Payee.

Payor
A Person that authorizes the Operator to originate monetary transfers of funds to a Payee. Any derivative from such monetary transfer of funds (e.g., reversal, return, re-try, adjustment, etc.) does not change the status of the Person as a Payor or Payee.

Payor Child-Activity
A record related to the Payor Record which contains Operator fee information used to generate Payor Child-Transfer record(s) for purposes of assessing Operator fees to a Payor.

Payor Child-Transfer
A record related to a Payor Record which contains information used to initiate a monetary transfer of funds between or among a Payor, Payee and/or the Operator.

Payor File or Database
The file or database containing Payor Records.

Payor Information
Information provided by or on behalf of a Payor such as the Payor name, address, Payor BankID and Payor BankAccountID.

Payor Record
Record or records containing Payor Information for a particular Payor.

PayorID
The number or other unique identifier assigned by the inventive system to identify the Payor.

Person
An individual, partnership, joint venture, corporation or other legal entity.

PIN
The personal identification number associated with a Payor.

Positive
The concept associated with Payors that no payment occurs (e.g. Payment of bills are not automatically initiated) unless the Payor takes action to initiate such current or future payment.

Pre-Note
Information sent to a Bank, Payor or Payee requesting verification of information.

Provisional or Provisional Period
The time period during which a Payor may fully or partially reverse a Payor monetary transfer of funds.

Single Payee System
A Bill payment system or arrangement which is not a Multiple Payee System.

Standard Bill
A standard invoice or bill, which may include a written paper document or an electronic data document, an account summary, or any other description of or notice of a payment amount due.

TCF
A Transfer Communication Facilitor such as a facility, system and/or arrangement used to settle monetary transfers of funds and/or communicate information between and among Payors, Payees and the Operator and their respective Banks and BankAccounts. For example, one such TCF that the Operator may use is the Federal Reserve Bank Automated Clearing House (ACH) System.

TCFInterfaceBank
A Bank that the Operator may use to interface with a TCF.

Transaction Reference File
A file containing Transaction Reference Records.

Transaction Reference Record
An audit record used to retain and store information about each record sent out by the inventive system for which historical tracking, balancing and/or research is desired. For example, Payor Child-Transfer records, Payee Child-Transfer records and Pre-Notes sent out of the inventive system would have corresponding Transaction Reference Records.

Voluntary Obligation
A situation, commitment or arrangement under which a voluntary payment amount or series of voluntary payment amounts are expected to be paid. For example, Voluntary Obligation could include charitable donations, church donations, donations to a not for profit organization, or other voluntary payments.

Also, as used herein, "daily" will generally mean a "business" day. Other terms will be identified below in the detailed description, as appropriate.

A block diagram of the system constructed in accordance with the principles of the present invention is shown in FIG. 1. The system 10 includes a bill generator 12 that is coupled through a payor control interface 14 to a first plurality of Payors. $P_1 \ldots P_n$. A communication interface 16 couples bill generator 12 to a second plurality of payees $Pe_1 \ldots Pe_m$. The bill generator 12 is also coupled to storage for Payor Information 18 (Payor Database) and storage for Payee Information 20 (Payee Database). The Payor Information stored in the Payor Database 18 is initially entered by an Operator for system 10 through known devices such as keyboard entry or scanning equipment. In a similar manner, the Payee Information is entered into the Payee Database 20.

In its simplest form, bill generator 12 may use the Payee Information within the Payee Database 20 as a recurring datafile to search the Payor Information in the Payor Database 18 to generate bill records at predetermined times. These times for bill record generation may be defined as periodic, i.e., daily or the like, or as having a relationship to Payor or Payee Information, such as a number of days prior to a due date. These bill records may be stored elsewhere in the system for later processing or they may be associated with Payor Information corresponding to particular Payors within the Payor Database 18. On some type of recurring basis, either periodically or at operator initiative, bill generator 12 processes generated bill records and transfers them to a TCF message generator 22. Using the generated bill records, the TCF message generator 22 generates, at predetermined times, Electronic Funds Transfer (EFT) messages that debit Payor BankAccounts through some type of TCF transfer system. The generated bill records are updated to indicate a transfer has occurred and the records are placed in the Payor Database 18. Each of the transmitted debit messages that correspond to a particular Payee are accumulated and are used to generate a settlement message. A settlement message is transmitted through the TCF system to provide an overall credit/debit to the Payee Bank.

The payor control interface 14 receives payor control messages from the Payors coupled to the system 10. These payor control messages are used to modify data within the generated bill records. This capability of modifying the generated bill records includes the ability to modify generated bill records that indicate a transfer of funds has occurred. Bill generator 12 and TCF message generator 22 process such modified generated bill records to reverse, either fully or partially, the transfer of funds.

The system 10 as shown in FIG. 1 may be further expanded so that the communication interface 16 receives bill data messages from the Payees. These bill data messages include a PayeeID, a Child PayeeID, an obligation amount, and an obligation due date. This information is used by the bill generator 12 along with Payee Information from database 20 and Payor Information from database 18 to generate bill records. The bill records generated by using bill data messages may have variable obligation amounts or due dates based upon customer (payor) usage or the like of a payee's services or goods.

Figures 2A, 2B:
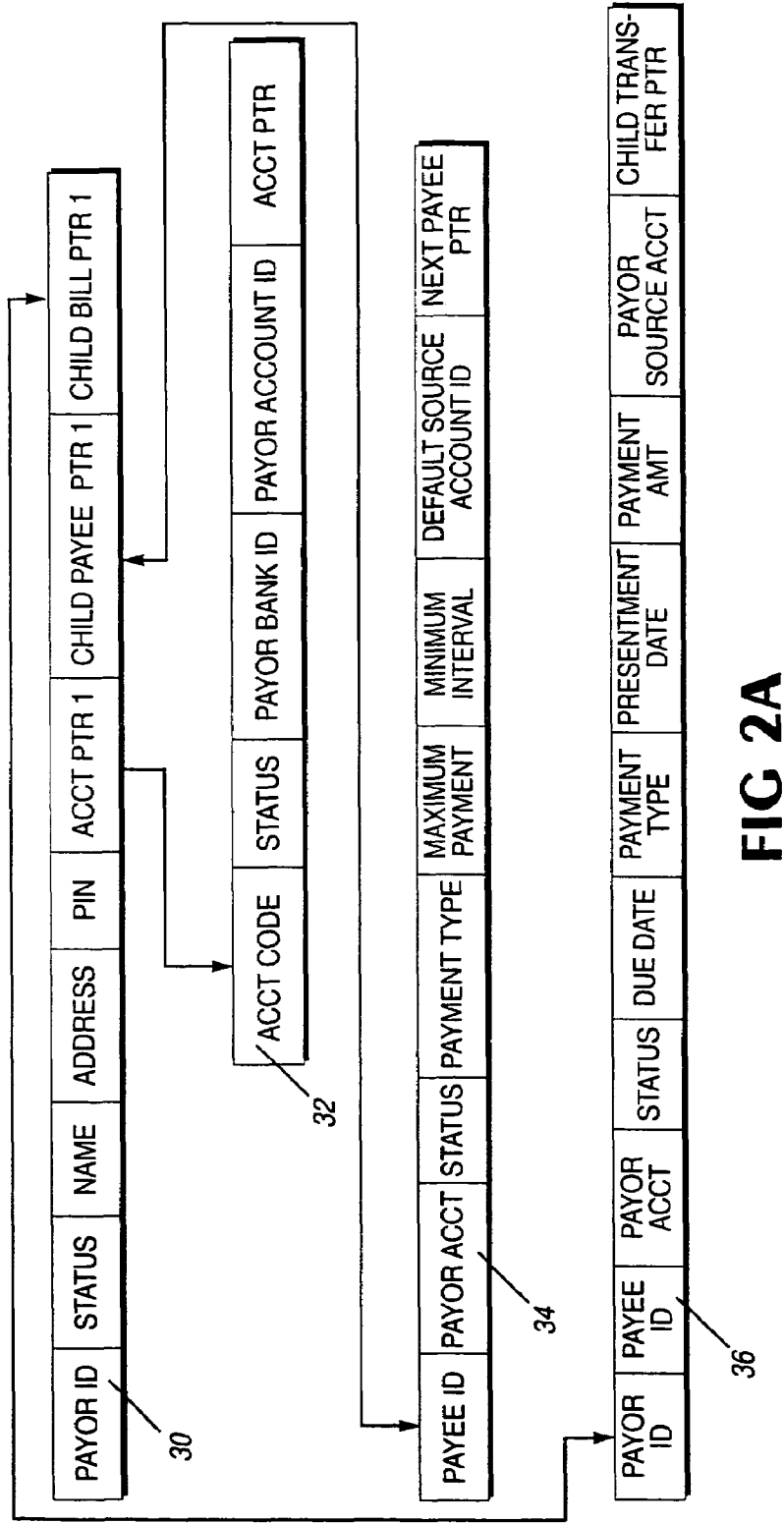
FIG. 2A is a schematic diagram of a payor record that contains payor information for one of the payors coupled to the system of FIG. 1.
FIG. 2B is a schematic diagram of a payee record that contains payee information for one of the payees coupled to the system of FIG. 1.

An exemplary data record structure for the Payor Information for one of the Payors stored within database 18 is shown in FIG. 2A. The Payor Information includes a Payor Record 30, a Payor source account record 32, a Child-Payee Record 34, and a bill record 36. The Payor Record 30 includes a number of data fields. These data fields include storage for a PayorID, Payor name, Payor address, Payor record status, PIN, first Payor source account record pointer, first Payor Child-Payee record pointer, and first Payor bill record pointer. These records and data fields that comprise a Payor Record are presented by way of example only. The PayorID is a number used to provide an efficient numerical scheme for identifying payor records. The Payor name and address fields are provided for identifying the Payor in reports or interactive menus as explained below. The Payor record status is used to indicate the status of a Payor within the system and confirm whether an obligation submitted by a payee may be paid or not. The Payor status may be one of the values: Active, Temporarily Suspended, Permanently Suspended, Closed, or Deleted. The first Payor source account record pointer indicates the location of the first source account record that identifies a Payor BankAccount from which funds may be transferred. The first Child-Payee record pointer indicates the location of the first Child-Payee record for the Payor and the first bill record pointer indicates the location of the first bill record for a Payor.

An exemplary Payor source account record 32 associated with a Payor Record is shown in FIG. 2A. That record includes an account code, status field, Payor BankID, Payor AccountID, and a Payor source account record pointer. The account code identifies the type of the source account. For example, it could identify the account as a checking account. The status field is the same as explained above. The Payor BankID and Payor BankAccountID identifies a financial institution and an account at that institution from which funds may be transferred to satisfy obligations. The Payor source account record pointer indicates the location of the next Payor source account record, if there is one.

As shown in FIG. 2A, the first Child-Payee record 34 associated with the Payor Record also includes a number of data fields. The Child-Payee record is used to identify Payees that may be or have been authorized to receive payment of an obligation from the associated Payor. The Child-Payee record includes data fields for PayeeID, Payor's account number with the Payee, payment type, maximum amount authorized for an obligation payment to the Payee, the status of the Payee which may have the same values as the status field for the Payor Records, a minimum time interval, a default source account ID, and a second child payee pointer. Again, the PayeeID is a numerical scheme for identifying each of the payees within the inventive system. The maximum amount data field is used to identify the maximum amount of an obligation authorized by the payor for payment. The minimum payment interval defines a billing-cycle length, and the default source account ID defines the Payor BankAccount from which funds are transferred to pay the Payee. The second child payee pointer indicates the location of the next Child-Payee record associated with the Payor Record. If there is no other payee record, a terminating value is inserted in the field. Again, the data record structure of the Child-Payee record shown in FIG. 2A is by way of example only.

The first bill record pointer shown in FIG. 2 points to a bill record 36. These bill records are generated and later processed to generate the EFT messages for implementing a transfer of funds from a payor to a payee to satisfy an obligation or from a payee to a payor to reverse a transfer. The bill record includes the PayorID, PayeeID, PayorAccount, a status field, due date, payment type, presentment date, Payment amount, Payor source account, and a next bill record pointer. The PayorID and PayeeID are the same as discussed above. The Payor account identifies the Payor's account with the Payee. The due date and presentment dates refer to the date the payee has identified for payment and the date the payor has designated for fund transfer, respectively. The payment type indicates whether payment is to be made electronically or not and the Payor source account identifies the account from which funds are transferred for payment. The payment amount is the dollar amount to be indicated in the debit message to satisfy an obligation. A status field is provided to further control whether an obligation is paid during processing of the bill record. The status field for the bill record may include one of the following status values: Ready, Hold, Paid, Returned, or Cancelled. The use of the status field and the processing of the bill records are described in more detail below. The data structure of the bill record shown in FIG. 2A is exemplary only.

FIG. 2B shows an exemplary data record in database 20 that contains Payee Information for one of the payees. This record 40 includes PayeeID, status field, Payee type, Payee name and address, Payor BankID and Payor BankAccountID, payment method, Provisional Period type, Provisional Period length, and minimum time interval. The PayeeID, name and address identify the Payee for record processing and reporting. The Payee type indicates the type of service provided to the Payee by system 10. The status field is used as discussed above for the other records shown in FIG. 2A. The PayorBank and BankAccountIDs identify the Payor's bank and account to which the settlement messages are transmitted. The Provisional Period type and length define whether the Provisional Period may commence after payment date, after payment date up to due date, or after the due date, for example. The minimum time interval is preferably a default value set by the Operator of system 10 that defines the minimum billing cycle for a Payee. This value is used by system 10 to set the minimum time interval field in the Child-Payee Record 34. However, the minimum time interval data field in the Child-Payee Record may be modified by a Payor. Thus, the Child-Payee Record, and not the Payee Record, is used to generate bill records.

The illustration of FIG. 3 shows a simplified schematic block diagram of a presently preferred exemplary embodiment of a Provisional, Multiple Payee, Negative payment system 100 set up in accordance with the principles of the present invention. Particularly, FIG. 3 shows a preferred combination of structure and apparatus for implementing the present invention in a relatively large scale commercial arrangement, wherein a system 100 is implemented for automatic Bill tracking and payment. It is contemplated that the Operator of system 100 establishes, through appropriate contractual agreements or the like, an understanding with various Payors that Bills from designated Payees are at predetermined times such as periodically (e.g. on a monthly basis) paid according to Bill Data submitted by Payees relating to Payors or at predetermined times such as periodically paid according to Bill Data established on system 100 based on instructions from Payors relating to Payees. These contractual arrangements clarify the Operator's obligations for receiving and storing Payor Information and Payee Information, and for initiating payment of Bills for each Payor to the Payees at predetermined times in accordance with a predetermined set of provisions for handling Bill Data and other data from both Payors and Payees.

Particularly, once a Payor Record and related Child-Payee record is established with information from a Payor and a Payee, Bill Data may be collected from Payees in an ongoing manner. Additionally, Bill Data and other information affecting the payment of Bills may be provided by payor control messages from Payors. The bill records, also called Payor Child-Transfer Records, are periodically sorted for processing and payment on predetermined dates determined by individual Payors relative to due dates for those particular Bills. Payor Child-Transfer Record processing is undertaken automatically at predetermined times such as periodic (e.g. daily) intervals for each Payor, and all bill records determined to be ready for payment at that time may be selected for payment processing unless the Payor takes positive action (a) to control such payment by changing the status of a Payor Child-Transfer Record from "Ready" to "Hold", or "Cancelled", (b) to modify the amount to be paid or (c) to change the date for initiating a payment. After a payment is initiated by the system 100, the Payor may implement a reversal through a payor control message during the applicable Provisional Period. As discussed below, the Provisional Periods for payment reversals are preferably established by the Operator for all Member Payees or, alternatively by contract with the individual Member Payees, and maintained in the Payee Records of the system.

The preferred embodiment of the inventive system 100 shown in FIG. 3 includes a central computer system 110, a plurality of remote digital personal computers 112, preferably running associated asynchronous communication software to operate compatible modulator/demodulator devices (e.g. modems) which translate analog signals to/from the remote digital personal computers when necessary, a public digital data network ("PDN") 114, packet assembler/disassembler, access concentrator multiplexers (sometimes these assemblers, disassemblers, multiplexers and related equipment are generally referenced as "communications interface assistors" 116), and a protocol translator front-end processor (e.g. FEP) 118. In addition, the system 100 preferably includes a plurality of voice telephone devices (e.g. 120), and one or more digital personal computers 1 22 running an operating system such as the MS-DOS Operating System software, in turn running a graphical user interface program such as the Microsoft Windows (e.g. version 3.1 software).

Figure 7:
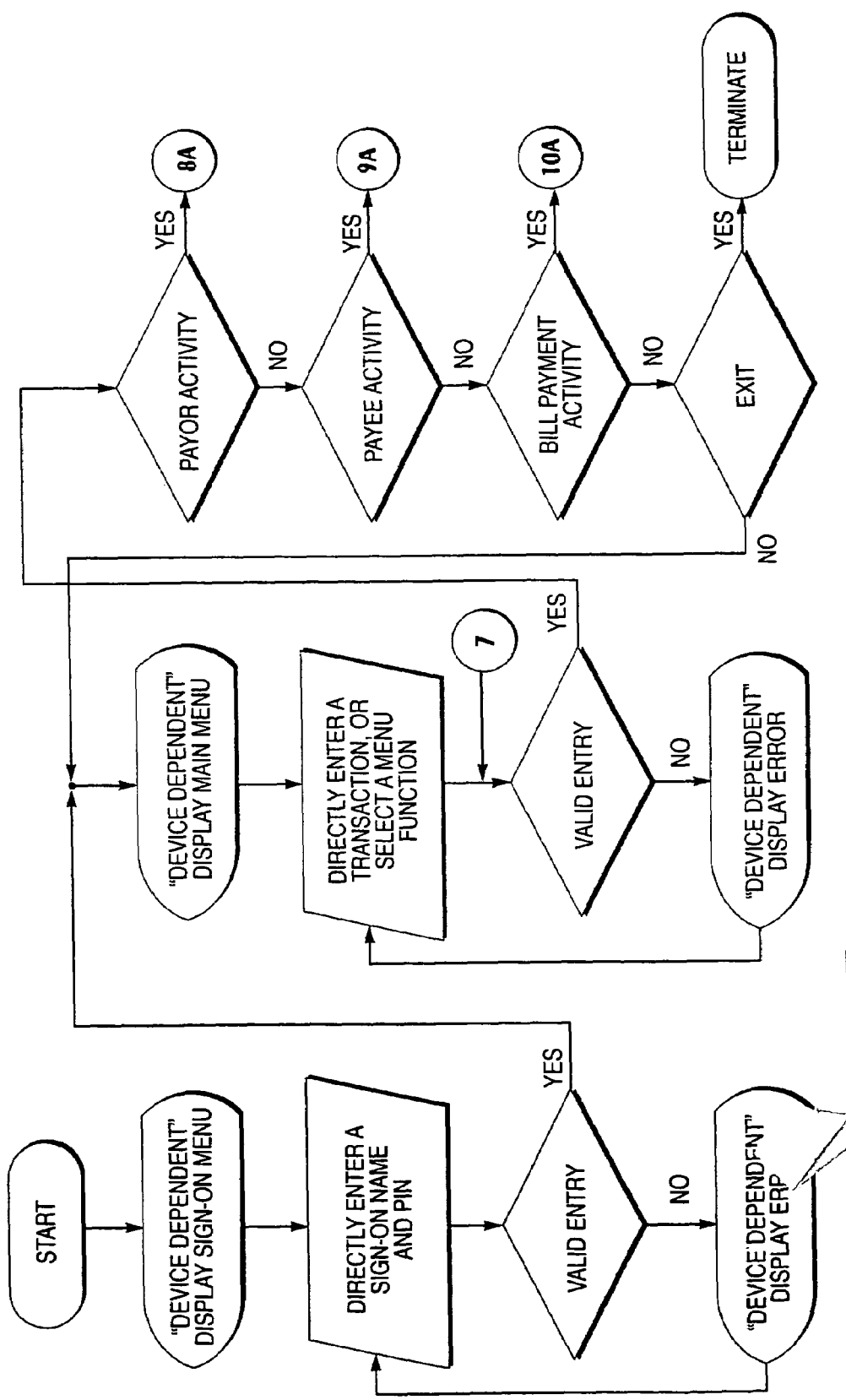
FIG. 7 is a flowchart of the main menu for the preferred payment system shown in FIG. 3.

In a preferred example, the interface program running on digital personal computer 122 controls an IBM 3270 SDLC terminal emulator, such as the Rumba for the Mainframe version 3.2 software (as available from WallData Corporation, Redmond, Wash.) under a high-level language application programming interface (e.g. HLLAPI) on a SDLC communications adapter such as the WallData SDLC co-processor board, running a DOS protected-mode interface gateway (such as the TI/F DLL from Voice Information Systems, Inc., Bryn Mawr, Pa.) using voice processing boards with analog telephone interfaces, dual-tone multi-frequency digit (e.g. DTMF) or multi-frequency digit (e.g. MF) detection and generation, and call progress analysis such as the Dialog 41D Voice Boards from Dialogic Corporation (Parsippany, N.J.). The digital personal computer 122 preferably runs an interactive voice response ("IVR") system software to perform tasks such as shown in FIG. 7 for Payors needing touchtone telephone access to the on-line Payor Database 18, and accessing the central computer 15 through a front-end processor (e.g. 130) such as an IBM Model 3745 Front-End Communications Processor.

The IVR system defined by computer 122 and its associated software and peripherals may be adapted for particular applications to provide appropriate user/system interaction and control. There are no known "off-the-shelf" IVR system software packages available that provide all of the preferred audio menu, data entry mechanism, and system transactions. A person of ordinary skill in programming digital personal computers, however, can develop this IVR software by using the C/C++ language in an integrated program development environment (e.g., the Borland C++ version 4.0 from Borland International, Inc., Scotts Valley, Calif.), using Windows version 3.1 Application Programming Interface functions.

For example, the software may be developed on a digital personal computer (e.g., an Intel 80486 with at least 4 MB of RAM, 130 MB hard disk space; using at least a monochrome VGA monitor, and a personal computer keyboard). In the preferred embodiment, the software is written in ASCII-text source code, compiled into Intel-specific object code in the program development environment, and the object code is linked with the necessary libraries (such as the Windows Software Developers Kit) into Intel processor executable programs.

The audio prompts for menus, data entry prompting, and "help" information are preferably created in a digital format such as a 16-bit linear 8,000 sample-per-second Pulse Code Modulation, PCM, format, that is converted to a 4-bit 6,000 sample-per-second Adaptive Differential Pulse Code Modulation (ADPCM) format for use with voice response boards (e.g., Dialogic model D41-4-port). In order to create these audio prompts, an analog-to-digital converter and audio editing software is required (e.g., the Bit Works Audio Works Station including the Bit Works Audio Works Board from Bit Works, Inc., Thornhill, Ontario, Canada) which accepts a microphone (such as an Audio Technica model 150D) as analog input for a person to record the needed prompts. In addition, the Audio Works Board allows the developer to listen to the digitized prompts by using headphones. Efficient and effective interactive audio menus may then be written using a standard approach (e.g., see "PC-Based Voice Processing" by Bob Edgar, and published by Telecom Library, Inc., ISBN No. 0-936648-36-8 showing a methodology that may be used).

Once the IVR has been designed, and the prompts digitized and edited, the 'C' programs may be developed around the IVR system design. Within the 'C' language there are header files that are used to define global variables that are used within the program. Additional 'C' header files may be obtained, for example, from Voice Information Systems, Inc., and preferably feature the TI/F Dynamic Link Library, DLL, to define the functions and their respective parameters and return values used within the DLL that are used to communicate with the Dialogic Voice Board driver software running on the IVR personal computer as a "terminate and stay resident", TSR program. The DLL uses the DOS Protected Mode Interface specification to allow software in a Windows-based environment to communicate with DOS-based driver software. In the normal DOS environment, IVR systems can be developed by using state-machine software to process each event that is generated from the Dialogic voice board and standard approaches as mentioned above.

In the preferred embodiment, the software is developed in a Windows event-based environment. Since the DOS environment does not generally have the ability to efficiently handle multiple processes, the state-machine concept is necessary for the IVR software to handle each individual event for the multiple lines as they are received from the Dialogic Voice Board. The preferred embodiment includes a separate program for each voice channel, and a separate module for each audio menu, data entry prompt, and "help" prompt within each program. This modularity gives the IVR system for each channel the ability to make "decisions" based upon the events that are received from the Dialogic Voice Board. Each possible event anticipated from the voice board is defined and programmed in a single event module, which in turn passes the event to the appropriate module by using variables that are modified dynamically during the course of an IVR conversation (i.e., developed for each audio menu, data entry prompt, and "help" prompt). The various different types of events are defined by Dialogic Corporation in the Technical Manuals provided by Dialogic Corporation that accompany each D41 Voice Board, including "On-Hook", "Off-Hook", "DTMF Terminator Received", "DTMF Maximum Digits Received", "End of Playback", "Time-Out", "Silence", and "Dial Complete".

The IVR system in the preferred embodiment communicates with the on-line central computer 110 through front-end processor 130 to access Payor Information maintained in Payor Database 18. In setting up the IVR system, the developer determines when the IVR system needs to communicate with the on-line central computer, and what information the IVR system needs at various points in the conversation with the caller. The on-line central computer 110 has a set of pre-defined transactions that can be accessed by the IVR system, and returns information in a pre-defined format to the terminal emulator of computer 122. In order for the IVR system to communicate with the on-line central computer, a High-Level-Language Application Programming Interface, HLLAPI, function library that is specific to the terminal emulator can be provided to facilitate communication between the IVR system and the terminal emulator. In an exemplary embodiment, the HLLAPI function library for the terminal emulator may be the Rumba Tools for EHLLAPI (Extended High-Level Language Application Programming Interface) version 1.1 from WallData Corporation, Redmond, Wash. The function library includes a dynamic link library (DLL) that is accessed by the functions defined in the 'C' header files, also provided by the library manufacturer. Within the IVR system, the software preferably includes a communication module for enabling communication with the on-line central computer. Parameters are passed to the communication module in order for it to perform the proper transaction and return the response back to the calling module.

While the specific details of equipment and software packages are included for completeness of this example, it should be clear that other combinations of structures and software could equally be provided by one skilled in the art. In addition, the system preferably includes a plurality of customer service terminals 132, which are preferably digital personal computers, attached to a local area network running IBM 3270 SNA terminal emulation software (such as DynaComm/Elite version 3.4 from NetSoft, Inc., Laguna Hills, Calif.), and accessing the central computer 110 through a separate digital personal computer running gateway software 134 (such as AdaptSNA LAN Gateway to the Host version 4.3 from NetSoft). As will be understood, this operator administrative access may be similarly provided via any terminal or device capable of communicating with a central computer 110 (e.g. using IBM 3270 bi-synchronous SNA protocol). Customer service terminals 132 may be placed in various locations to assist Operator employees in entry of Payor Information and Payee Information, and/or to assist Payors and Member Payees in directly interfacing with the system, as described below.

The system 100 is further illustrated as including a plurality of data terminal equipment devices (e.g. 140) capable of creating, transmitting, receiving, interpreting, and processing data files between Payees and the system 100 over PDN 114 using standard communications protocols such as asynchronous X.25, X.400, TCP/IP, and 2780/3780 Remote Job Entry, or IBM 3275 polled bi-synchronous terminal emulation. Exemplary data terminal equipment 140 might include personal computers, mini computers, main frame computers, a magnetic tape device, and other equipment which may be used to perform these functions. Data may be similarly communicated between a Member Payee, or its representative, and the central computer 110 via data terminal equipment through the PDN 114, the packet assembler/disassembler, the communications interface, or via dial-up telephone lines or leased lines as described above.

Data may be communicated between a Payor and the central computer 110 in several ways, including via a remote digital personal computer 112 through the PDN 114, communications interface assistors 116, and dial-up telephone lines 144; via a touch-tone telephone device 120 through the PDN 114 directly to an IVR system; via a remote digital personal computer 112 through a leased line 148; via an analog voice telephone device 120 through the PDN 114 to establish a person-to-person conversation with a CSR employed by the Operator and using a customer service terminal 132; via a plurality of automated teller machines such as the NCR 5085 from NCR Corporation, Dayton, Ohio using X.25, TCP/IP, IBM 3270 SDLC terminal emulation; and/or by sending a written request through the mail (e.g. United States Postal Service, or other equivalent service) to the CSRs of the Operator using a customer service terminal 132.

In the preferred embodiment, PDN 114, communications interface assistors 116, and dial-up telephones 120 are entirely conventional and are preferably operated and maintained by a local or regional telephone company capable of performing these tasks. PDN 114 may comprise, for example, a conventional PDN which communicates data packets in CCITT X.25 protocol (as defined in Malaga-Torremolinos in 1984, and Melbourne in 1988) between a computer 110 and a packet assembler/disassembler; and the asynchronous communications interface may comprise conventional telephone company operated subsystems which convert X.25 packet protocol existing on the PDN 114 into conventional asynchronous data format (e.g. with seven or eight data bits, a start bit, a stop bit and conventional error checking fields).

Preferably, system 100 performs asynchronous data communications through PDN 114 within a protocol translator 118 and a digital personal computer interface processor 152, which initiates and answers dial-up telephone communications with remote digital personal computers 112 and data terminal equipment 140. Thus, remote digital personal computers 112 may interface with system 100 using standard asynchronous protocol, while a Member Payee data terminal equipment 140 may interface with system 100 using a protocol that is standard and conventional for whatever particular type of data terminal equipment is being used by the Member Payee. In a preferred example, central computer 100 may interface with the digital personal computers 112 using standard 3270 Physical Unit 2.0 and Logical Unit Type 0 protocol, with conversions between the two protocols (as well as distribution of the signals generated by the central computer to specific remote digital personal computers) accomplished with a protocol converter front-end computer (which may include hardware and software to accomplish the requirements of both protocol translator 118 and personal computer interface 152 in a single device) such as a Stratus Model R25 available from Stratus Computer Inc. of Detroit, Mich. which may communicate with conventional PDN 114 equipment that may also handle protocol conversion and the packet assembler/disassembler and communications interface provided by the telephone company.

Many of the customer service terminals 132 in the preferred embodiment are digital personal computers that access the central computer 110 via IEEE 802.3 standard ethernet 10baseT physical connectivity in a local area network using IPX/SPX protocol through a digital personal computer running gateway software 134 between the local area network and a token ring network into the front-end communications processor 130, such as the IBM 3745 Front-End Processor, and then into the central computer 110.

Central computer 110 is also shown as electronically communicating with additional remote data processing systems at a TCF, a TCFlnterfaceBank and a Payee. It is also contemplated that central computer 110 may electronically communicate with other remote data processing systems such as those at a Bank and/or third party information or service provider. Such electronic communications may be over dial-up telephone lines, leased telephone lines, or other special communications arrangements/protocols (e.g., magnetic tape transfer or the like). The electronic communications between the central computer 110 and a TCF, a TCFlnterfaceBank and a Bank permit monetary and non-monetary information to be sent and received. The electronic communications between a Payee, a Payee's agent, or other third party information or service provider allows central computer 110 to communicate payment-related data, non-payment related data, statements, and reports, as discussed below.

Figure 6:
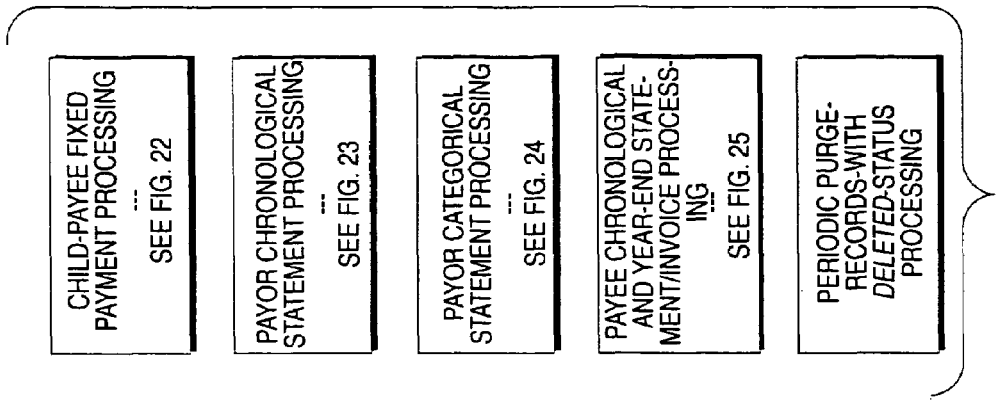
FIGS. 4–6 illustrate a general overview of the operation of system and a preferred flow of transactions into and out of the system.
Figure 5:
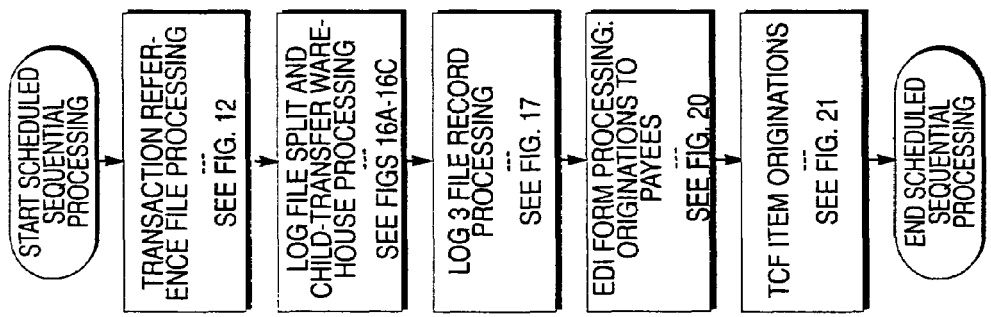
Figure 4:
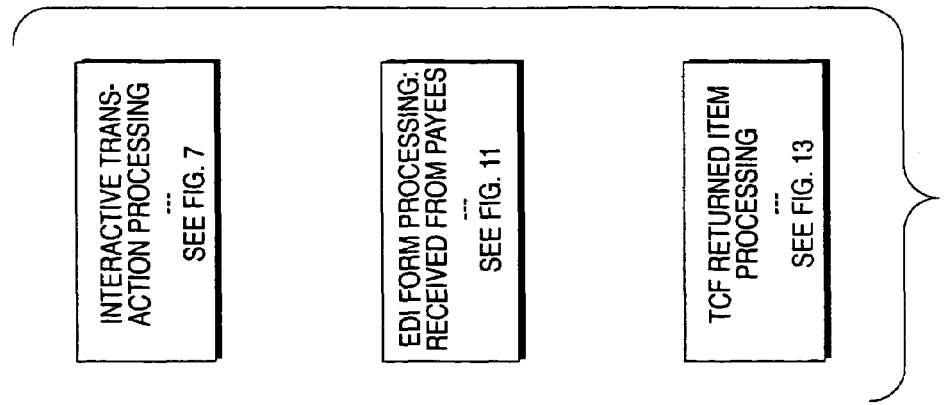

Turning now to the other drawing figures which illustrate various combinations of structures, procedures, and detailed logic for an exemplary embodiment of the present invention, FIGS. 4–6 illustrate a general overview of the operation of system 100, and a preferred flow of transactions into and out of the system when employed in the manner contemplated herein. Particularly, FIG. 4 depicts various unscheduled processing tasks undertaken by the system which occur on a predetermined basis such as on a periodic (e.g. daily) basis.

Payors have the ability to add, modify, or delete Child-Payee records, and the parameters that control the processing of payments for that particular Payor through system 100. Because the Payor may initiate the addition of a Child-Payee, deletion of a Child-Payee, or modification of information regarding an existing Child-Payee Record or payment parameters for any of its Child-Payee Records, it is preferred that system 100 be constructed with the ability to properly receive such input as an unscheduled event.

As mentioned above with respect to FIG. 3, system 100 has a payor control interface that preferably includes the protocol translator 118, and personal computer interface processor 152, the IVR 122, the front-end communications processor 130, the central computer 110 and various on-line files (e.g. 160), to receive, translate, and store Payor Information as appropriate. It is preferred that the payor control interface for receiving such information further includes interactive devices which provide Payors with convenient access to the system 100 from remote locations. Particularly, FIG. 3 illustrates examples of such interactive devices, including digital personal computers 112, telephone devices 120, ATM machines 150, or person-to-person conversations with (or mail delivery of instructions to) a CSR who can input such information via the customer service terminals 132. Payor Information is preferably processed into system 100 via one of the pre-defined interactive procedures illustrated in FIGS. 7, 8A–8L, or 10A–10I.

As an example, a Payor may utilize the payment control apparatus of system 100 via an interactive device such as a digital personal computer 112 through PDN 114 and the computer interface 118, 152 illustrated in FIG. 3, whereupon a menu driven interactive procedure enables the Payor to input any of a variety of Payor Control messages. FIG. 7 illustrates the architecture for a preferred interactive response system of the present invention, wherein a main menu is provided for use by the Payor. As shown in FIG. 7, the menu is "device dependent", meaning that a menu is provided to the Payor in an appropriate and convenient format, and only activities which may be accessed by Payors are allowed. For example, with an interactive device such as a digital personal computer 112, the menu is displayed on the monitor, prompting the Payor to select a menu function or to directly enter one of the transactions displayed, while communication via telephone lines would provide an audible menu or similar prompts and instructions for selection of a transaction or activity via IVR 122.

As seen in FIG. 7, the Payor may preferably choose one of a number of activities, including selected Payor activities (shown in FIGS. 88, 8D, 8F, 8G, 8H, 8I, 8J, 8K and 8L), or Payor Child-Transfer activities (shown in FIGS. 10A–10I). As explained below, there may be some activities which are not directly available for some of the system's users. For example, the Payor Child-Transfer activities and the Payee activity choices are generally available for interactive input only by CSRs, who can access all Payor, Payee and Payor Child-Transfer activities. While a Payor may initiate the addition of a Child-Payee to its Payor Record, the actual input of the Child-Payee record is preferably undertaken, or at least checked and approved, by a CSR to ensure proper completion.

Following FIG. 7, the interactive response portion of the present invention enables CSRs to access system 100 as desired to add a new Payee and related Payee Information (e.g., add a new Payee Record to system 100). Payee Information provided to system 100 includes the Payee name, address, Payee BankAccountID, Payee BankID, default maximum payment amount, payment type (e.g. Negative or Positive), default Minimum Interval, Provisional Period, and the like.

Figure 8A:
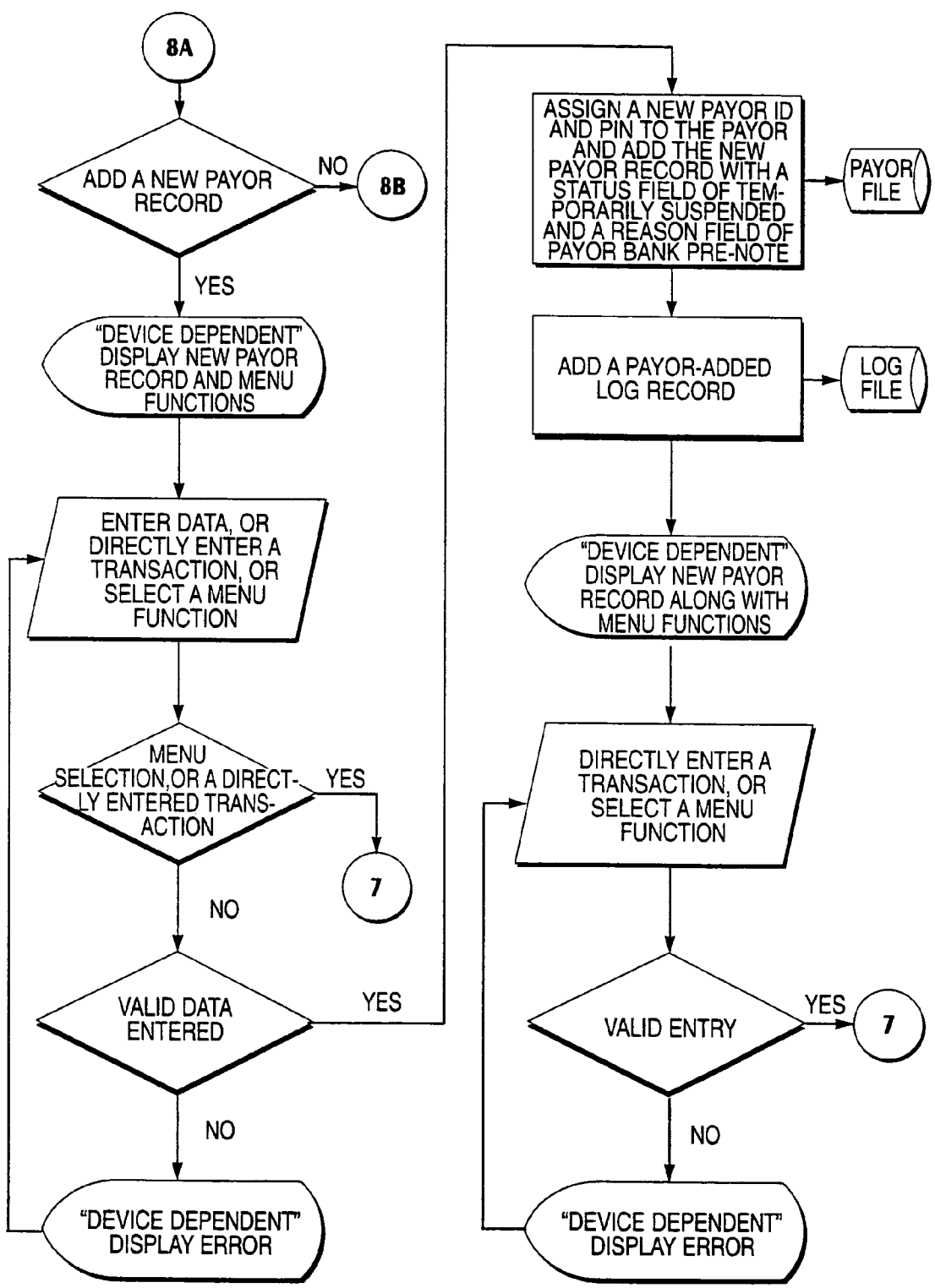

Add a New Payor Record

Where an interactive transaction includes Payor activities, selection of that menu function results in an appropriate device dependent display, as shown in FIGS. 8A–8L, respectively. As an example, if a Payor accessed system 100 via a digital personal computer 112, a screen menu provides a subset of the options shown in FIG. 7. FIG. 8A shows a Payor activity which can only be completed, in the preferred embodiment, by a CSR of the Operator, and so this option does not show as an option to a Payor. If the CSR correctly enters all of the applicable Payor Information when adding a new Payor, a new Payor Record is added with a status field value of Temporarily Suspended and the Payor is assigned a PayorID. This Payor Record is preferably stored in the on-line files 160, in a sub-file designated as the Payor File or Database 18. In addition, a Log Record relating to the new Payor Record is placed in the Log File storage of on-line files 160. As explained in more detail below, the status field value of Temporarily Suspended may be used during the initial start-up period while validation of the Payor BankID, Payor BankAccountID, and other Payor Information is being completed.

Change an Existing Payor Record

Figure 8B:
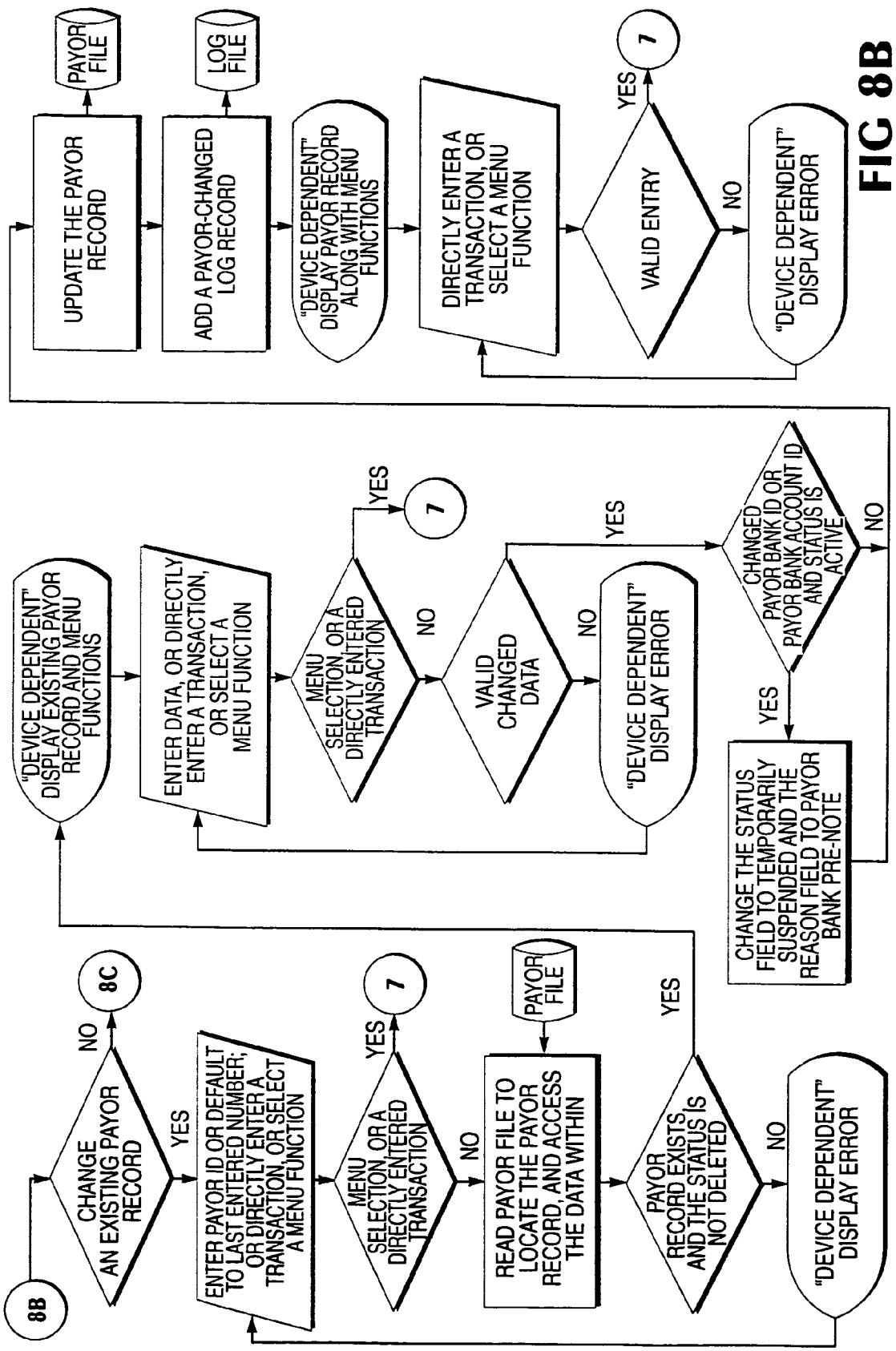

An existing Payor Record may be changed in accordance with the flow logic of FIG. 8B, wherein the PayorID is entered so that the Payor Record may be accessed from the on-line files 160 (i.e. from the Payor File). As mentioned above, this is an activity which is preferably directly accessible by a Payor, through the interactive devices and Payor control messages described herein. As noted in FIG. 8B, if the Payor Bank information (e.g., Payor BankAccountID or Payor BankID) is changed, the status field of the Payor Record is set to the value of Temporarily Suspended to enable verification of the new information. A Log Record is also prepared and stored in the on-line Log File as shown in FIG. 3.

Set Payor Record to Temporarily Suspended/Active

Figure 8C:
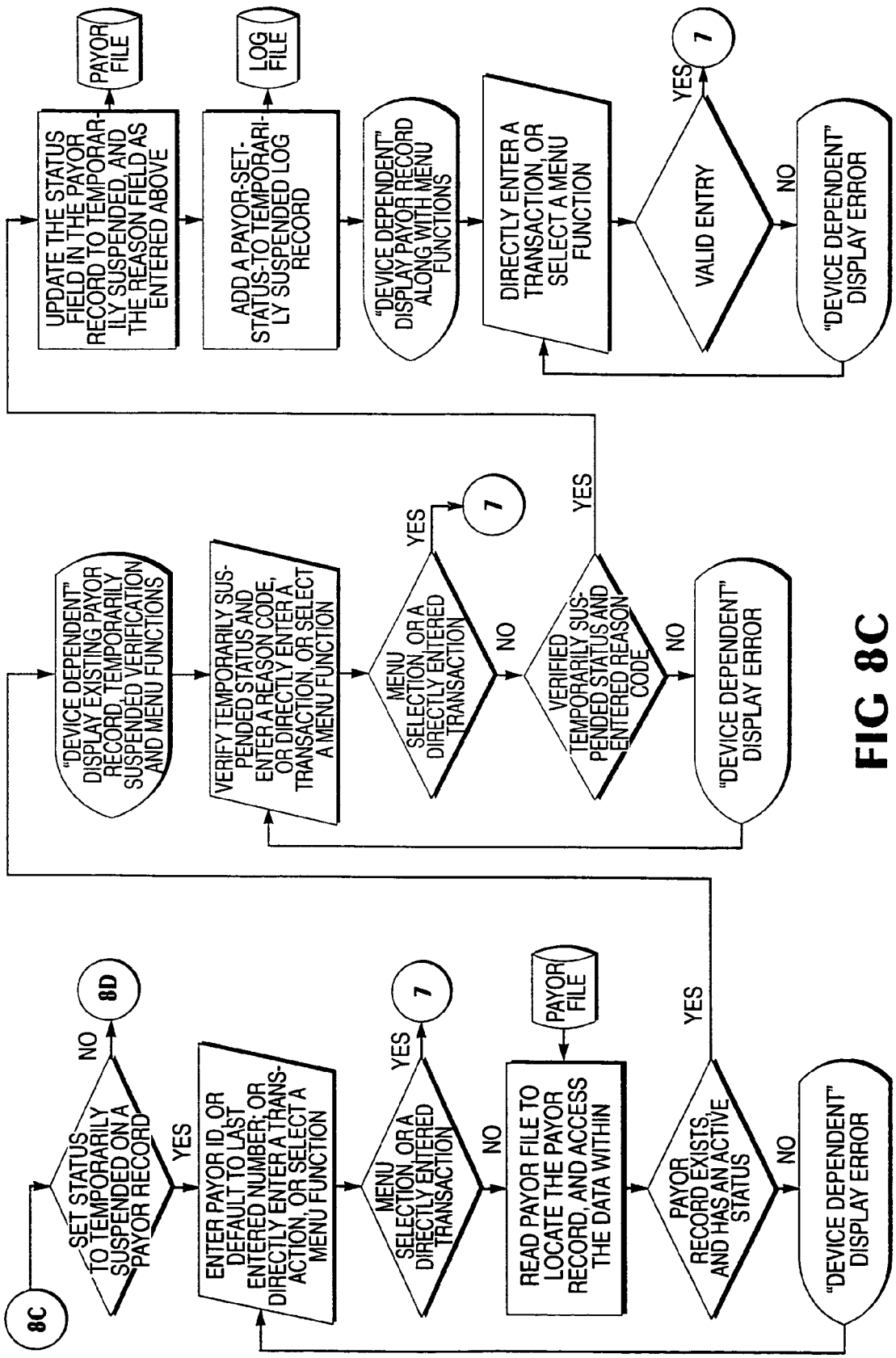
Figure 8D:
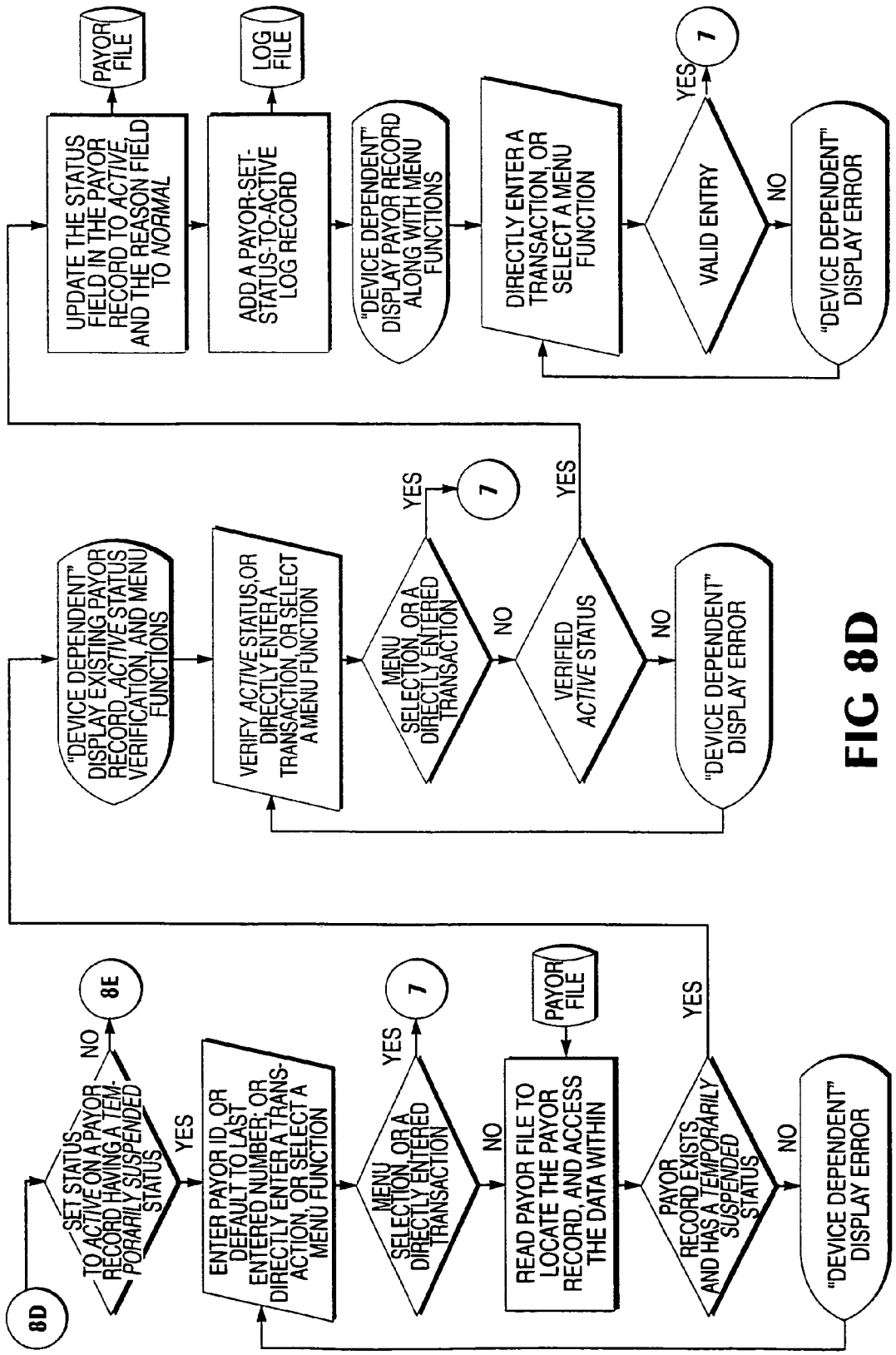

FIG. 8C illustrates the preferred interaction of procedures and equipment for setting an existing Payor Record status field to Temporarily Suspended. FIG. 8D shows the similar interaction with system 100 for changing an existing Payor Record with a Temporarily Suspended status field value to an Active value. As discussed below, the activities shown in FIGS. 8C and 8D are for suspending the entire Payor (i.e. not just one particular Child-Payee for a Payor), and for reactivating the entire Payor. Suspension of individual Child-Payee records is shown in FIGS. 8I–8K, as discussed below.

The status field value of Temporarily Suspended is utilized to handle situations where a new Payor Record or new Payee Record has been added and the applicable Payor Information or Payee Information is being verified by the Operator. The present system preferably utilizes a Pre-Note process, where a notice of a change or addition of a particular record is circulated for review, with instructions and/or predefined requirements that the change or addition is implemented within a predetermined number of days (e.g. 10 days). In this way, a predetermined expiration date is established for each Pre-Note, and unless the recipient of the Pre-Note notifies the Operator of a problem, once the expiration date passes, the status of Temporarily Suspended is automatically modified in the system to an Active status. Temporarily Suspended status may also be implemented as shown in FIGS. 8C and 8D to accommodate any variety of other temporary situations where a Payor must remain inactive temporarily.

Set Payor Record Status to Permanently Suspended

Figure 8E:
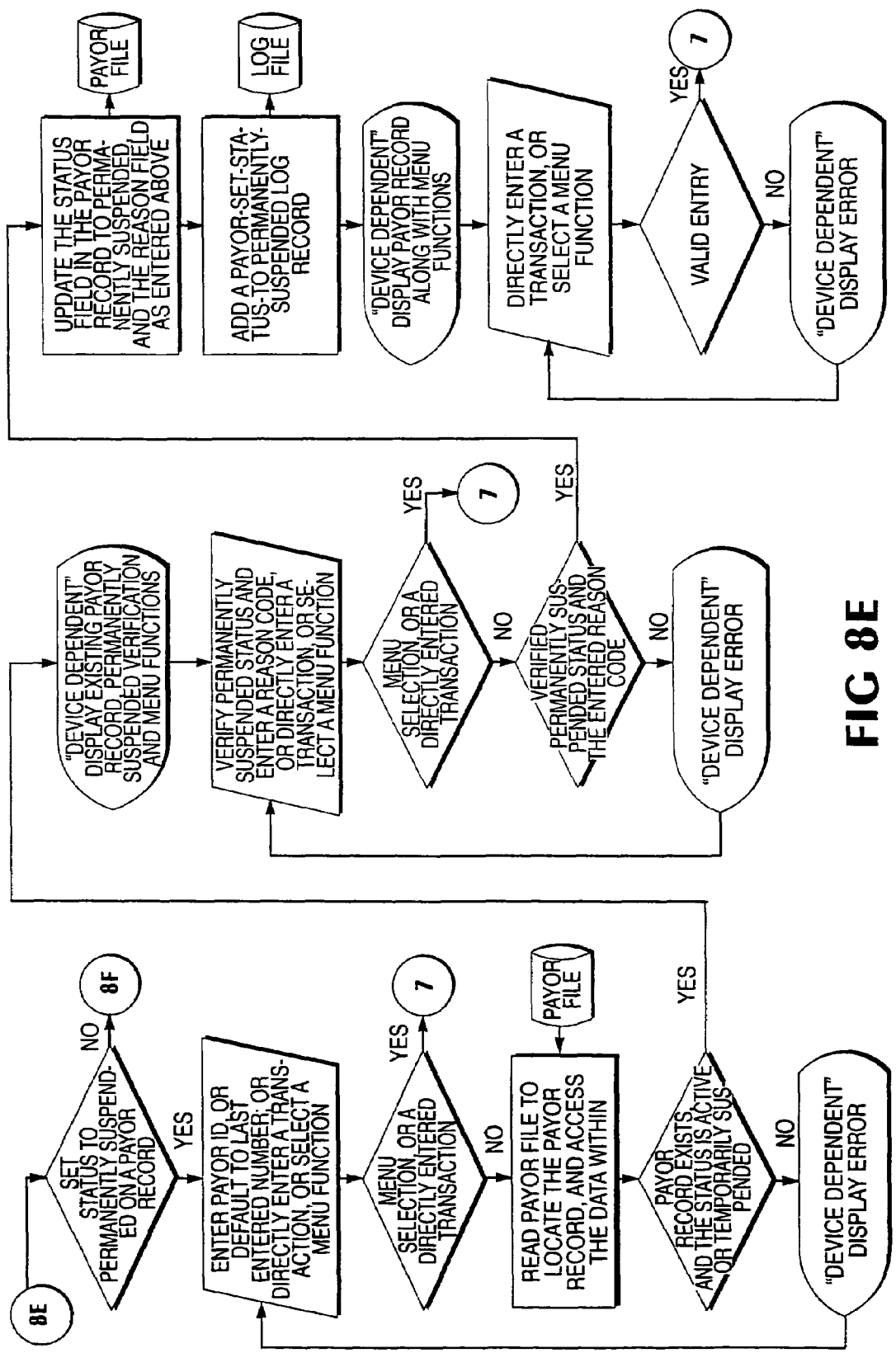

FIG. 8E illustrates a situation where an existing Payor Record is permanently suspended (i.e. where the Payor is not reactivated). In the present system, a Payor Record which is Permanently Suspended remains in the on-line files 160 for a period of time, at which time the record status field is changed to a value of Closed, and preferably purged from the system at a predetermined date in the future.

Change PIN on a Payor Record

Figure 8F:
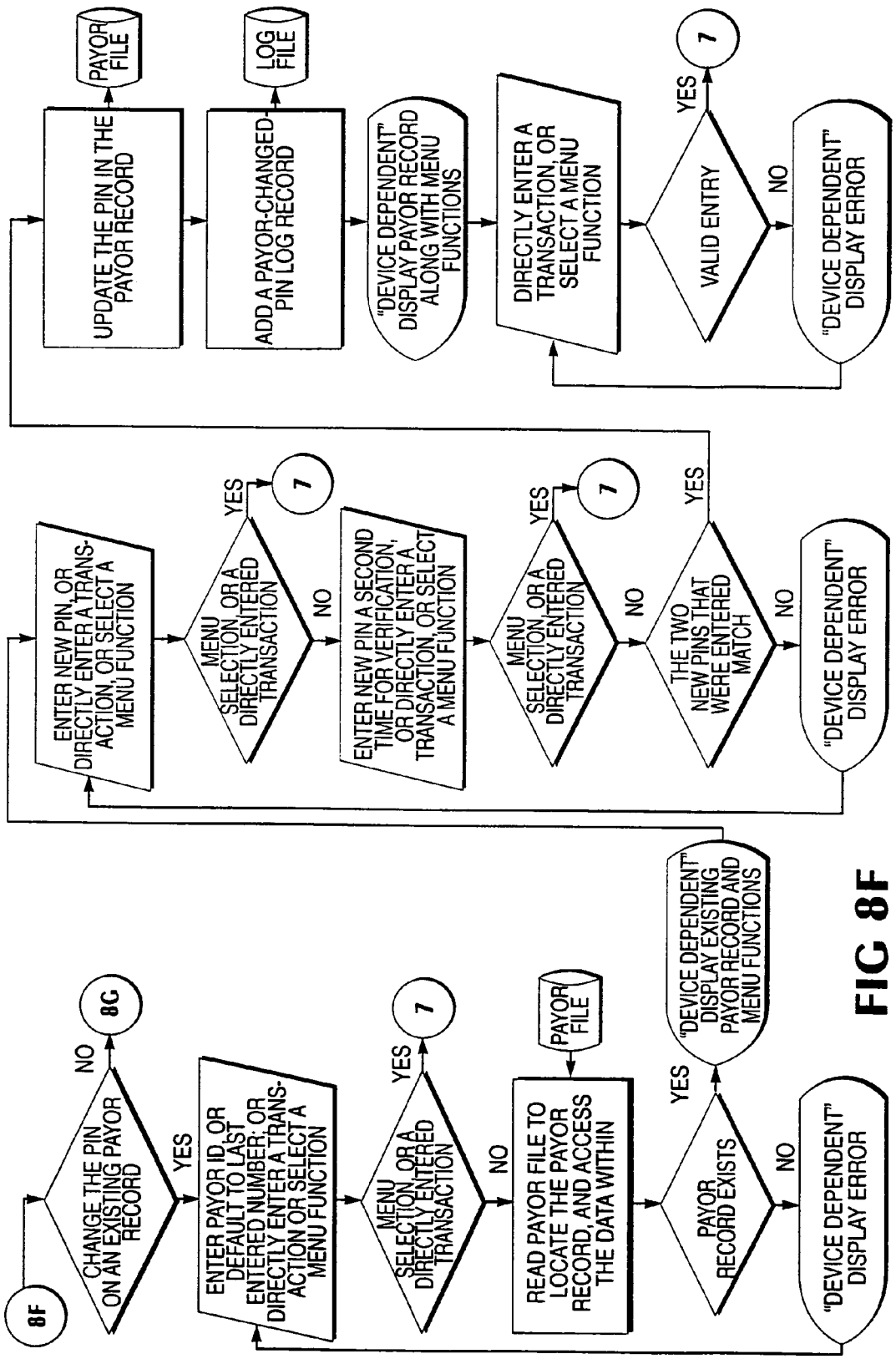

FIG. 8F shows a similar flow chart depicting the equipment and procedure interaction for changing a PIN for an existing Payor Record. Such a change is necessary, for example, if security of an existing PIN has been breached.

Add a Child-Payee Record

Figure 8G:
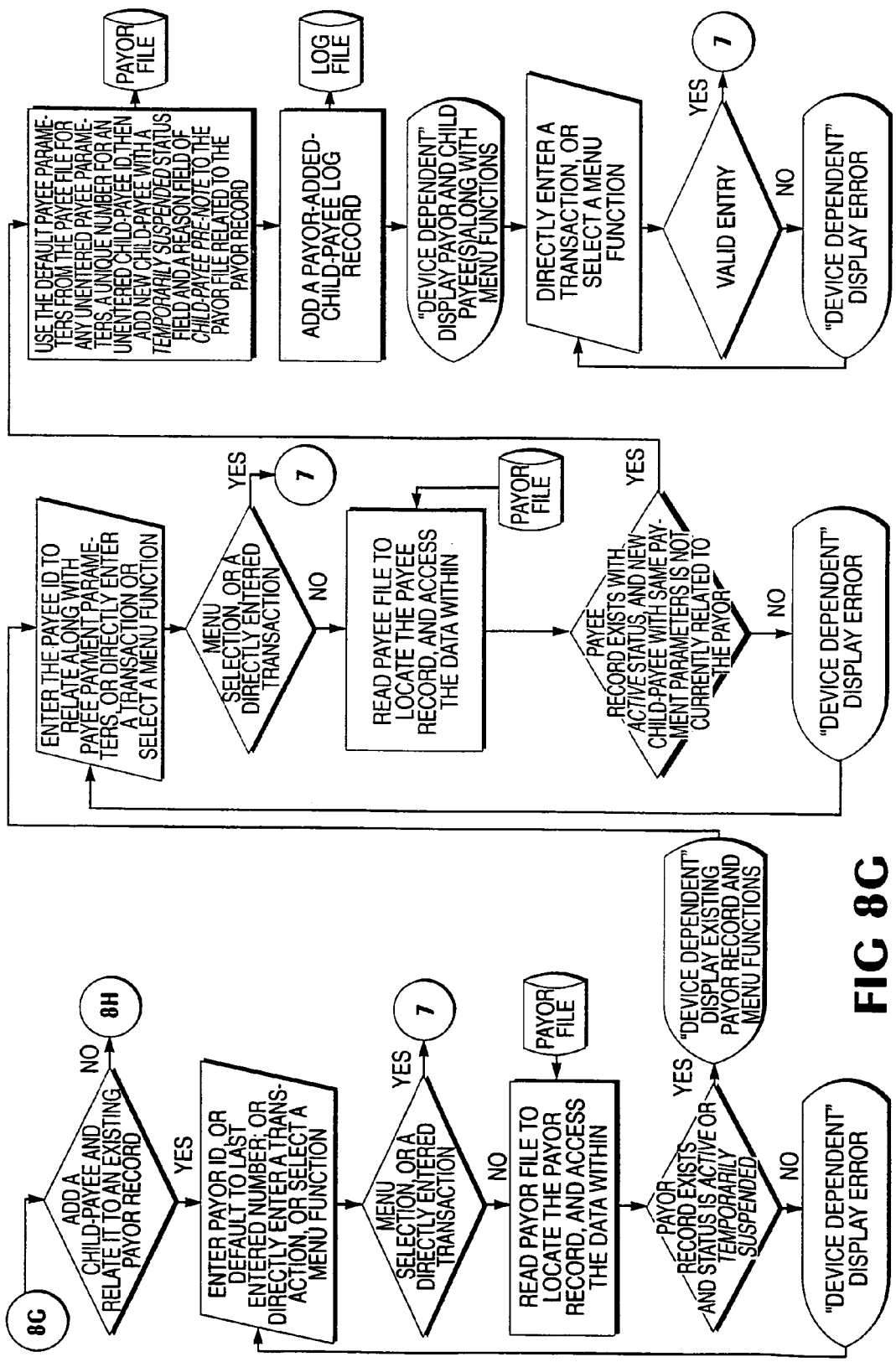
Figure 8I:
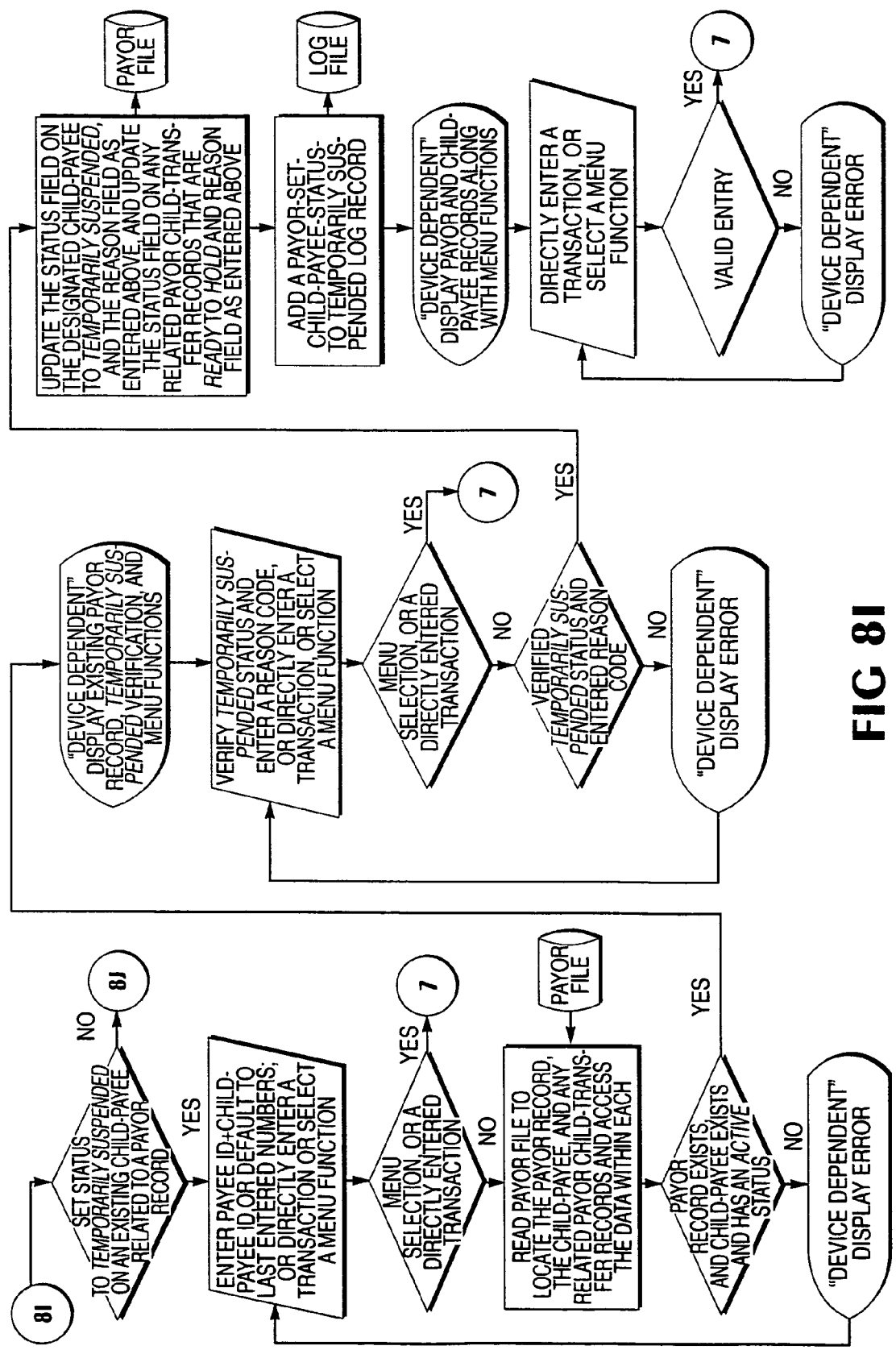
Figure 8J:
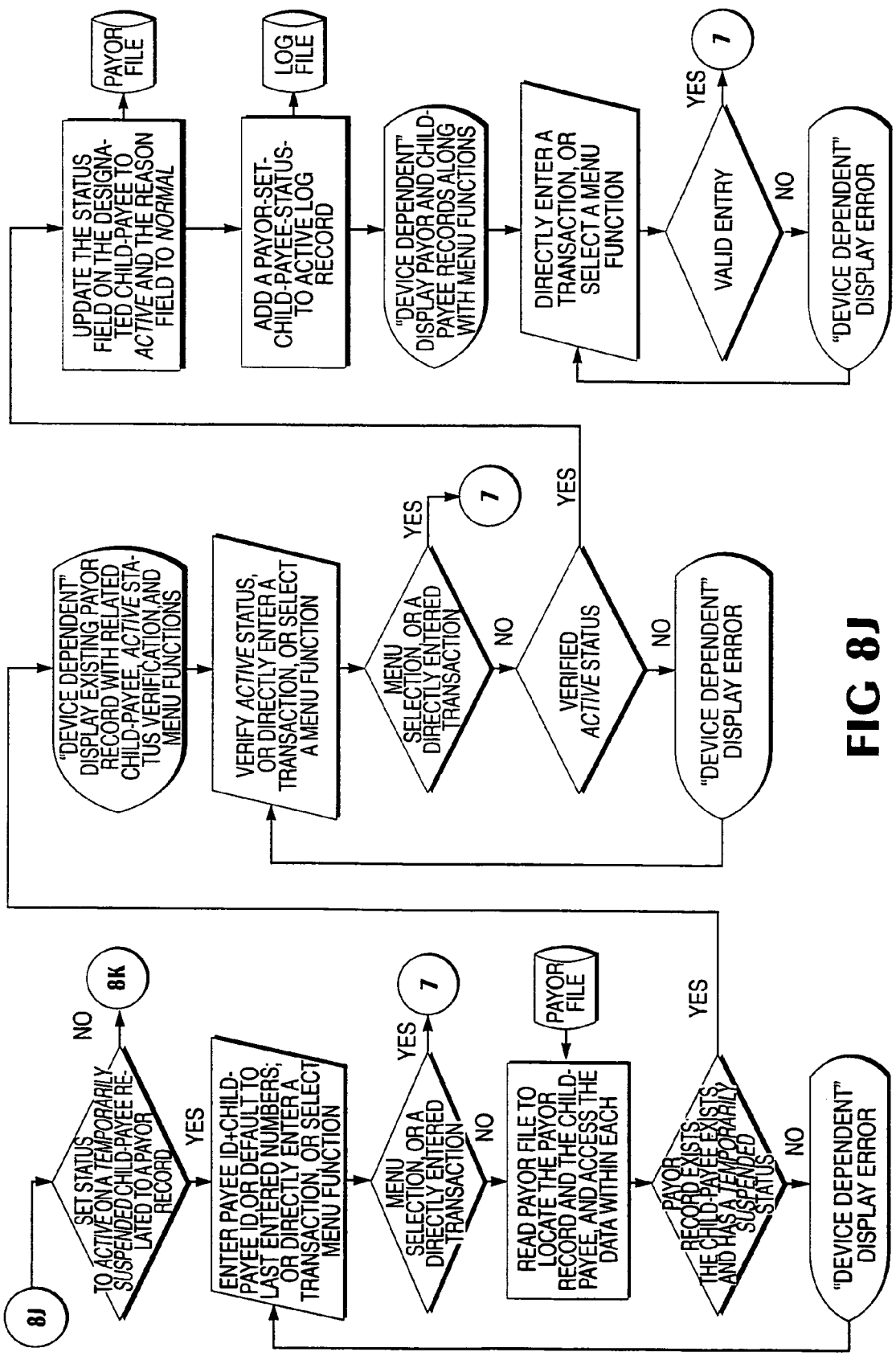
Figure 8K:
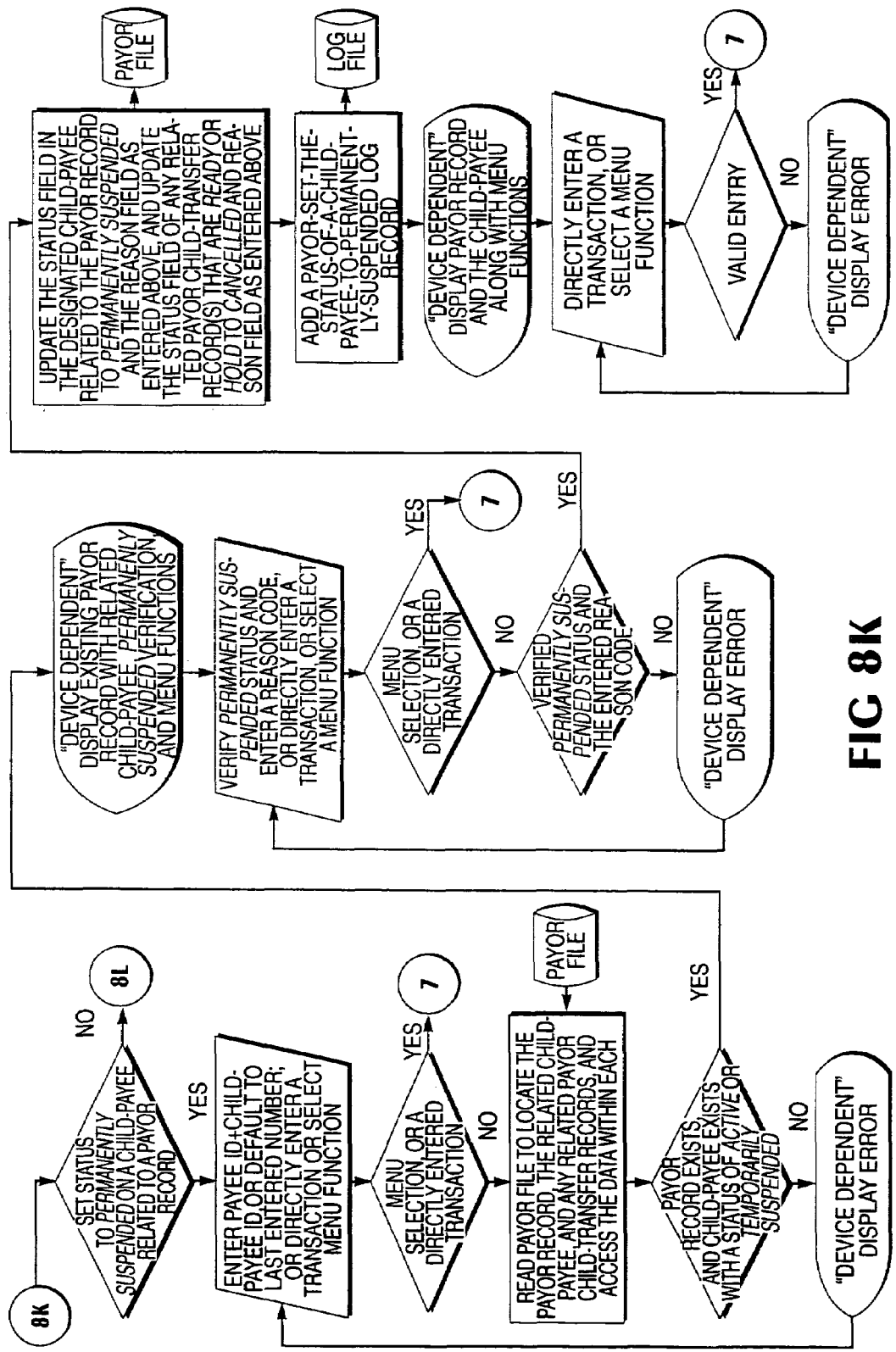

FIG. 8G shows the steps for adding a Child-Payee record. As explained in more detail below, the PayorID is utilized to access the Payor Record within the Payor Files maintained on system 100 in the on-line files 160. It should be noted that on-line files 160 do not necessarily need to be set-up for "real time" access or use. In fact, in the preferred embodiment, they are not utilized in a "real time" application. When a Child-Payee record is added, system 100 checks the Payee Files to ensure that the Payee to be added as a Child-Payee for this particular Payor is an existing Payee (i.e., a valid Payee Record exists in the on-line file 160). If a Payee Record does not exist on system 100, an appropriate indicator is provided to the Payor. It is contemplated that Payor requests for additions of new Payee Records be preferably accomplished through interactive devices.

Also, importantly, when a Child-Payee record is added, default Payee parameters for the particular Payee are set up in the Child-Payee record unless specifically altered by the Payor. These parameters include the default maximum payment amount, payment type (e.g. Negative or Positive) and Minimum Interval. Particularly, for each Child-Payee record, the Payor may set predetermined parameters and preferences, such as the maximum permissible Bill Data amount which is automatically paid by system 100 for this Payee, timing for initiation of payment of Bills (e.g. 5 days prior to due date, etc.), and possibly other variables. Often a Payor may want to set a different maximum payment amount, which is the maximum amount the system automatically pays for an obligation. Once set up, the Child-Payee record is saved in the Payor File and a Log Record relating to such Child-Payee record is placed in the Log File storage of on-line files 160.

It is also contemplated that Child-Payee records are preferably provided with a payment type field designating a Child-Payee as either Negative or Positive. If designated Positive the system does not accept and process Bill Data from the applicable Member Payee for the purpose of creating Payor Child-Transfers for such Child-Payee of the Payor to system 100. Consequently, the Payor has to add, either interactively or through a CSR, the information corresponding to the Bill Data a Payor sends to system 100 to create a Payor Child-Transfer record whenever the Payor wants the system to pay the obligation. If the payment type is Negative, the system accepts and processes Bill Data from the applicable Member Payee or the corresponding data from the Payor for the purposes of automatically creating Payor Child-Transfers for such Child-Payee.

For Bills of a fixed amount, it is also contemplated that the Child-Payee record contain fields so that necessary Bill Data can be added to the applicable Child-Payee record so that such Bills may be processed and automatically paid by system 100. It should be noted that such Bill Data is added to the Child-Payee record only when the payment type is Negative.

It is contemplated that the Child-Payee record contain a Child-PayeeID. If the Child-PayeeID is not assigned by the Payee or such information is not available when the Child-Payee record is initially established, the system assigns a unique identifier as the Child-PayeeID.

Change an Existing Child-Payee Record

FIG. 8H similarly shows how an existing Child-Payee record may be modified or changed by the Payor at any time through the interactive devices of the system.

Set Child-Payee Record Status to Temporarly Suspended/Active

FIGS. 8I and 8J show Payor activities which allow the status of a Child-Payee record to be set by a Payor to Temporarily Suspended, and reactivated from Temporarily Suspended, respectively. These activities are necessary if, for example, a Payor has a dispute with a Payee and wishes to suspend payment to that particular Payee until the issue is resolved. Upon resolution, the Child-Payee record may be returned to the Active status.

Set Child-Payee Record Status to Permanently Suspended

FIG. 8K shows another Payor activity which enables the status of an existing Child-Payee record to be set to Permanently Suspended by the Payor. This process is performed if, for example, a Payor is no longer dealing with a particular Payee through the system 100.

Payor Requests to Become a Customer of a Payee

Figure 8L:
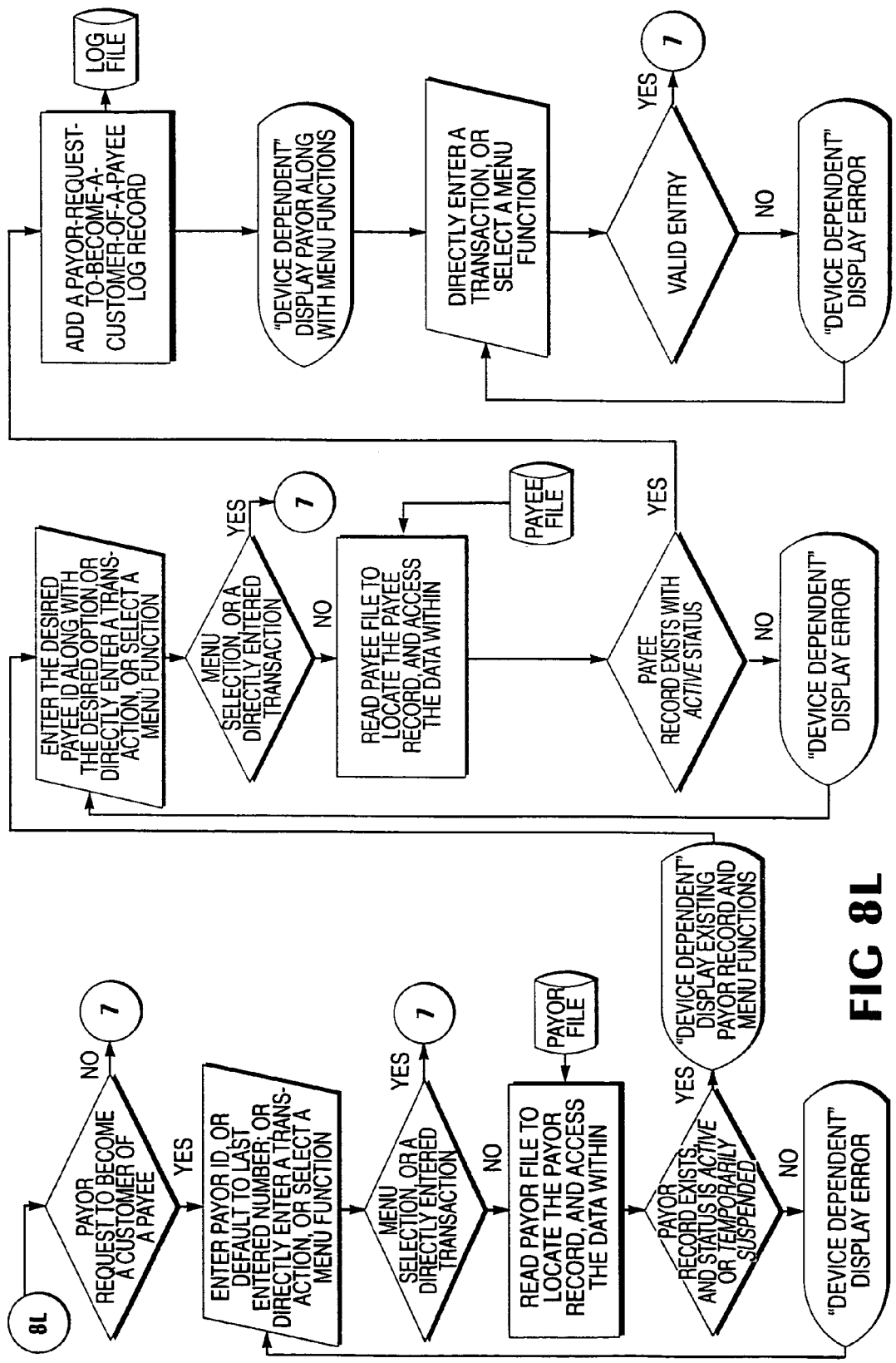

Finally, FIG. 8L shows a Payor activity which enables a Payor to request to become a new customer of a Payee. Obviously this activity is only initiated when the Payor is not already a customer of the Payee. This activity does not establish the Payee as a valid system Payee for such Payor (e.g. no Child-Payee record is established) for Bill payment purposes. Establishment of a Child-Payee record for a Payee is described above and is illustrated in FIG. 8G.

This Payor activity is envisioned for use with information made available to Payor regarding Payee recurring services. For example, Payee service or promotional information may be mailed to Payors or presented, preferably interactively, through a menu to the Payors. Payors seeking additional information may select menu options that result in EDI forms or messages being transmitted to Payees through Payee mailboxes (described in more detail below) identifying the Payors that want to receive additional information. The menu options may further include one or more options that if selected by a payor provides the requiste information to the function discussed above for creating Child-Payee records for the Payor. The Child-Payee Record in the Payor Information may then be used as a recurring data file of bill data so the bill generator generates Child-Transfer Records at predetermined times for payment of the Payee providing the service or good on a recurring basis. The payor selects the payee service option by sending a payor control message having a selection directive through the payor control interface. The Payee is notified by an EDI form via a Payee mailbox that a Payor has selected a service offered by the Payee so the Payee may commence the service. For example, the Payee may be a magazine publisher and the menu option may be for a recurring monthly magazine. The recurring data in the Child-Payee Record created after the Payor selects the Payee service option is used to generate a Child-Transfer Record each month for the magazine and the Payee is notified in the Payee mailbox to supply the magazine to the Payor. Thus, once the Payor selected the menu option initiating the magazine subscription, the Payee publisher is paid each billing cycle until the Payor takes action to terminate payment of a bill or to deactivate the Payee of that Payor. It should be understood that additional Payor activities may be added to the system, and that the particular activities described with respect to FIGS. 8A–8L are provided only as exemplary of the preferred activities.

Payee Activities

Figure 9A:
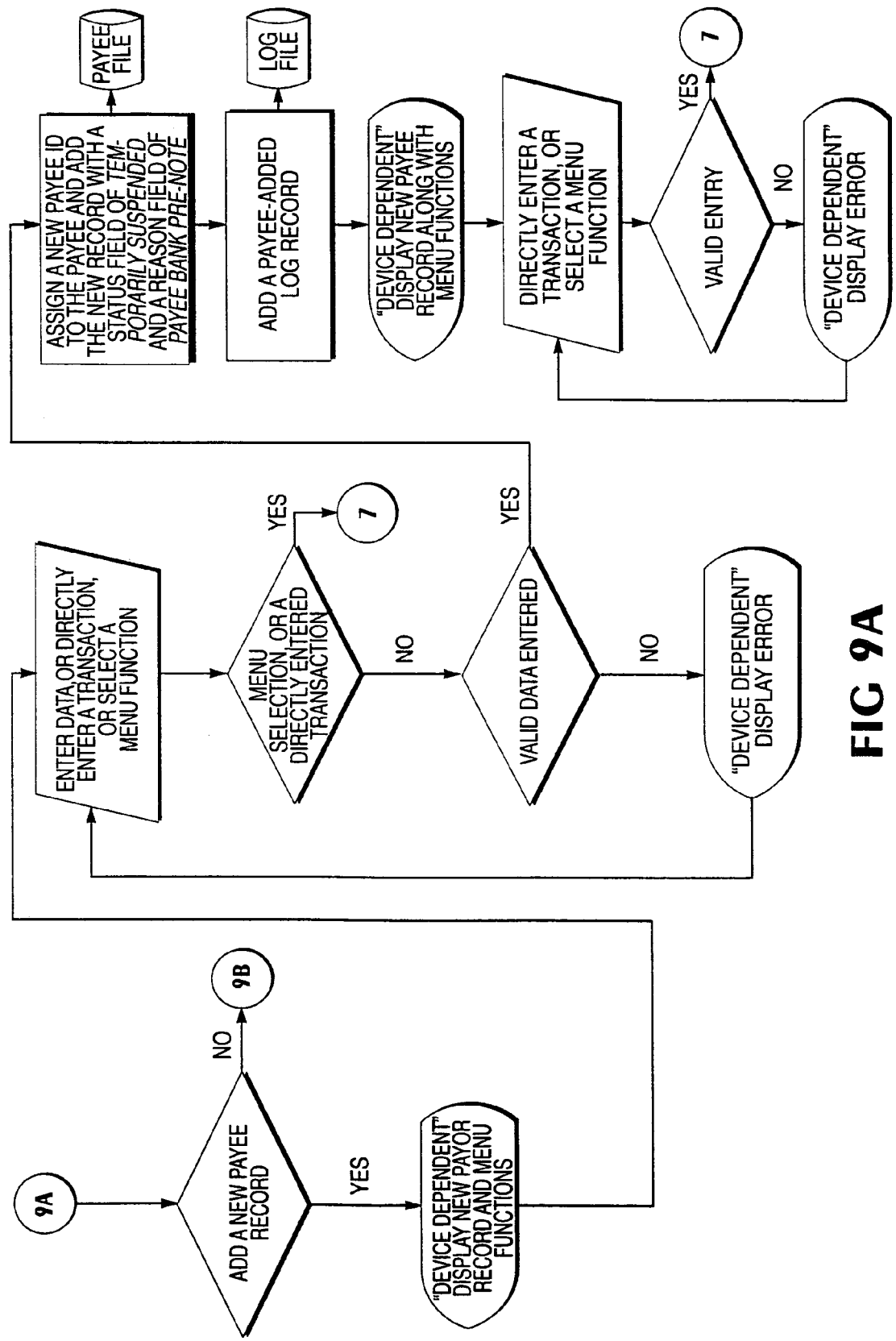

As discussed above, various Payee activities for entering Payee Information (e.g. adding, modifying, or deleting particular information from existing Payee Records, or the like), are illustrated in FIGS. 9A–9E, and are directly tied to the main menu loop shown in FIG. 7. Particularly, FIG. 9A shows the addition of a new Payee Record in a manner similar to the addition of a new Payor Record described above with respect to FIG. 8A. As illustrated, a new Payee Record is assigned a PayeeID and added to the Payee File in the on-line files 160 with a status field value of Temporarily Suspended pending expiration of the Pre-Note verification process mentioned above. In addition, a Log Record relating to the new Payee Record is placed in the Log File storage of on-line files 160. FIG. 9B shows similar procedures as described above with Payor Records for changing existing Payee Records.

Figure 9C:
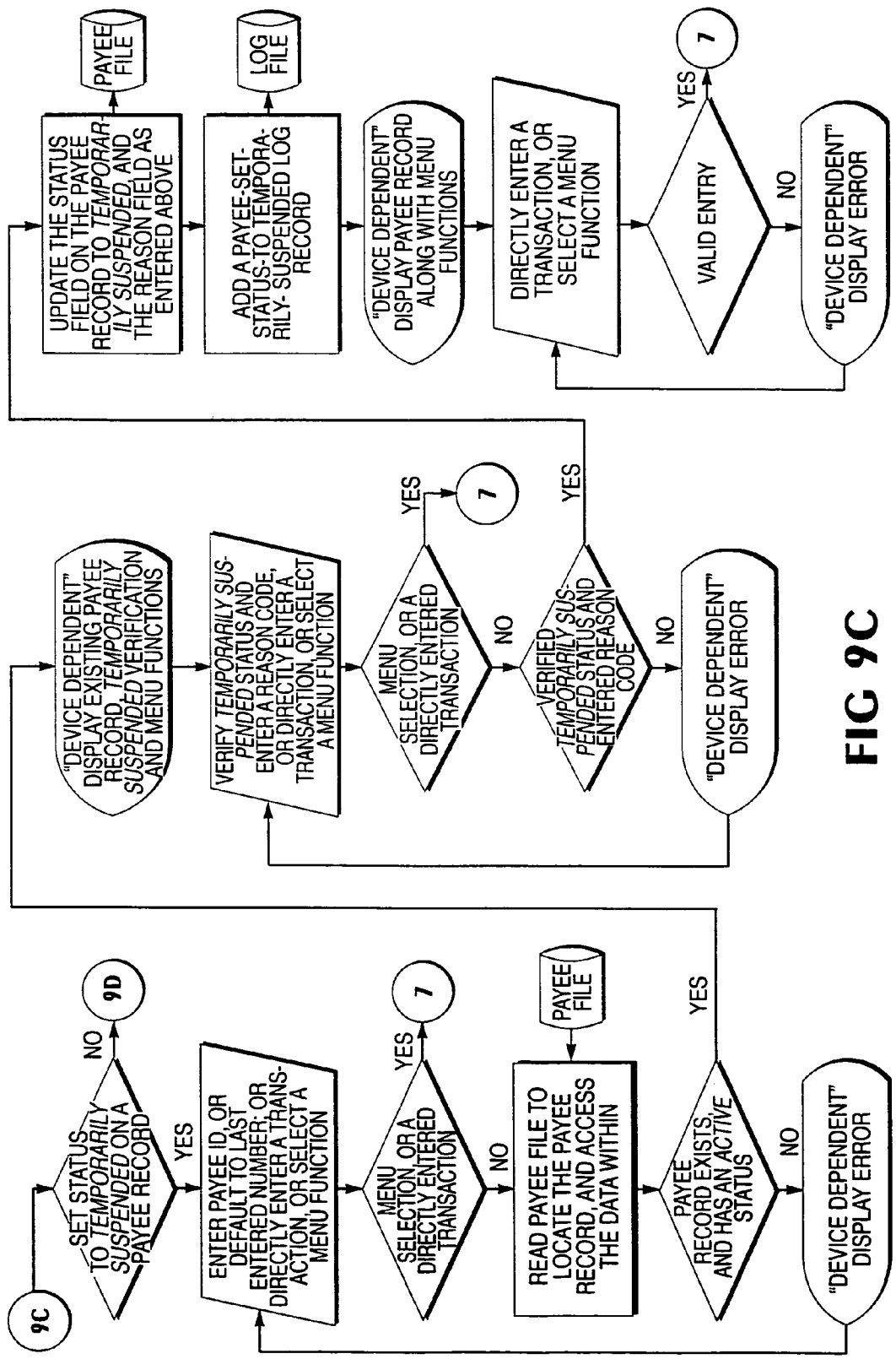
Figure 9D:
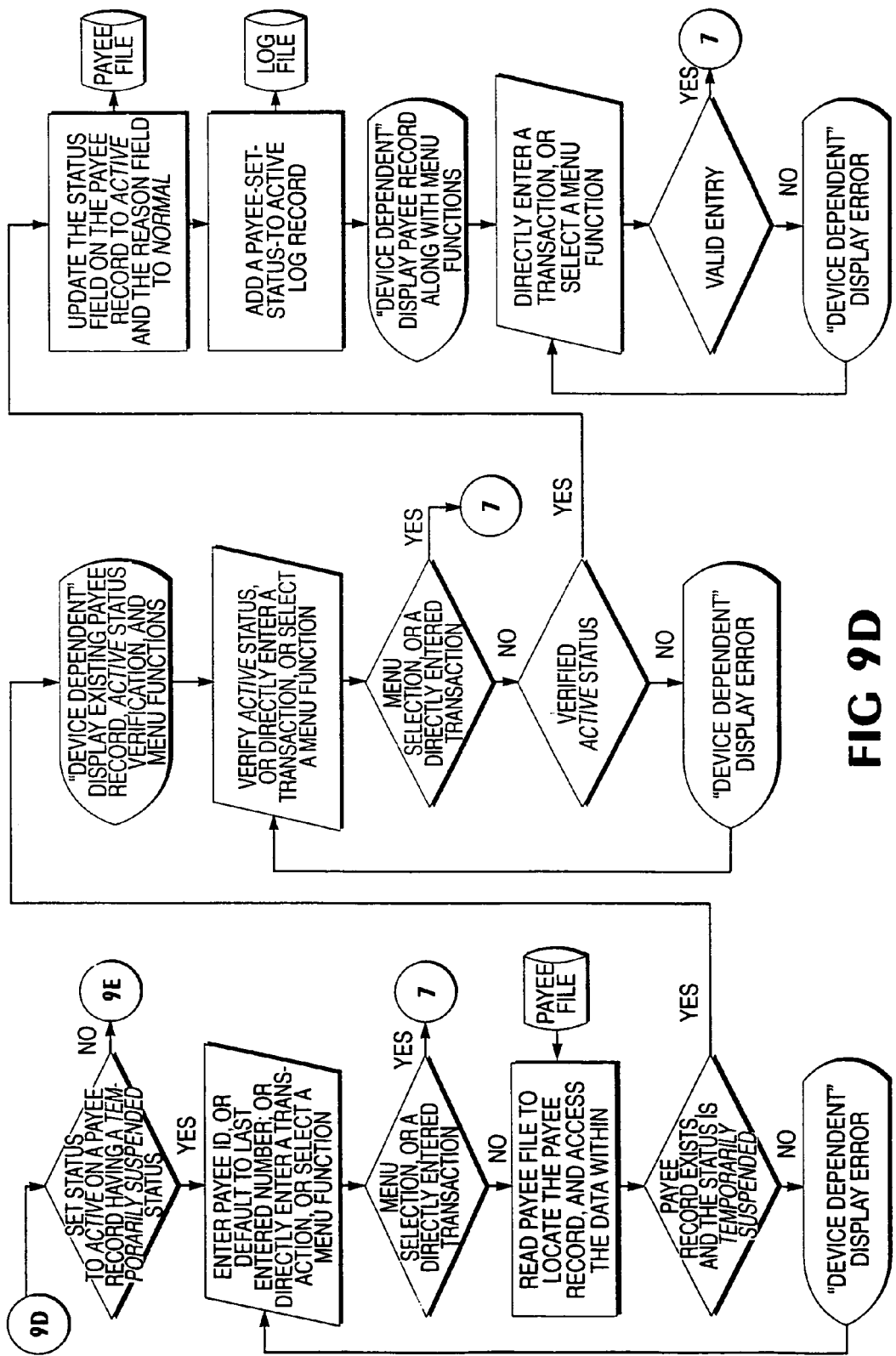
Figure 9E:
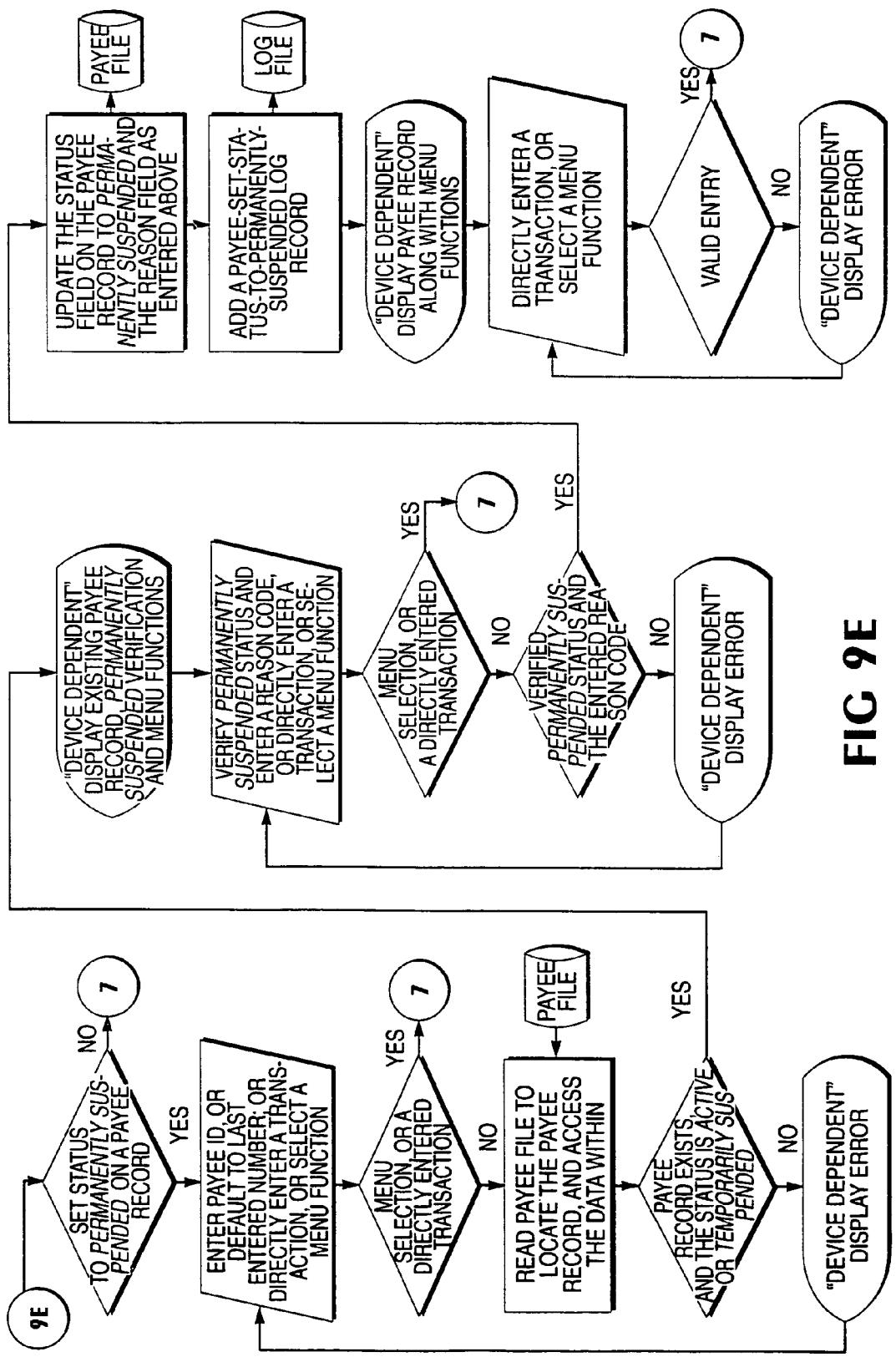

It should be kept in mind that the Payee activities of FIGS. 9A–9E are generally initiated only by the Operator, and most frequently are entered into system 10 by a CSR via the customer service terminals 132. Again, if changing a Payee Record entails the alteration of particular critical fields (e.g. Payee BankAccountID or Payee BankID) the status of the Payee Record is changed to Temporarily Suspended pending the completion of the Pre-Note verification process mentioned above. FIGS. 9C and 9D show details of activities for setting the status of an existing Payee Record to Temporarily Suspended, and reactivating a Temporarily Suspended Payee Record, respectively. Finally, FIG. 9E shows the activity of setting a Payee Record to the status of Permanently Suspended, where a particular Payee is no longer an active participant in the system.

As also illustrated in FIG. 7, unscheduled processing activities may include Payor Child-Transfer activities shown in FIGS. 10A–10I. Payor Child-Transfer records may be input into the system from time to time to be paid on behalf of Payors.

Add/Change Payor Child-Transfer Records

Figure 10A:
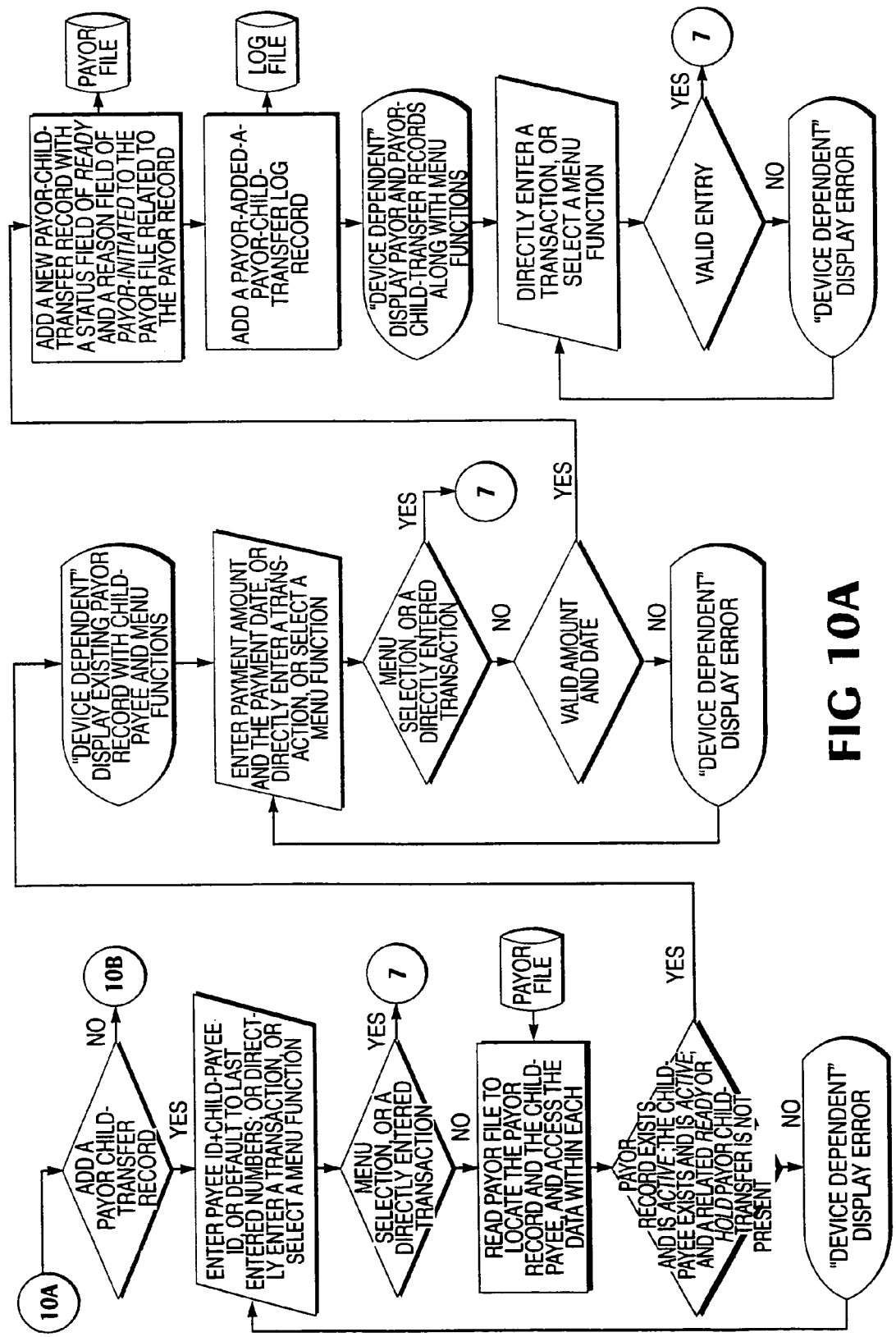
FIGS. 10A–10Q are flowcharts of payor child-transfer activities for the systems shown in FIG. 3.
Figure 10B:
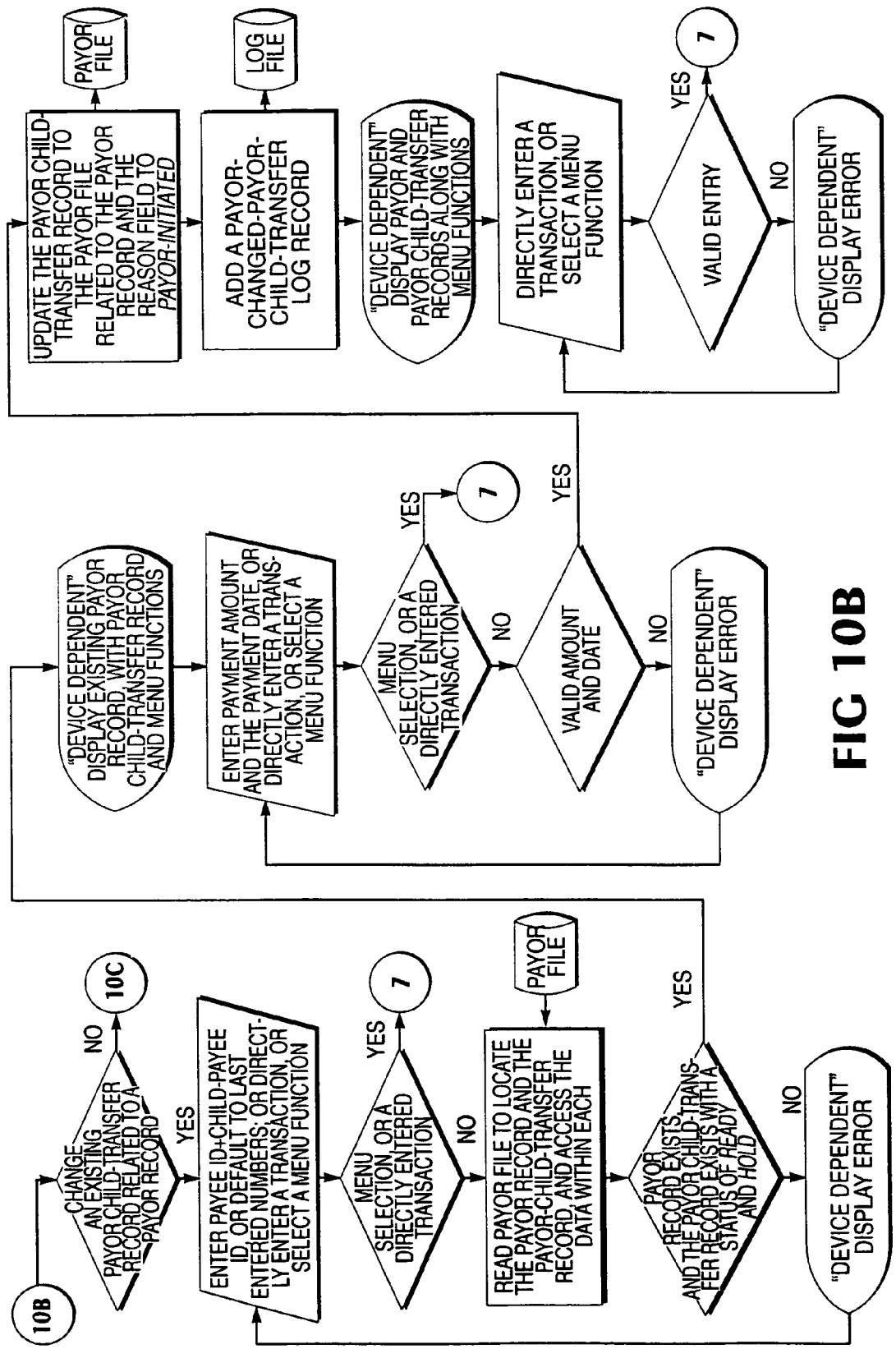

FIG. 10A shows the details of a preferred set of activities for interactively adding a Payor Child-Transfer record to the system. This occurs, for example, when a Member Payee contacts a CSR for creating Payor Child-Transfer records or where the Payor interactively or through a CSR creates Payor Child-Transfer-records. As seen in FIG. 10A, a PayeeID is entered along with either a Child-PayeeID or PayorID depending on whether the request is Member Payee or Payor initiated, to enable the system to access the Payor File in the on-line files 160. If the referenced Payor Record exists and is Active, and the Child-Payee record exists and is Active, and there is not already a related Payor Child-Transfer record in the system, the Bill Data is entered, including amount and due date. The new Payor Child-Transfer record is then processed and added to the Payor File with a status of Ready for later processing and payment in accordance with the due date and payment parameters established by the Payor, and a Log Record relating to such Payor Child-Transfer record is placed in the Log File storage of on-line files 160. FIG. 10B similarly shows a Payor Child-Transfer activity where an existing Payor Child-Transfer record is changed to reflect updated or corrected details.

Set Payor Child-Transfer Record Status

Figure 10C:
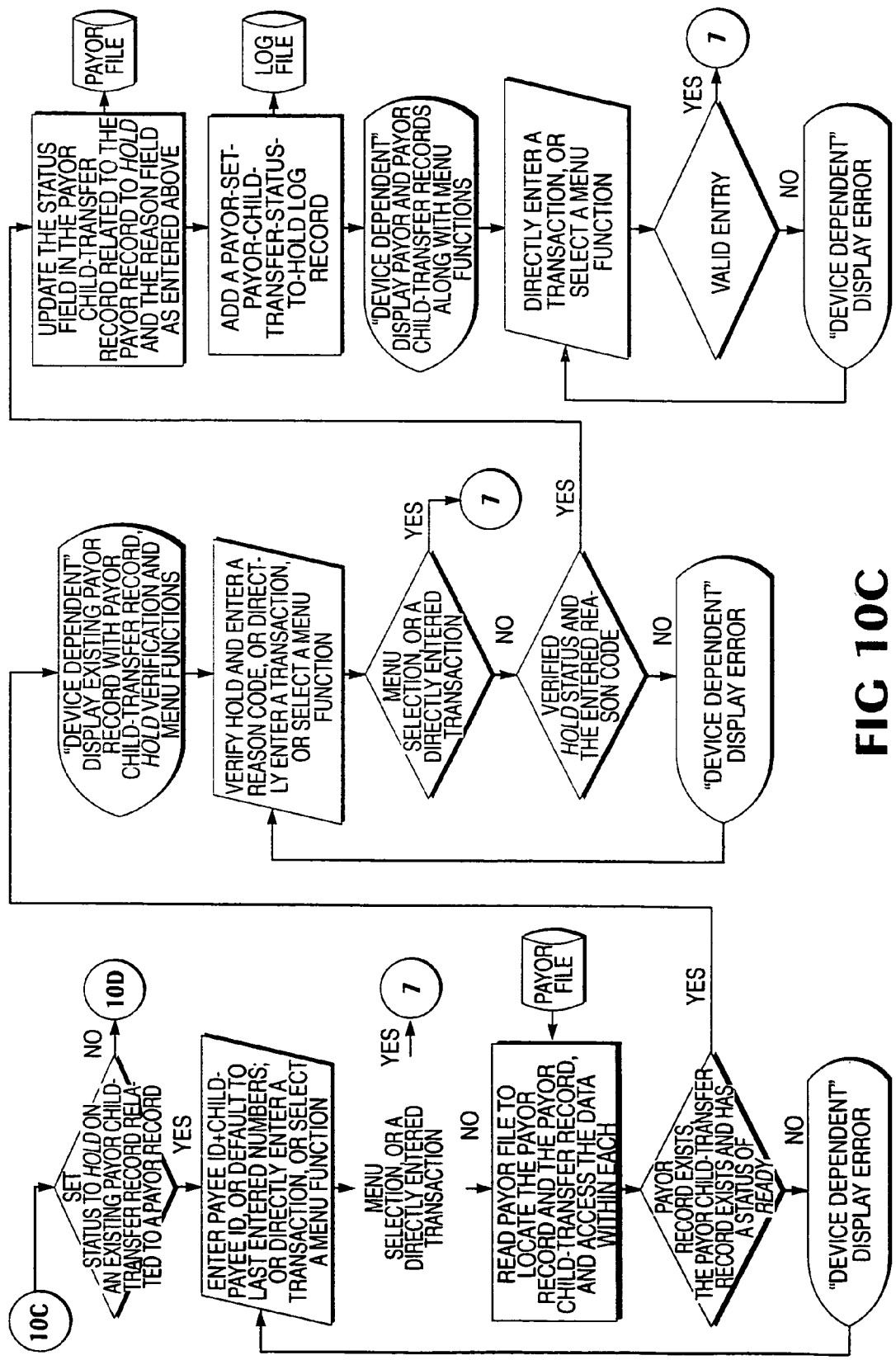
Figure 10D:
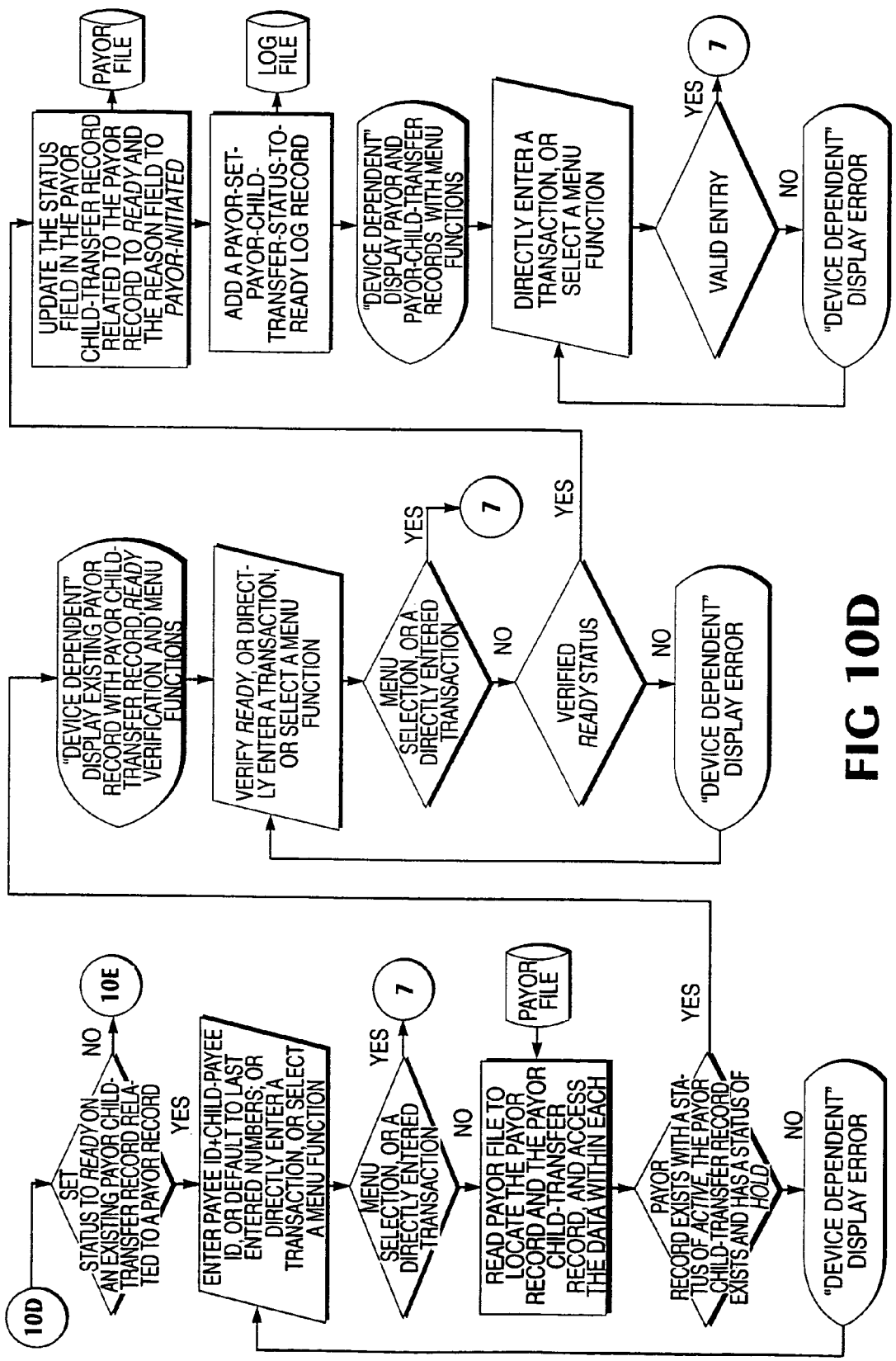

FIGS. 10C and 10D illustrate situations where existing Payor Child-Transfer records are changed in status to Hold, or changed back to the status of Ready from a prior status of Hold. A Payor may want to place a "hold" on a particular Payor Child-Transfer record, as there may be some discrepancy or dispute over the amount of payment or quality of services or goods. Setting a particular Payor Child-Transfer record to a status of Hold enables the balance of the Payor's Payor Child-Transfer records to be processed in normal course, while only the disputed payment is held. Once the reasons for holding the account are resolved, the status can be reset to Ready via the procedures of FIG. 10D.

Figure 10E:
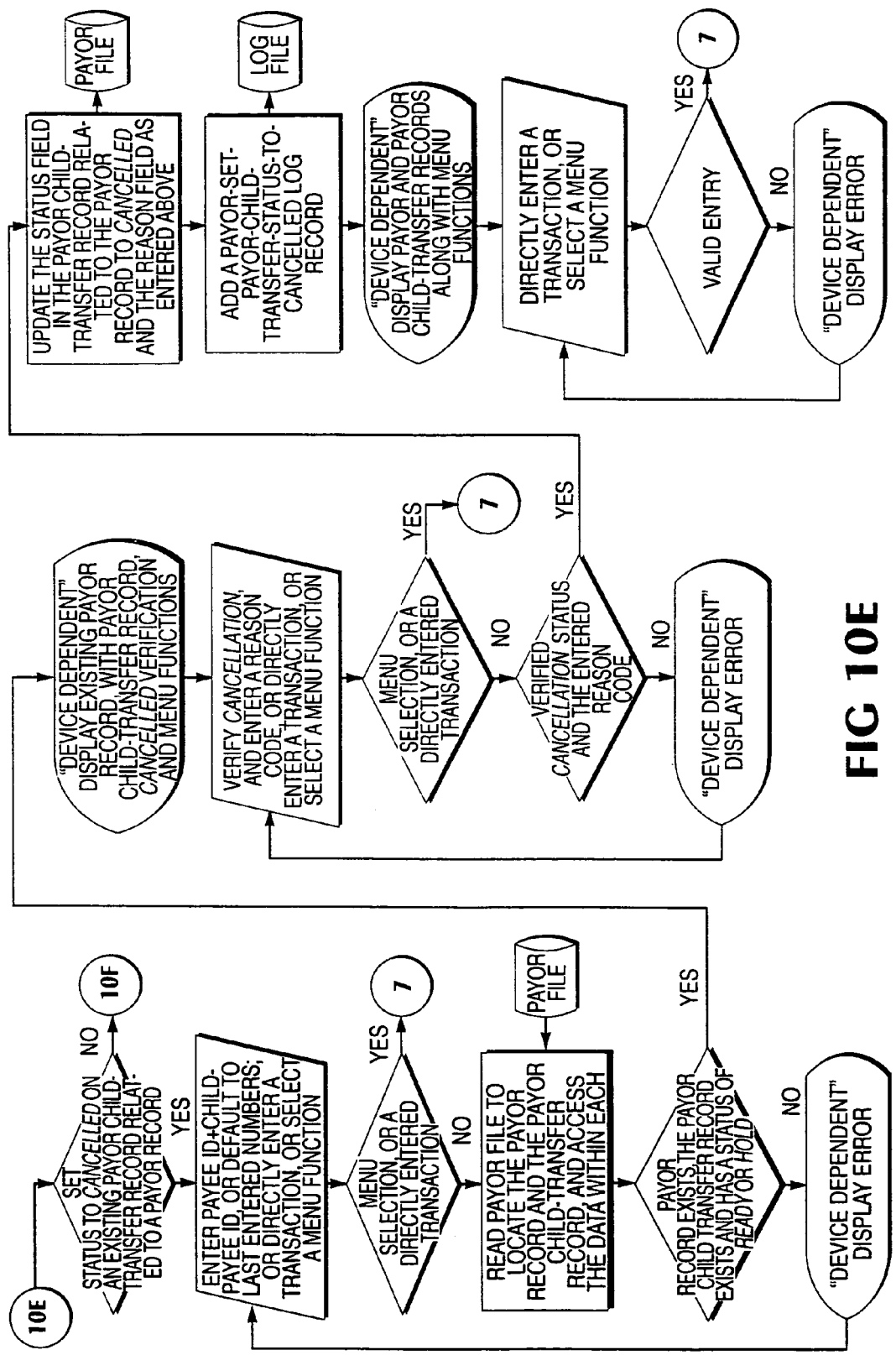

FIG. 10E illustrates an additional Payor Child-Transfer activity wherein the status of an existing Payor Child-Transfer record may be set to Canceled. This situation might occur where goods were returned for credit, or Payor made other arrangements for payment of a Bill, and the Payor Child-Transfer record is not needed to pay an obligation.

Add a Payor Child-Transfer Record Reversal

Figure 10F:
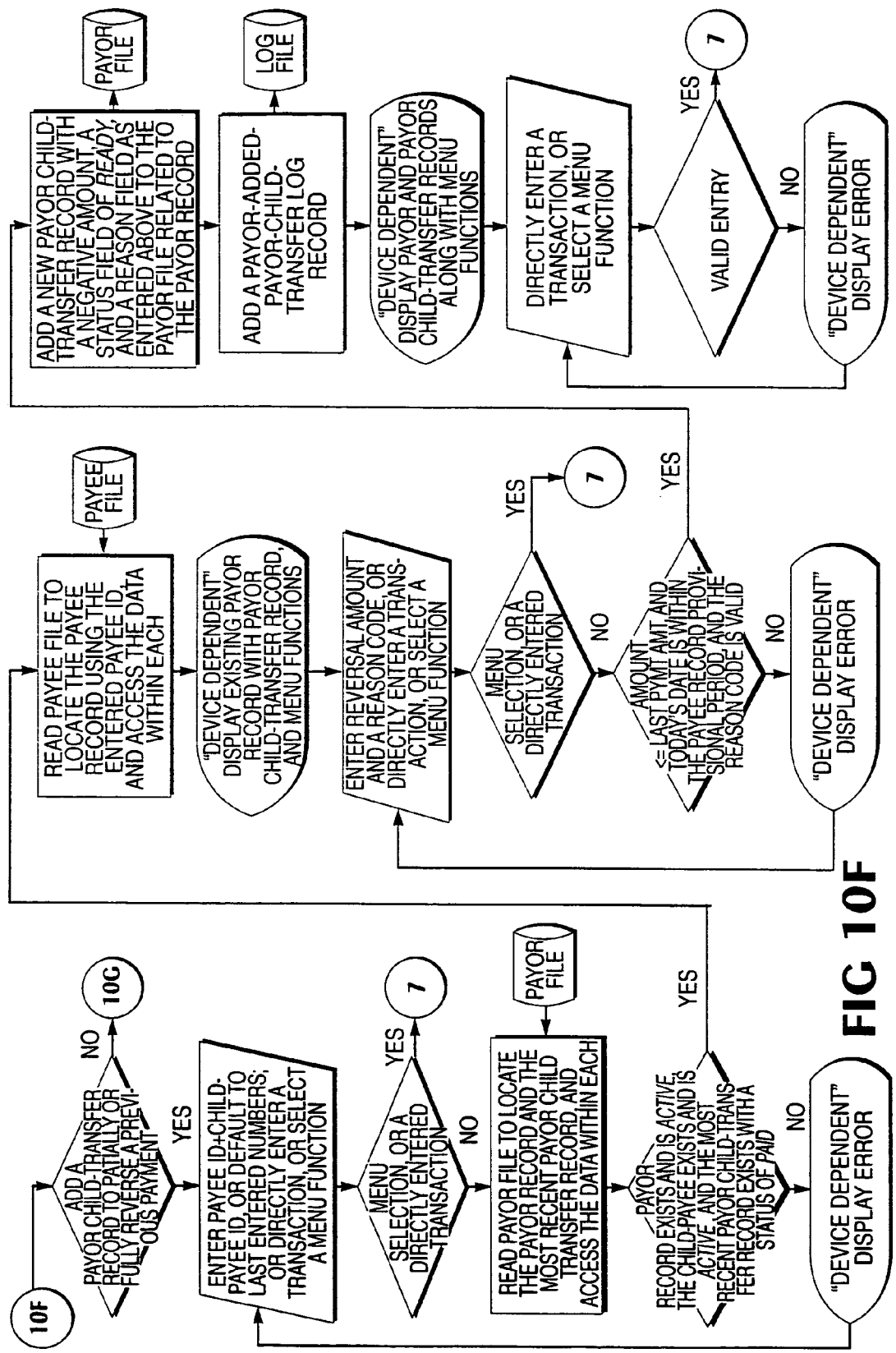

FIG. 10F illustrates another Payor Child-Transfer activity where a Payor utilizes the interactive devices (e.g., digital personal computers 112, telephones 120, ATM 150, or interaction with a CSR) through central computer 110 to direct system 100 for reversing the last payment on a Paid Payor Child-Transfer record. As mentioned above, each Payee has a Provisional Period. When this procedure is utilized, system 100 accesses the Payor File to locate the most recent Payor Child-Transfer record which has been paid for a particular Child-Payee. The system must also access the Payee File from the on-line files 160 to insure that the reversal request is within the applicable Provisional Period as specified in the Payee Record. Assuming that is true, the system adds a new Payor Child-Transfer record, with a status of Ready, to the Payor File with an appropriate negative amount to fully or partially offset the previous payment. A Log Record relating to such Payor Child-Transfer record is placed in the Log File storage of on-line files 160. During the next batch processing of Payor Child-Transfer records, the reversal is initiated, with the Operator BankAccount, Payor BankAccount and Payee BankAccount being credited and/or debited accordingly.

List Payor Child-Transfer Records

Figure 10G:
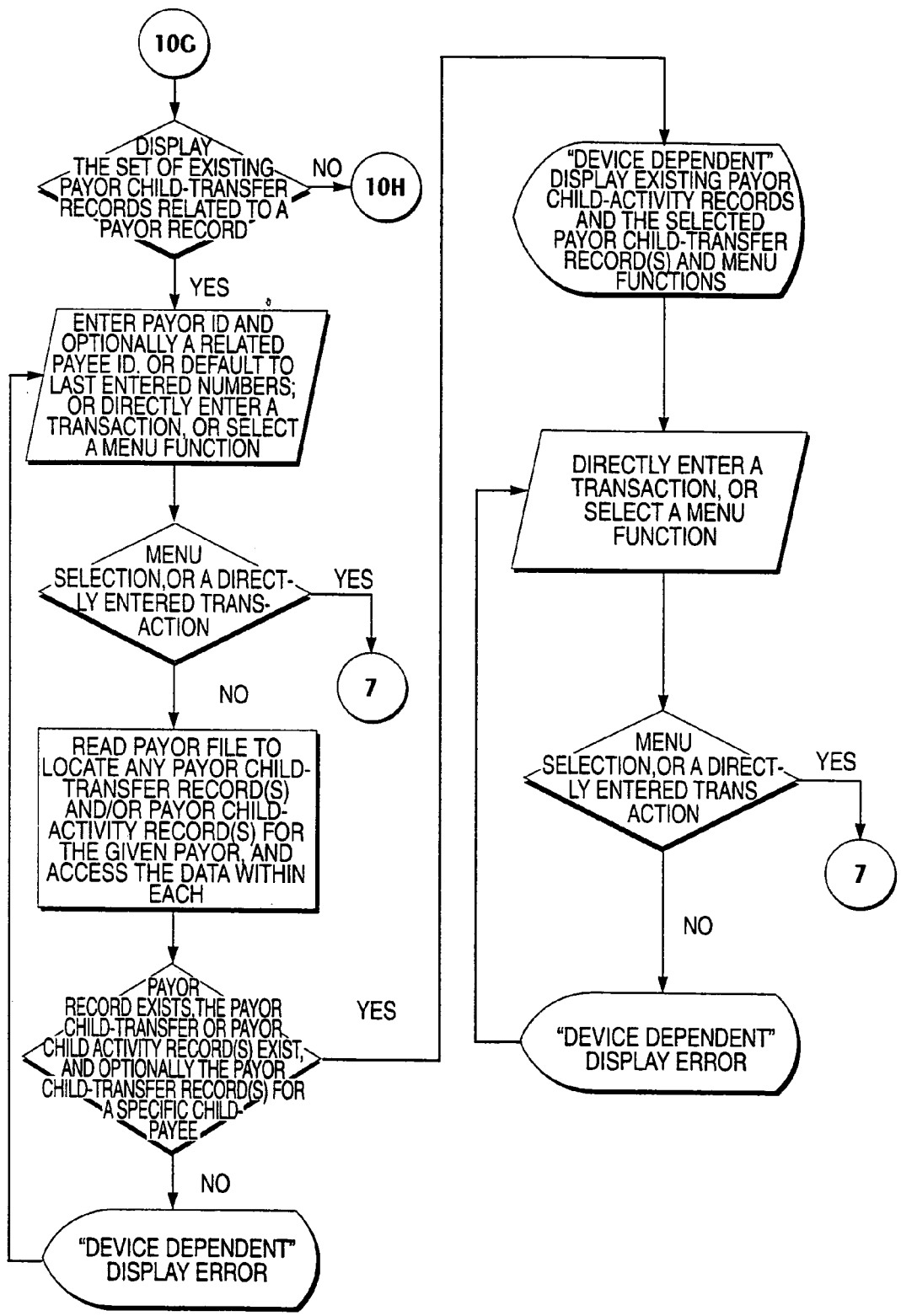

FIG. 10G illustrates yet another Payor Child-Transfer activity, wherein the Payor may request the system to list all existing Payor Child-Transfers for that particular Payor. This activity enables a Payor to determine Payor Child-Transfers which have been made or which are scheduled to be made, so that appropriate status changes or other payment controls may be implemented as desired. It is contemplated that the listing of existing Payor Child-Transfers upon request would be appropriately displayed in a "device dependent" manner upon request of the Payor. For example, such a request implemented by the Payor's digital personal computer 112 or an ATM (e.g., 150) having a screen display, results in a listing displayed on the user's screen, while interaction via a telephone 120, or via CSR, results in an audible listing of such Payor Child-Transfers.

Request Interim Statements

Figure 10H:
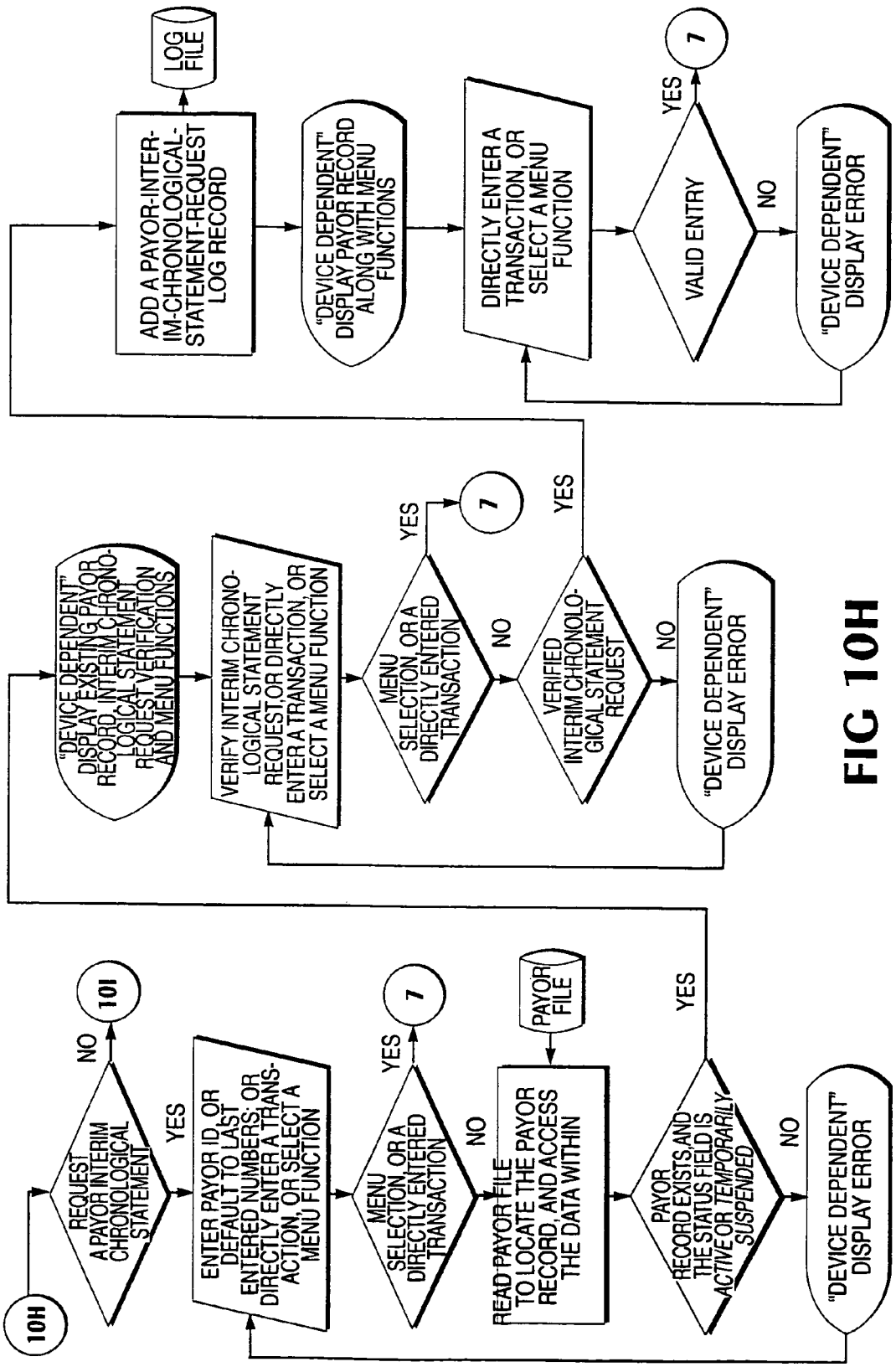

FIGS. 10H–10I illustrate yet another Payor Child-Transfer activity wherein a Payor may request an interim chronological or categorical statement of Payor Child-Transfer records. Although it is contemplated that Payors participating in the present system would receive periodic statements on a monthly, semi-annual, and/or annual basis, it is also preferred that interim statements be available upon request. FIGS. 10H–10I illustrate how a Payor interfaces with system 10 to obtain an interim statement, which is preferably produced by the system via the central computer 170.

FIGS. 10J–10Q illustrate a set of Payee Child-Transfer activities similar to the Payor Child-Transfer activities described above. However, the Payee Child-Transfer activities are only used by, and performed by, the Operator (not the Payee or at the Payee's request) and Payee Child-Transfer records are generally only used by the Operator to recover Operator fees from the Payee for services rendered.

Figure 10J:
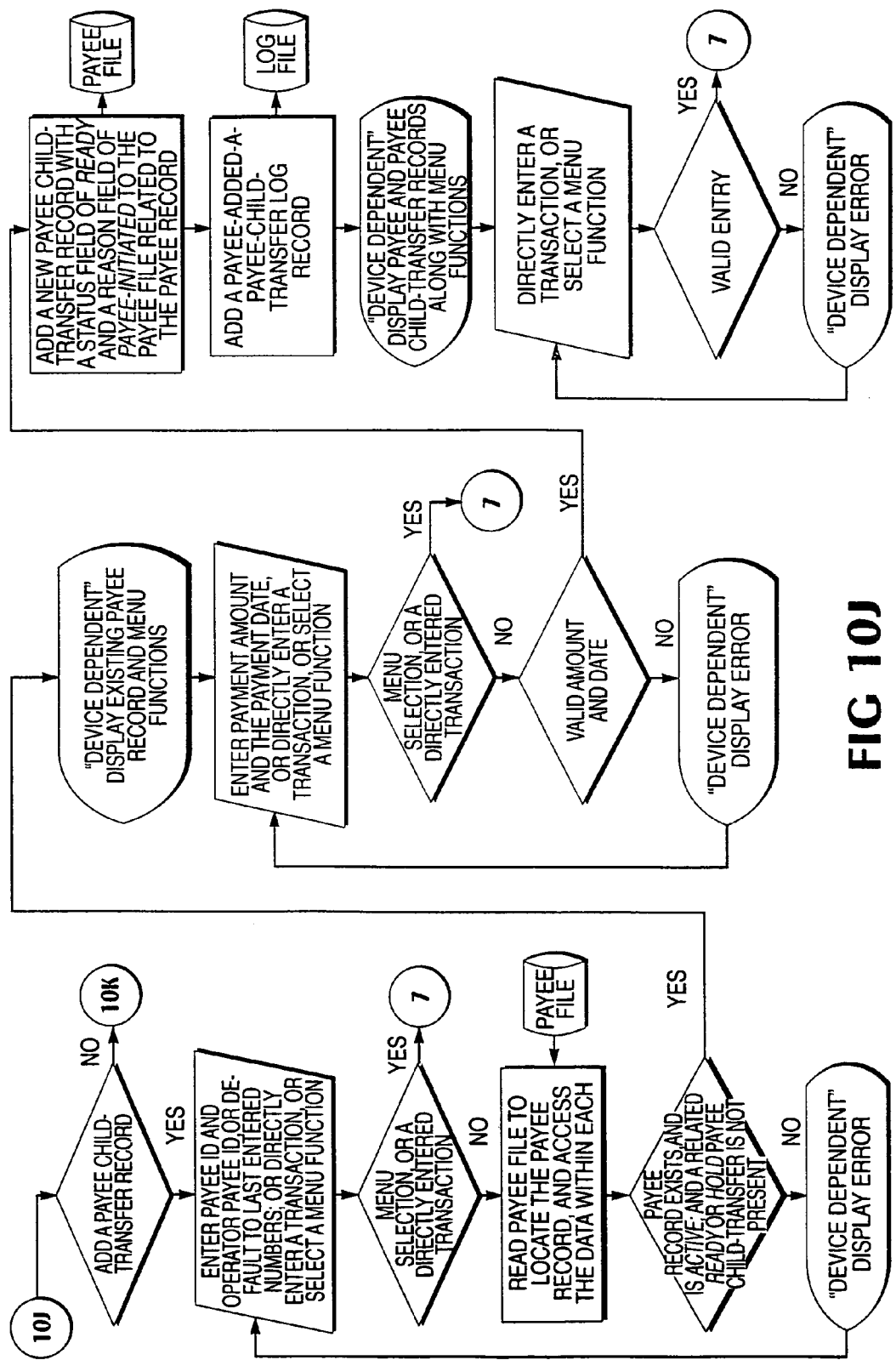
Figure 10K:
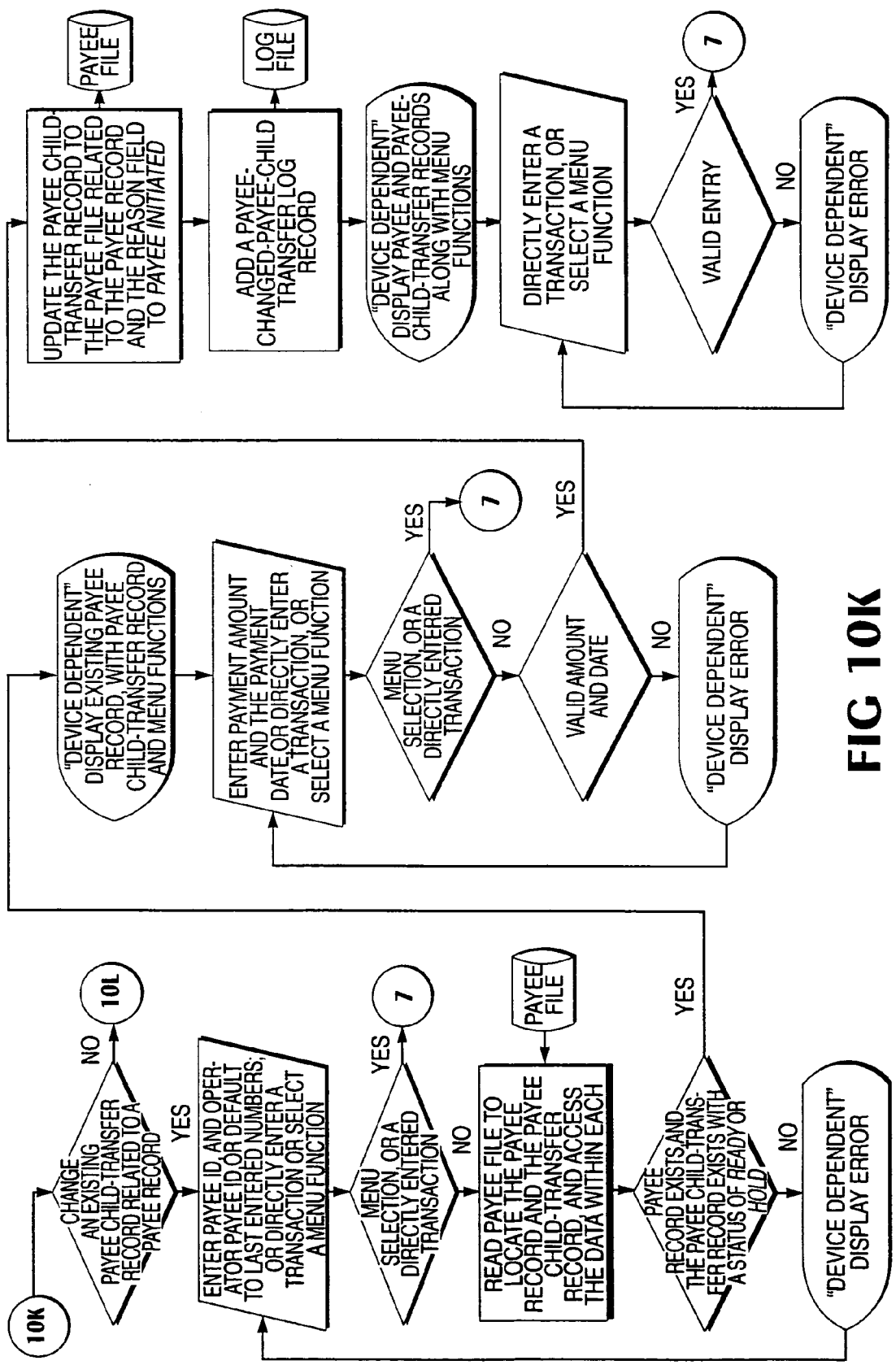
Figure 10L:
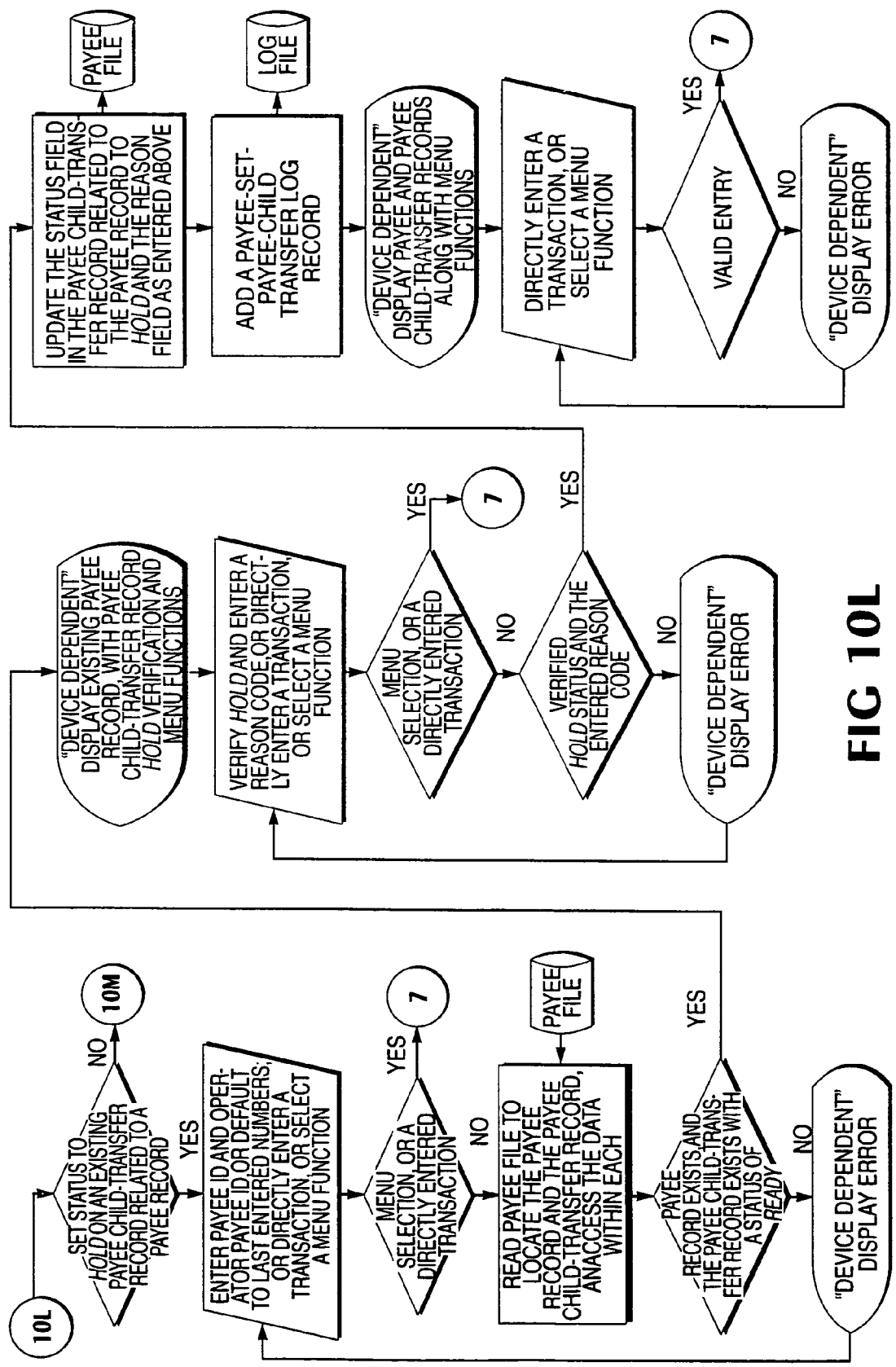
Figure 10N:
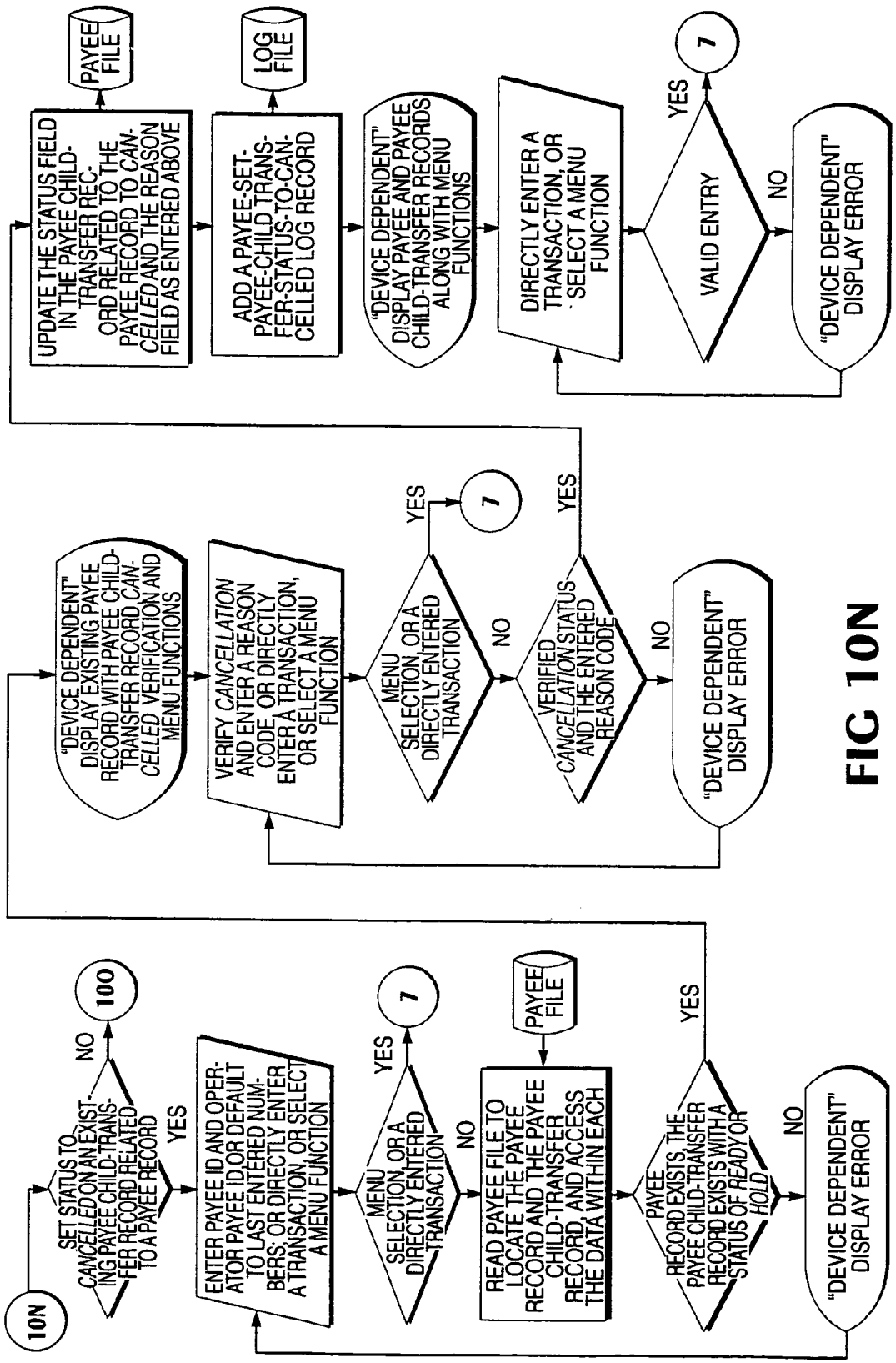
Figure 100:
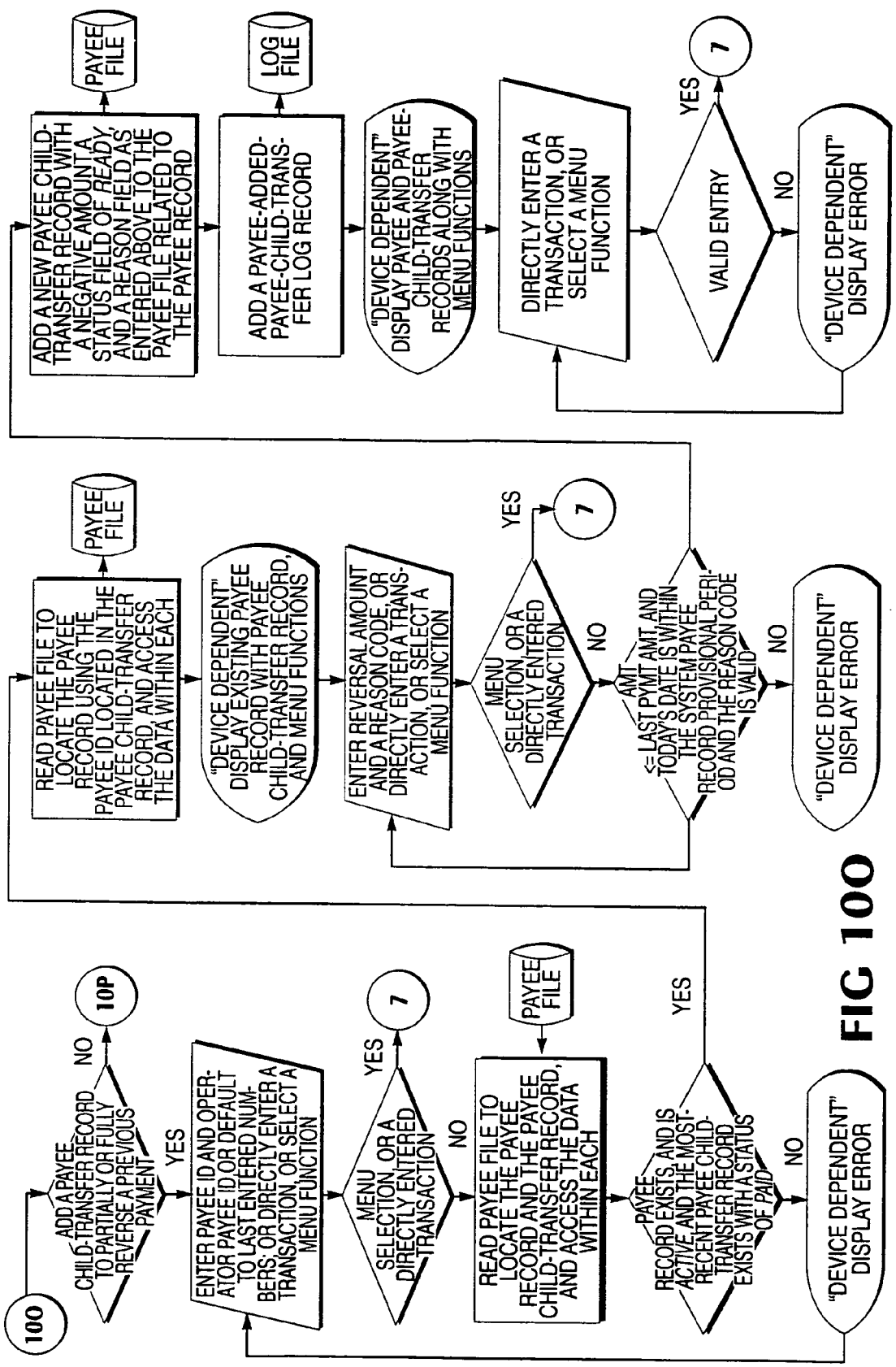
Figure 10P:
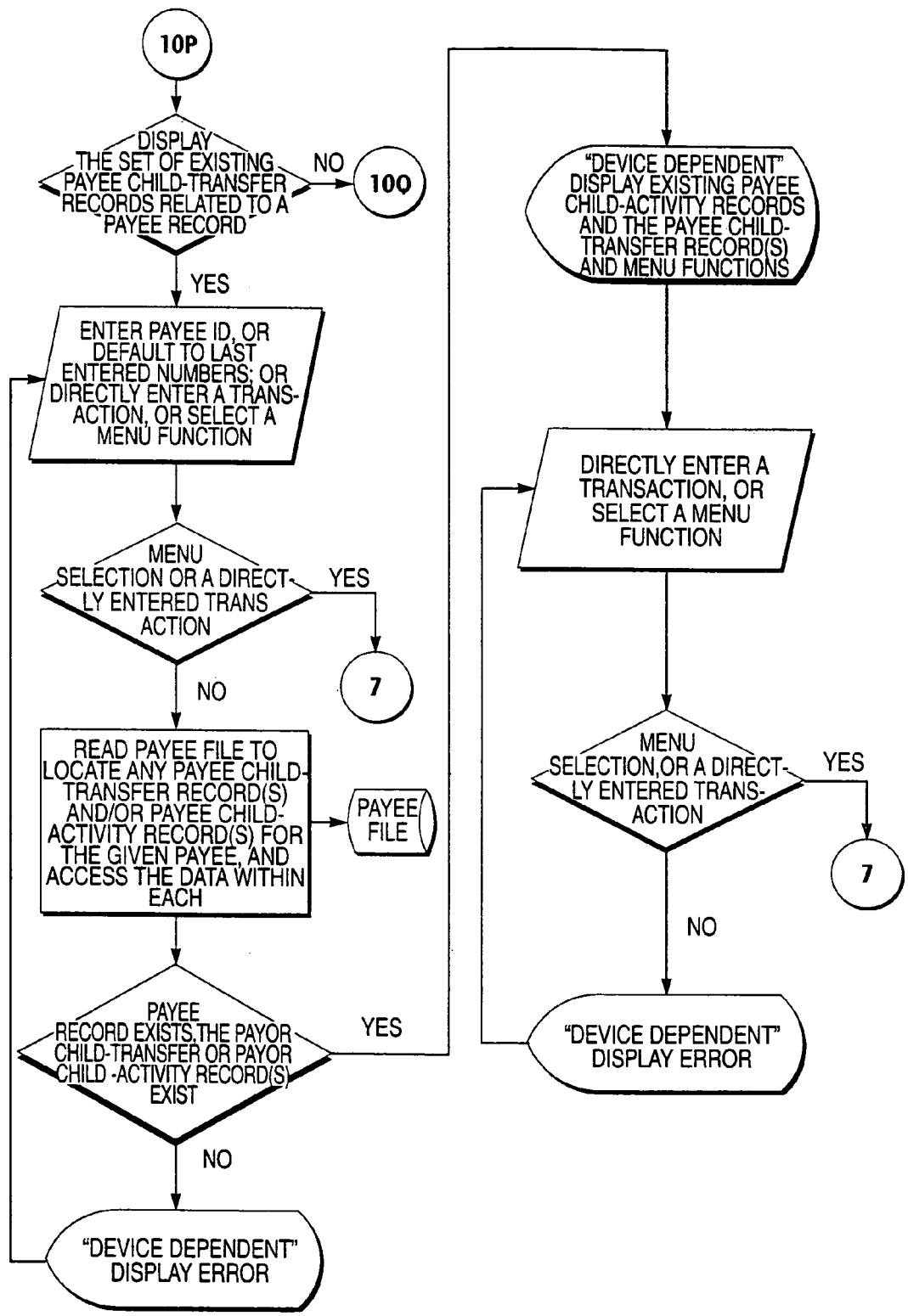
Figure 10Q:
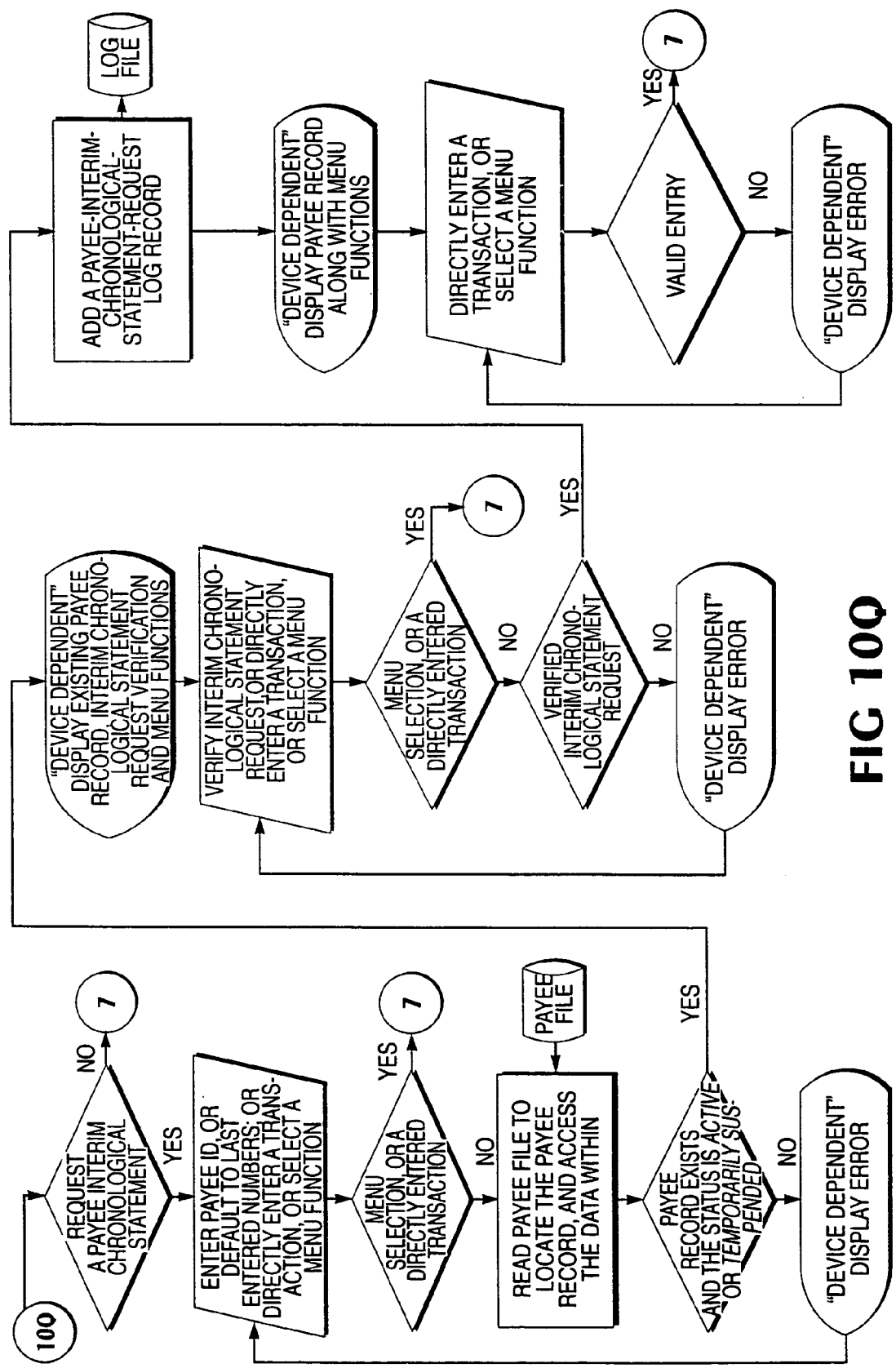

FIG. 10J shows details of the preferred set of activities for interactively adding a Payee Child-Transfer record to the system. FIG. 10K similarly shows a Payee Child-Transfer activity where an existing Payee Child-Transfer records is changed to reflect updated or corrected details. FIGS. 10L and 10M illustrate situations where the status field of an existing Payee Child-Transfer record is changed to the value of Hold, or changed back to the status of Ready from a prior status of Hold. FIG. 10N illustrates an additional Payee Child-Transfer activity wherein the status of an existing Payee Child-Transfer record may be set to Cancelled, and FIG. 10O illustrates where a reversal may be made based upon the last payment on a Paid Payee Child-Transfer record. FIG. 10P illustrates another Payee Child-Transfer activity wherein a request may be made to list all existing Payee Child-Transfer for a particular Payee. Finally, FIG. 10Q illustrates the Payee Child-Transfer activity wherein an interim chronological statement of Payee Child-Activity records and Payee Child-Transfer records may be generated.

Payee Information/Bill Data Processing

It is also contemplated that Member Payees in the system have various unscheduled processing tasks that may occur on a periodic (e.g. daily) basis. Communication with system 100 by Member Payees, whether initiated through a digital personal computer or similar data terminal equipment 140, via a person-to-person conversation with a CSR, or delivered through a written request, is preferably translated into one of a set of predefined batch-entered transactions, as best illustrated in conjunction with FIGS. 11, and 12A–12E.

The central computer 110 of FIG. 3 also executes exemplary software modules to, for example, perform (a) database management functions, (b) file handling batch operations, (c) settlement processing, and/or (d) reporting functions. In a preferred arrangement, central computer 110 is a mainframe computer of conventional design including, for example, symmetrical multiple processors with an interprocessor interbus. Database management may be provided for retrieval of files for various on-line and off-line manipulation herein, by any of a number of available products in the industry, or custom written for the particular application. Additional peripheral equipment (e.g., tape drives, printer, conventional mass storage device, and conventional communications interface/multiplexer) to facilitate communications and/or bill paying transactions may also be appropriate in many applications, and some examples of such equipment are provided herein or are apparent to those skilled in the art.

In the preferred embodiment, the non-interactive Bill Data is communicated to the central computer 110 in EDI formats, such as currently specified by the Accredited Standards Committee (ASC) X.12 Electronic Data Interchange within the American National Standards Institute (ANSI). In the event that the Member Payee is unable to communicate electronically within the EDI X.12 standard, the central computer 110 may preferably translate another format used by the Member Payee into the EDI X.12 format using a data re-formatter such as the Vector:Connexion from Sterling Software of Dallas, Tex.

Determination of Necessary EDI Form Processing

Figure 11:
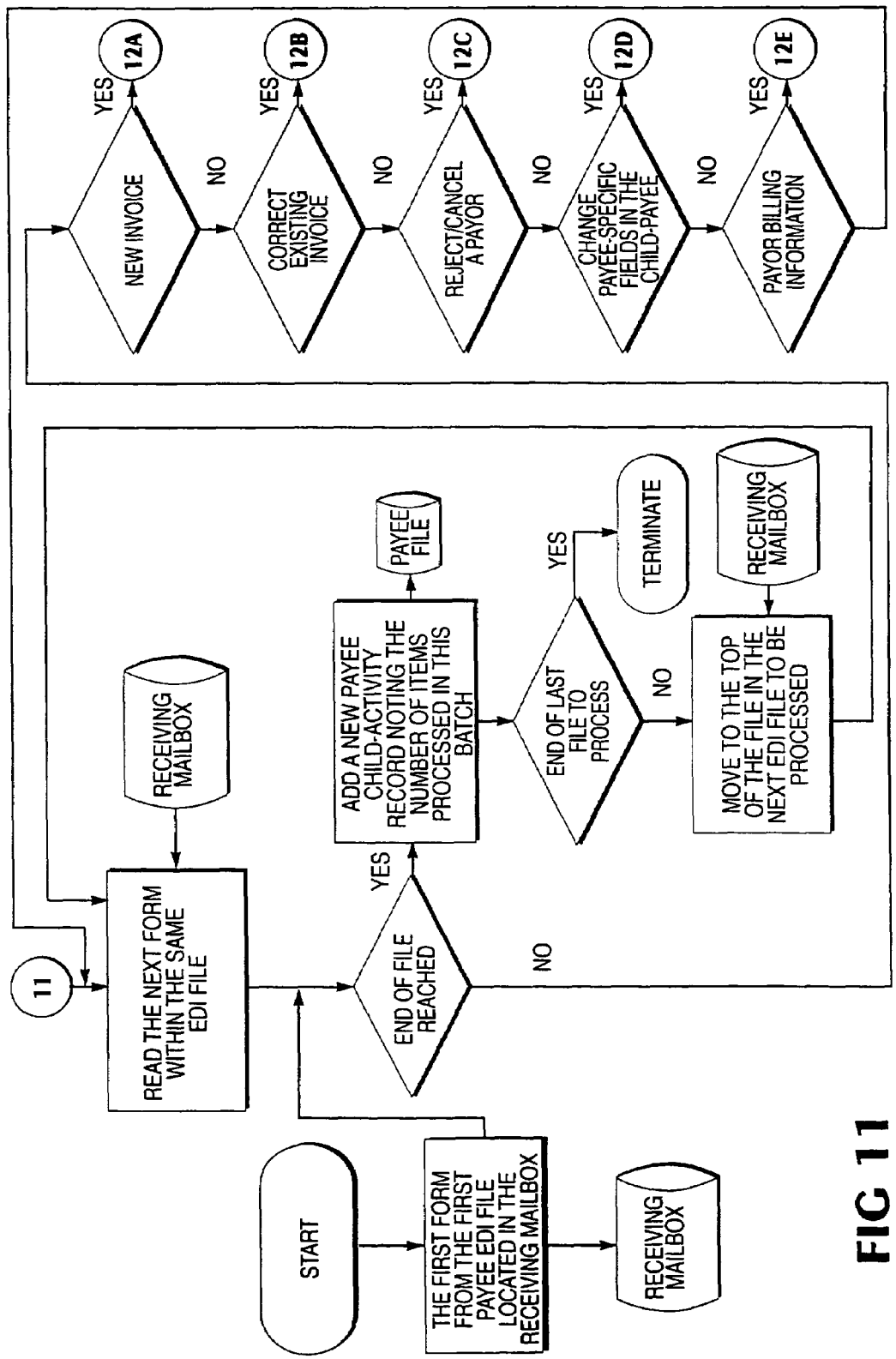
FIGS. 11 and 12A–12E are flowcharts depicting the preferred predefined batch-type processing procedures used in the system shown in FIG. 3.

Turning now to FIG. 11, details of a preferred scheme for processing the EDI files from the Member Payees are shown. Particularly, EDI Forms are preferably received by system 100 through the protocol translator 118 and personal computer interface 152, whereupon the EDI Forms are processed and placed into the system mailbox retained in the off-line files 165. A Payee file transfer processor 155 is preferably provided to assist with this procedure, and for accomplishing any reformatting which may be required. As shown in the preferred embodiment of FIG. 11, these individual EDI Forms are translated and arranged into one of five general predefined batch transactions shown in FIGS. 12A–12E.

New Bill Data

Figure 12A:
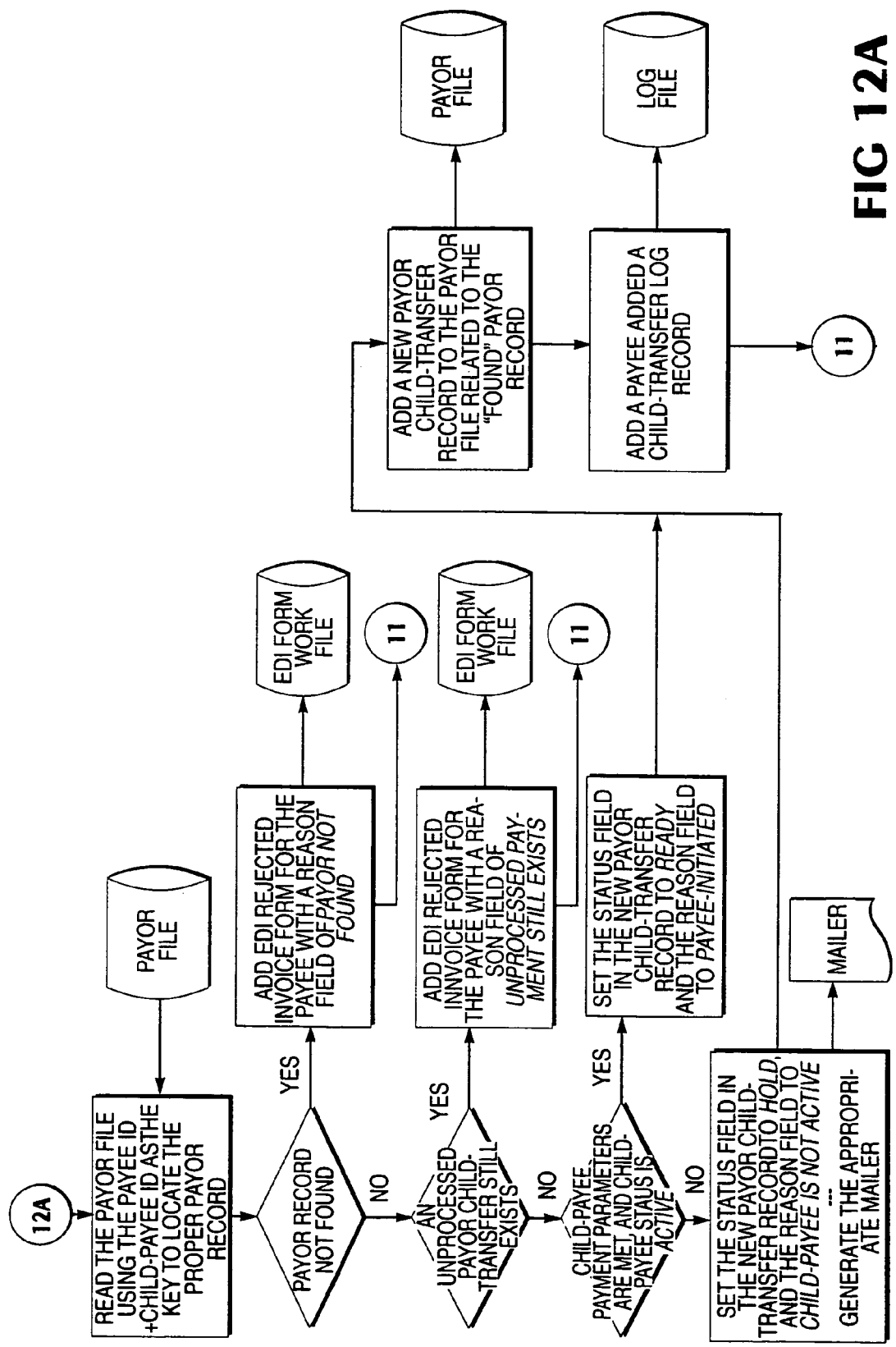

Particularly, if the EDI Form contains Bill Data, it is preferably processed into the system via a procedure illustrated in FIG. 12A. The central computer 110 for on-line transactions accesses the Payor File using the Child-PayeeID and the PayeeID. If the EDI Form is rejected because the Payor Record is not found or an unprocessed Payor Child-Transfer still exists, the EDI Form is stored in a temporary working file in the off-line files 165. Also, if the control parameters within the Child-Payee record (e.g. the maximum payment amount or the Minimum Interval) are not met, a Payor Child-Transfer record is created and added to the Payor File with a Hold status. If the Child-Payee control parameters are met and the Child-Payee status is Active, a new Payor Child-Transfer record is created and added to the Payor File with a status of Ready, and a Child-Transfer Log Record is placed in the Log File storage of on-line files 160. If the Child-Payee status is not Active, the status of the new Payor Child-Transfer record is set to Hold, and an appropriate notification is sent to the Payor.

Bill Data Correction

Figure 12B:
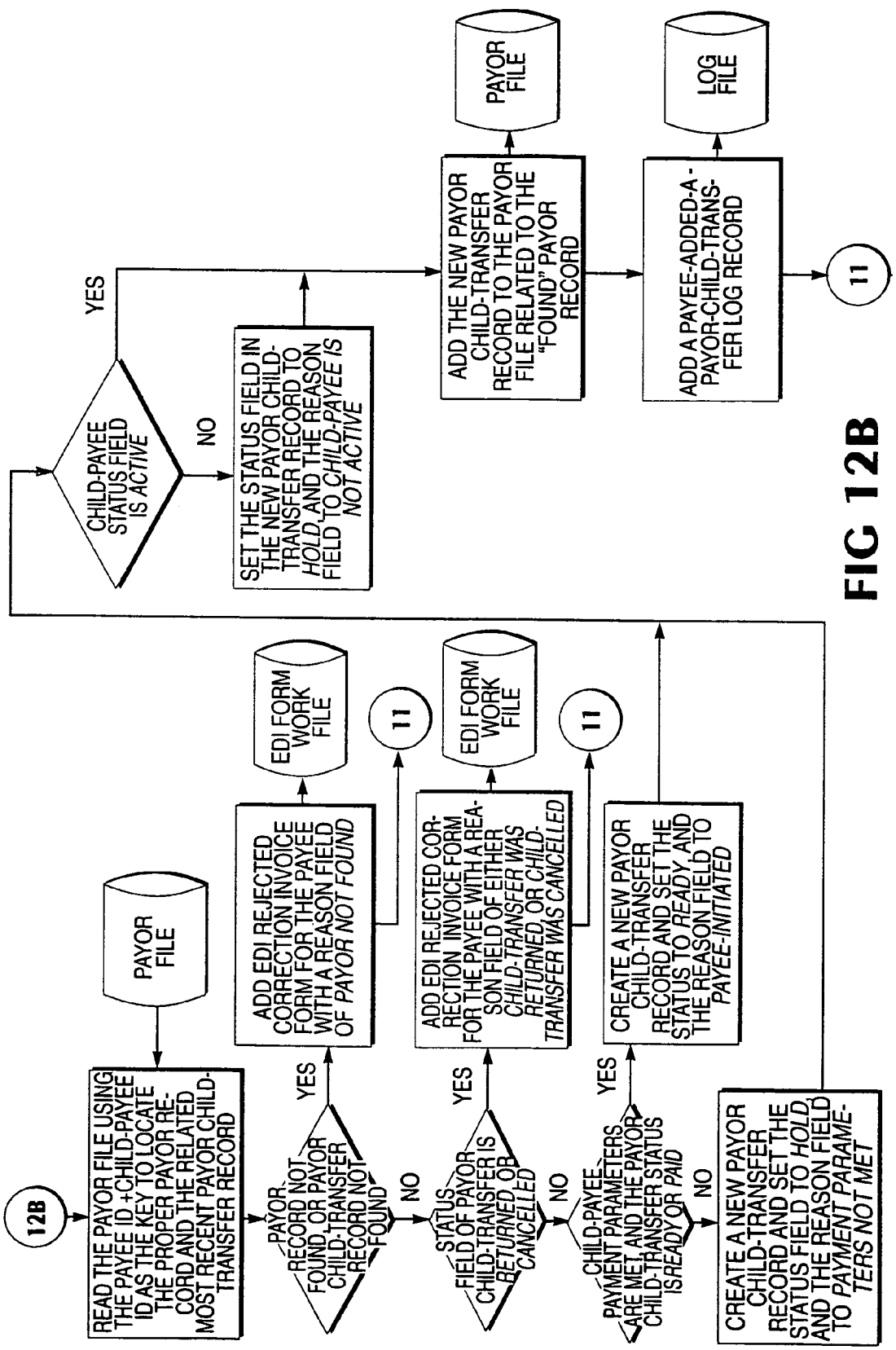

FIG. 12B shows a flow chart diagram similar to FIG. 12A, illustrating the processing of EDI Forms sent to correct previously sent EDI Forms which were used to create Payor Child-Transfer records. A correction EDI Form is received by the system 100 where, for example, a Member Payee made a mistake on a previously forwarded EDI Form, or where a change of some sort is deemed necessary. The EDI Form is forwarded to system 100 with a code indicating that it is a correction of a previous EDI Form from the Member Payee. As illustrated in FIG. 12B, if a Payor Record is not found or the Payor Child-Transfer record is not found, the EDI Form is rejected and placed in a temporary working file in off-line files 165. Similarly, if the previous Payor Child-Transfer record has a status field value of Returned or Canceled, the replacement EDI Form is rejected and placed in the temporary working file. The balance of the process shown in FIG. 12B is substantially the same as shown in FIG. 12A, however, the notice to the Payor is not required if the Child-Payee status is not Active, as presumably that notification was already sent.

Reject/Cancel a Child-Payee

Figure 12C:
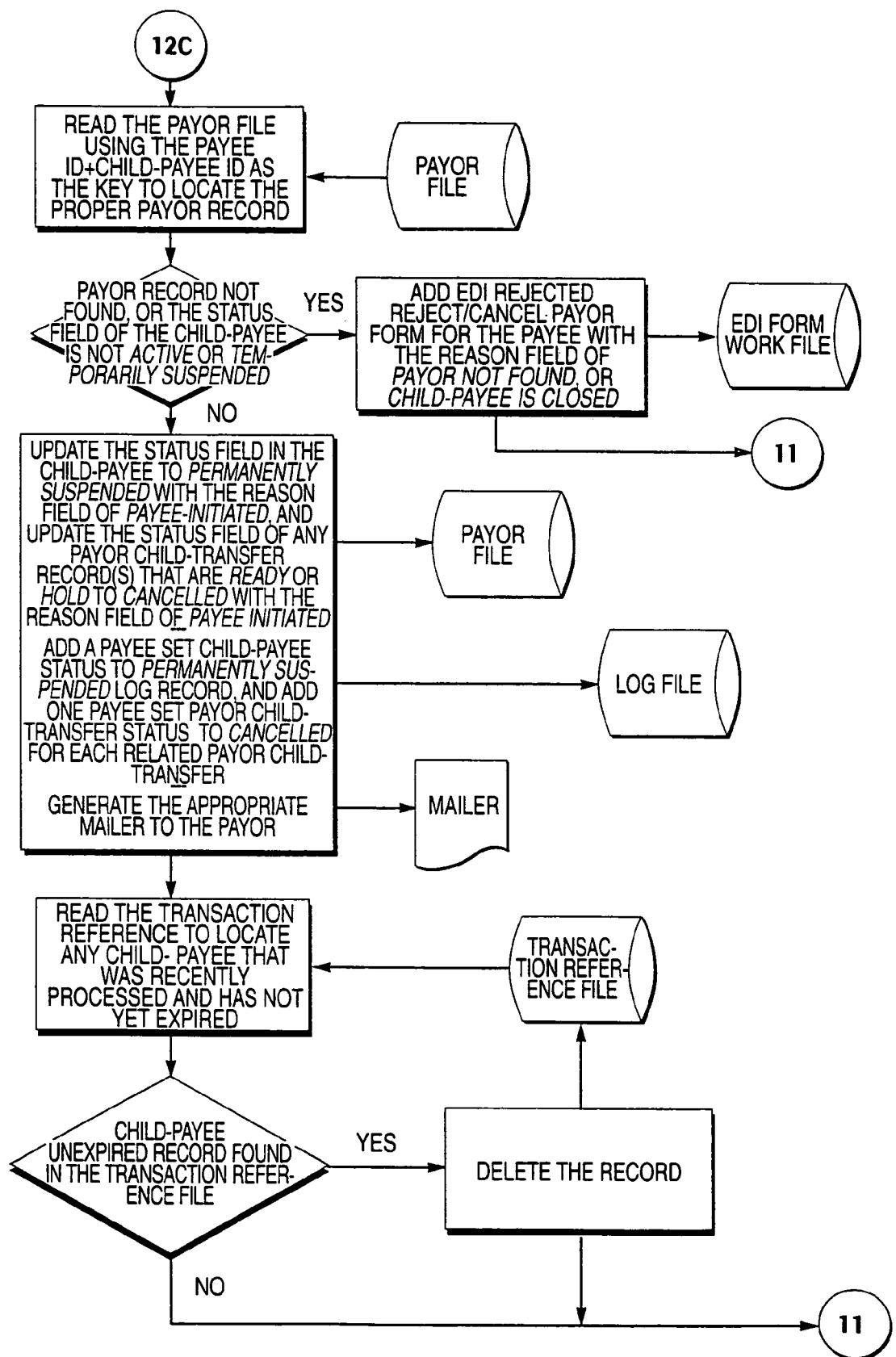

FIG. 12C shows the processing of EDI Forms which entail the rejection or cancellation of a Payor by a Member Payee. As shown in FIG. 12C, if the Payor Record is found, and the status of the Child-Payee is Active, the receipt of a reject/cancel EDI Form from a Member Payee (i.e. Member Payee initiated) causes the status of a Child-Payee record to be changed to Permanently Suspended, and any Payor Child-Transfer records associated with such Member Payee have their status similarly updated to Cancelled in the Payor File in the on-line files 160. Also, an appropriate mailer or other notification may be provided or made available to the Payor. Any records in the Transaction Reference File related to such Child-Payee that have not yet expired are deleted from the Transaction Reference File in the off-line files 165. This is done to ensure that the status of the Child-Payee record remains Permanently Suspended.

Change Child-Payee Record

Figure 12D:
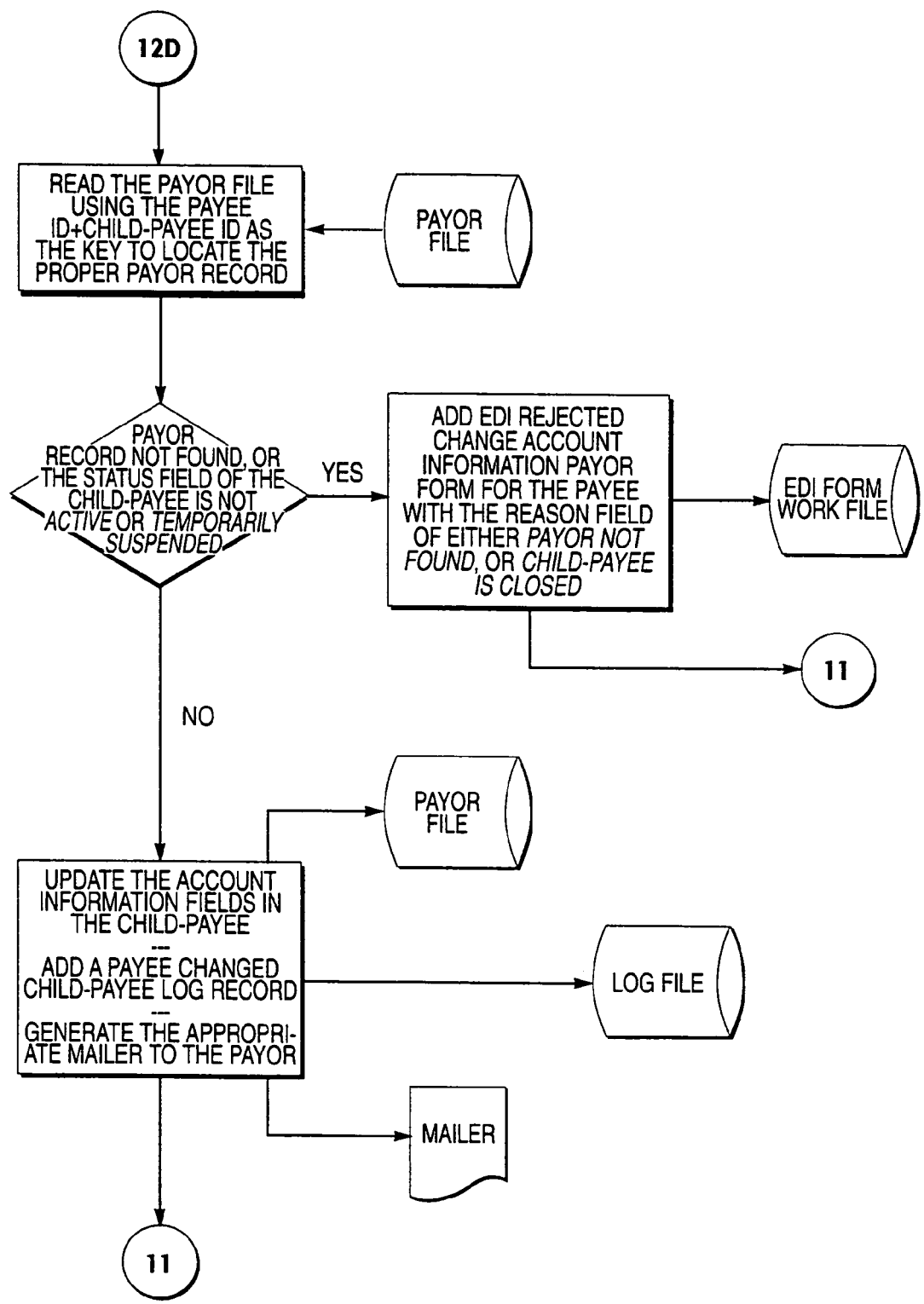

FIG. 12D shows the process for handling EDI Forms directed to changing specific fields in the Child-Payee record in the on-line files 160. Again, if the Payor Record is not found upon receipt of such an EDI change request, or if the status of the Child-Payee is not Active or Temporarily Suspended, the EDI Form is rejected and stored as such in a temporary working file in the off-line file 165. Otherwise, the applicable Child-Payee fields is updated and saved in the Payor File in the on-line files 160, and an appropriate notice is sent to the Payor to document the change.

Payor Bill Information

Figure 12E:
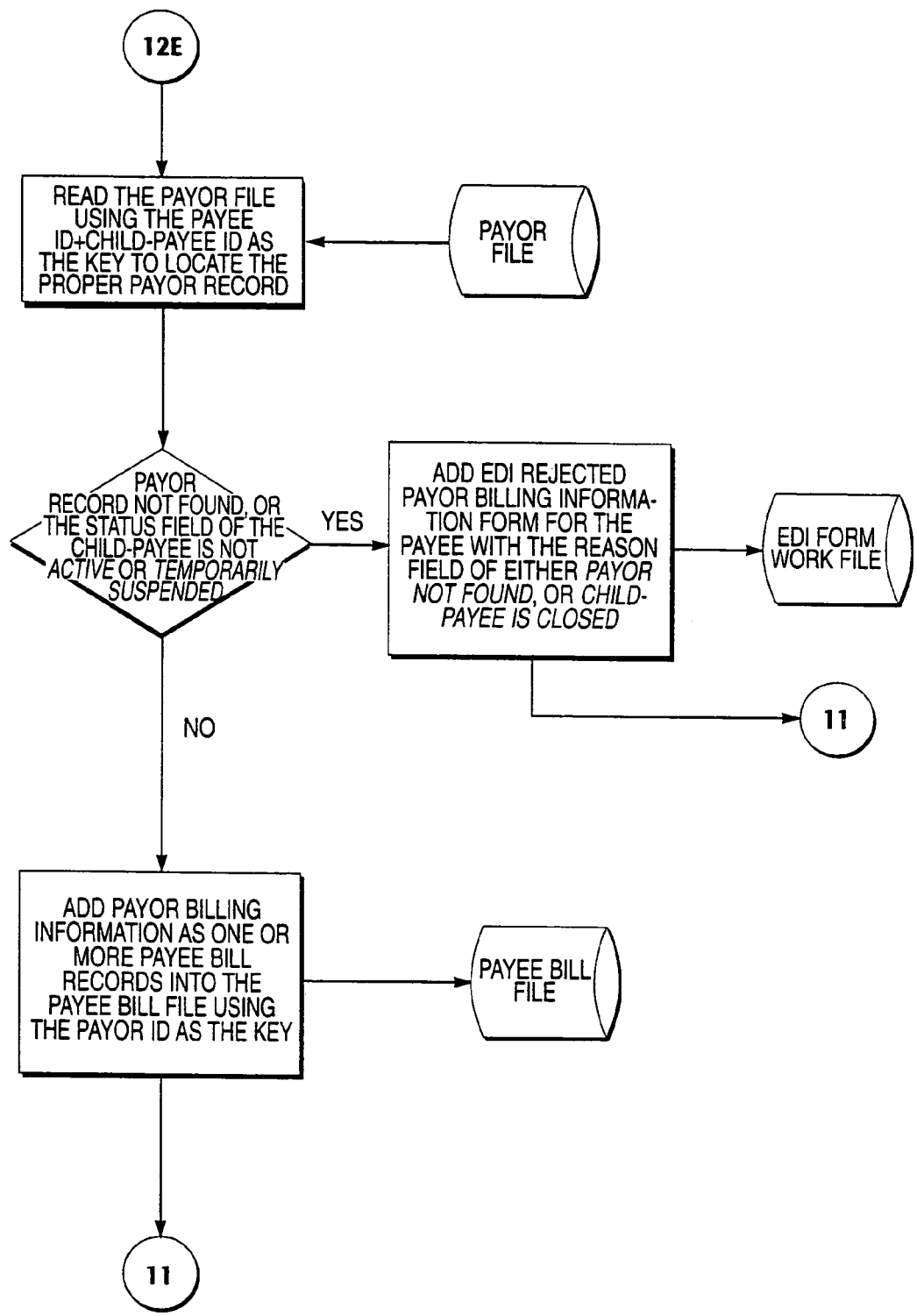

FIG. 12E shows the process for handling EDI Forms directed to providing Member Payee Bill information to applicable Payors. For example, the Member Payee Bill Information may be sent in response to a request from a Payor for additional information on a Payee service or good. Again, if the Payor Record is not found upon receipt of such an EDI request, or if the status of the Child-Payee is not Active or Temporarily Suspended, the EDI Form is rejected and stored as such in a temporary working file in the off-line file 165. Otherwise, the EDI Form information is placed on the Payee bill file for later processing.

TCF Returned Item Processing

Figure 13:
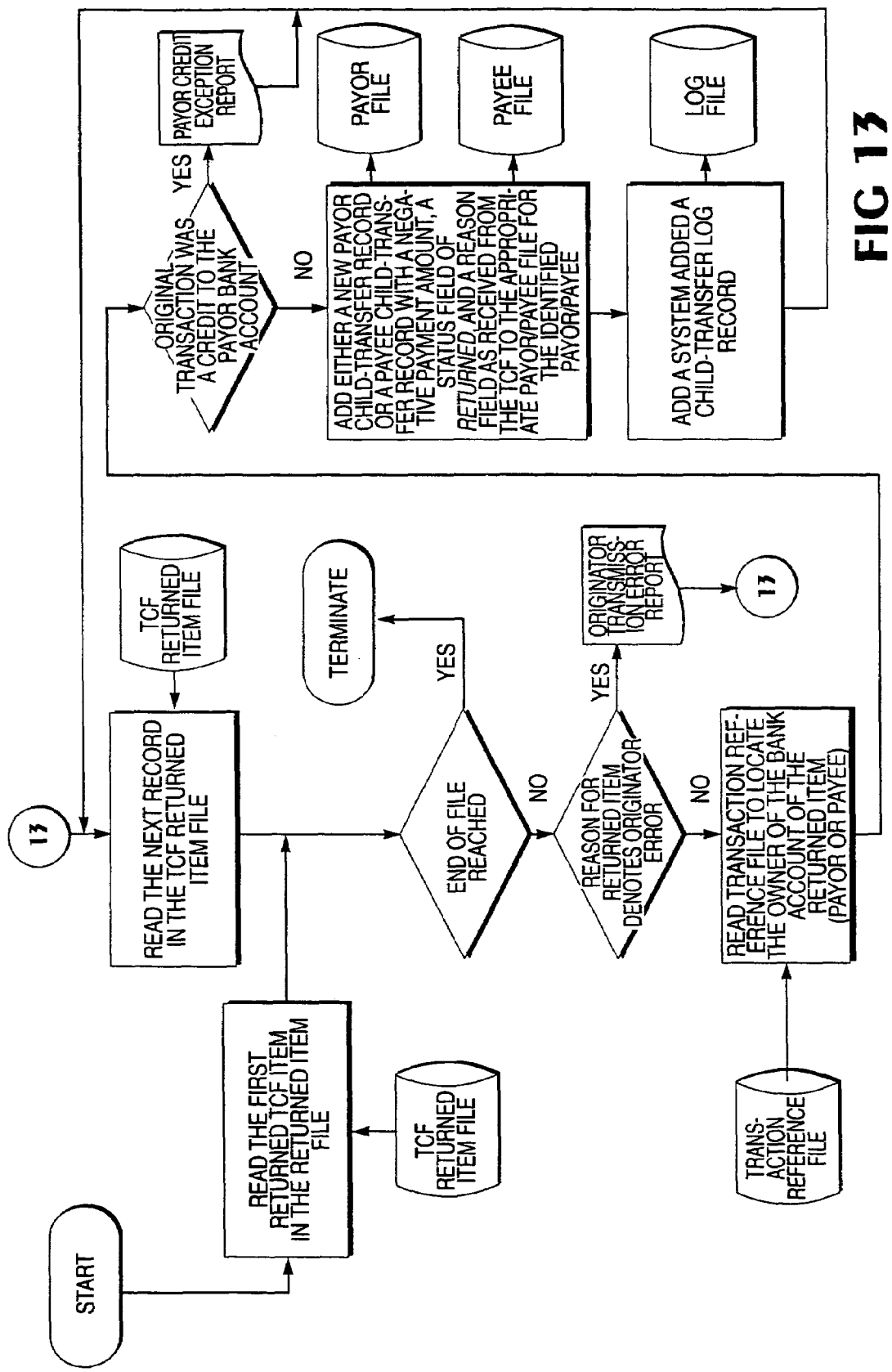
FIG. 13 is a flowchart illustrating a preferred process for handling payment and account items generated by the system shown in FIG. 3.

Turning now to FIG. 13, preferred details of how the system of present invention processes returned item files is illustrated in simplified form. Particularly, returned items are preferably received and stored in temporary working files (e.g. TCF return item file) in the off-line files 165 of the invention. As described below, if the item returned appears to be a result of the error of the TCFInterfaceBank, an appropriate notice/report will be generated by the TCFInterfaceBank and handled accordingly. Otherwise. the returned transaction is identified to the Payee or Payor as appropriate and handled accordingly. If the returned item requires a credit or debit to reconcile prior payments made, a record is placed in the Payor File as a new Payor Child-Transfer record and a Child-Transfer Log Record is added to the Log File for processing by central computer 170.

Transaction Reference File Processing

When any Bank related information (e.g. Payor BankAccountID, Payor BankID, Payee BankAccountID or Payee BankID) used by the system 100 for the transfer of funds is added or changed on a Payor Record or Payee Record, a Pre-Note is automatically generated by the system to verify the validity of such new information. This Pre-Note is preferably sent in an electronic form either directly to the applicable Bank or to the TCFInterfaceBank, which in turn originates the Pre-Note electronically to the applicable Bank. Once received by the applicable Bank, the information in the Pre-Note is either validated or invalidated.

If the information in the Pre-Note is invalid, the Bank rejects the Pre-Note by returning it to the originator within the time period and with a reason code (indicating the reason the Pre-Note was rejected) as defined by the applicable TCF or other arrangement. When the originator (if not the Operator) receives the rejected items it promptly provides the system 100 with a file of such items (e.g. electronically transmitted from the TCFInterfaceBank to system 100, or in another data transfer medium such as magnetic tape or magnetic cartridge). The processing of these rejected items is considered as another set of unscheduled tasks that occur on a periodic basis (shown as "TCF Returned Item" in FIG. 4). Each returned item is translated into one of the pre-defined batch-entered transactions, as illustrated in FIG. 13. If the information in the Pre-Note is valid, the Bank does not need to do anything and the Pre-Note expires within the system after expiration of a preset time period (e.g., ten days) after it was originated, and the applicable information is assumed valid by the system 100.

When monetary transactions are initiated by the system 100, originated by the Operator and/or TCFInterfaceBank, and processed by the Payor Bank or Payee Bank (see FIG. 3), those monetary transactions, like the Pre-Notes described above, can also be rejected by one or more of the Banks. When an item is rejected, it is generally returned to the originator within the time period and with a reason code (indicating the reason the item was rejected) as defined by the TCF or other arrangement as applicable. As with rejected Pre-Notes, the originator (if not the Operator) promptly provides the system 100 a file of all such rejected monetary items.

A second type of Pre-Note may also be created and sent by system 100 directly to the Payee. Whenever a new Child-Payee record is added (e.g., see FIG. 8G), the system needs to verify the Child-PayeeID as well as possibly other information that is provided by the Payor. To do so the system 100 generates a Pre-Note to the Payee (e.g. see FIG. 19D), and includes the Pre-Note along with the other records and/or information generated for the Payee (e.g. see FIGS. 19E, 19I and 21 discussed below). The receiving Payee either validates or invalidates the information contained in the Pre-Note. If the information in the Pre-Note is valid, the receiving Payee does not need to do anything, because the Pre-Note expires upon the expiration of a preset time period (e.g., ten days) after it was originated and the Child-PayeeID and other applicable information is assumed valid by the system 100. If there is some problem with the information in the Pre-Note the receiving Payee rejects the Pre-Note by returning it within the preset time period to the system 100 with a reason code as defined by system 100 that indicates why the Pre-Note was rejected. Generally, a "reason code" is simply a status field in the returned item which provides explanatory information regarding the return.

A third type of Pre-Note may also be created and sent by the system 100 directly to the Payor. Whenever a Payor Record is added (e.g., see FIG. 8A) or whenever there has been a change to either a Payor Record or a related Child-Payee, the system needs to verify such new Payor Information with the Payor. This may be accomplished in several ways. First, the new Payor Information may be provided on a periodic chronological statement which is made available to the Payor. The Payor is then responsible for correcting any errors in the new Payor Information on system 100. The new Payor Information may also be made available to the Payor via an separate notice each time Payor Information has changed. Again, the Payor is responsible for having any errors corrected on system 100. Generally, Payor Pre-Notes alone do not cause the status of a Payor Record or Child-Payee to change.

In addition to the unscheduled transactions that are performed within system 100 on a periodic (preferably daily) basis, there is also a set of scheduled processing tasks that can occur on a periodic (e.g., daily) basis in a specific sequence of events. The scheduled tasks are, in a preferred embodiment, grouped into five defined sets of activities, as shown in FIG. 5.

The first set is referred to as Transaction Reference File processing, and is illustrated in more detail in FIG. 14 and FIGS. 15A through 15C. Whenever either a Pre-Note or a monetary transaction (e.g., initiation of a payment) is sent out of the system, a Transaction Reference Record is written to the Transaction Reference File noting a predetermined expiration date. The expiration date is calculated as a preset time period (e.g. ten days for Pre-Notes, four days for monetary transactions) after the initiation date. If the Bank does not return the monetary transaction as a rejected item within the preset period, or if the Bank or Payee does not return the Pre-Note as a rejected item within the preset period, the expiration date in the applicable Transaction Reference Record is reached and either the monetary transaction is assumed as accepted, or the applicable information in the Pre-Note is assumed as valid, respectively.

Main Transaction Reference File Processing Routine

Figure 14:
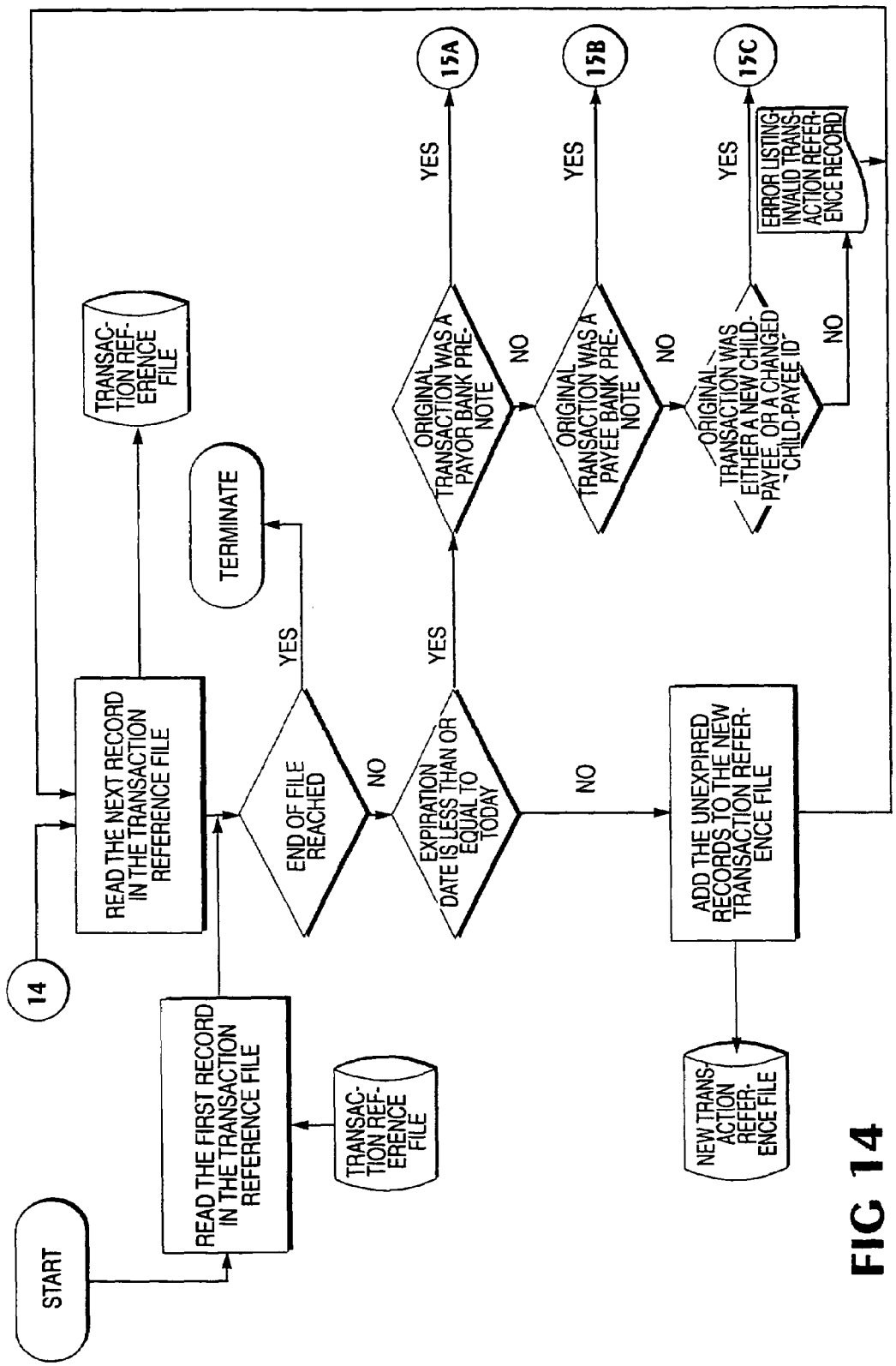
FIGS. 14 and 15A–15C are flowcharts illustrating a preferred transaction reference file processing sequence for the system shown in FIG. 3.

Turning to FIG. 14, the Transaction Reference File processing is preferably undertaken in a batch processing mode by central computer 170. The central computer 170 accesses the Transaction Reference Files in off-line files 165 and determines whether each Transaction Reference Record is to be processed at that time (i.e. the expiration date is less than or equal to today's date), or alternatively added to unexpired records in a new Transaction Reference File stored in off-line files 165. If the Transaction Reference Record is to be processed on that day, the system determines whether the Transaction Reference Record pertains to a Payor, Payee, or Child-Payee Pre-Note. These various procedures are shown in FIG. 14, with details of preferred procedures for each shown in FIGS. 15A, 15B and 15C, respectively.

Detail Transaction Reference Record Processing

Figure 15A:
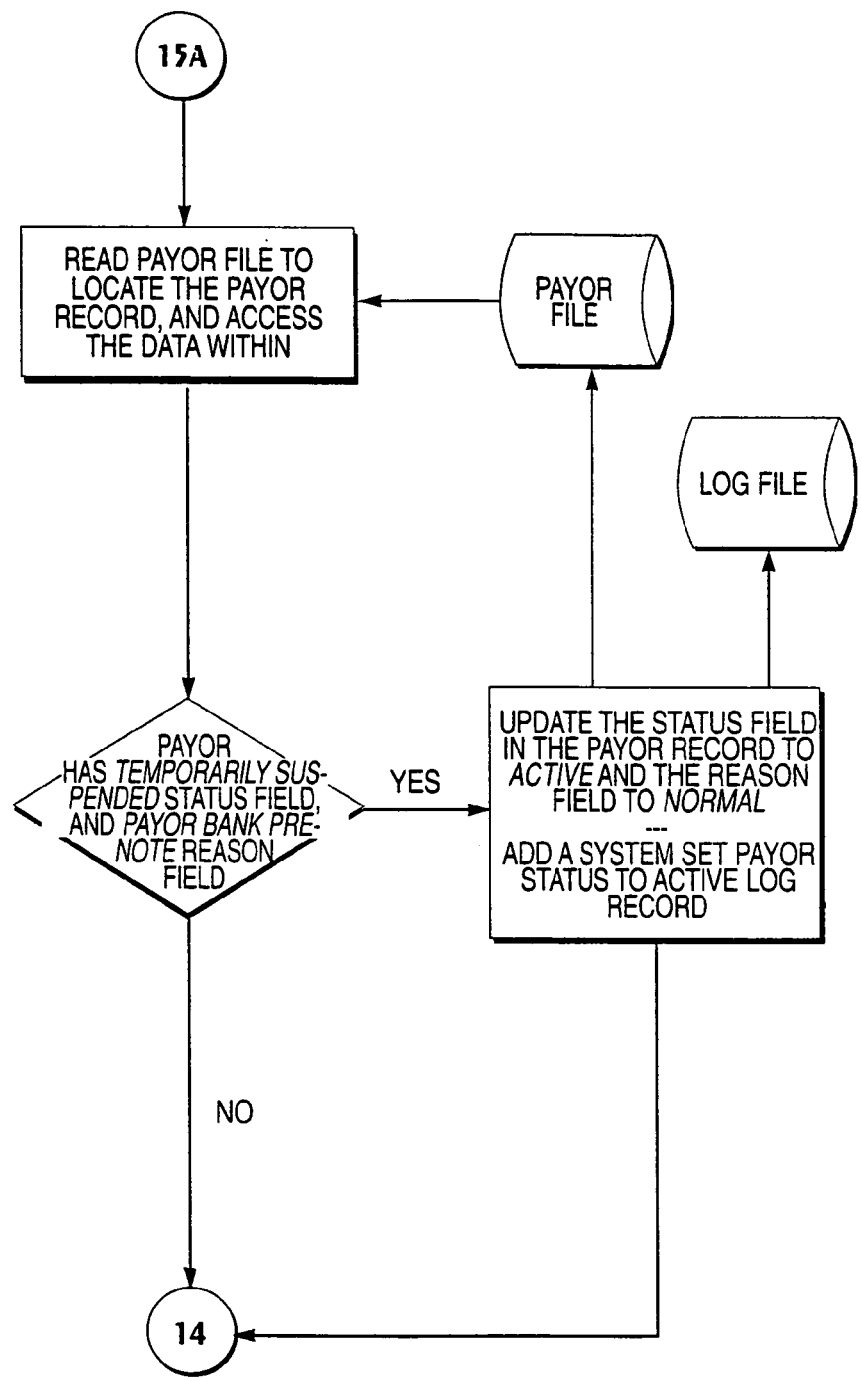
Figure 15B:
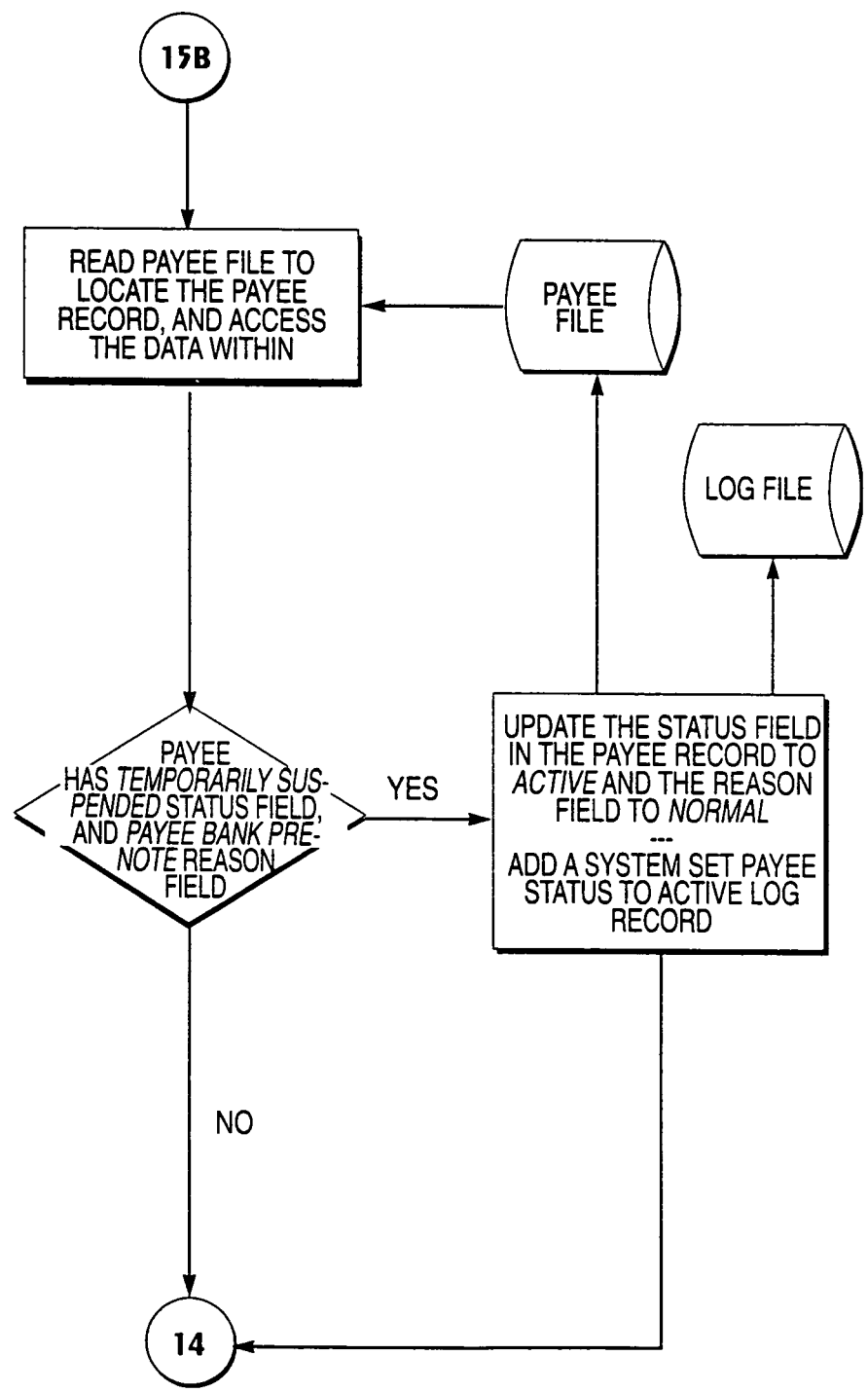
Figure 15C:
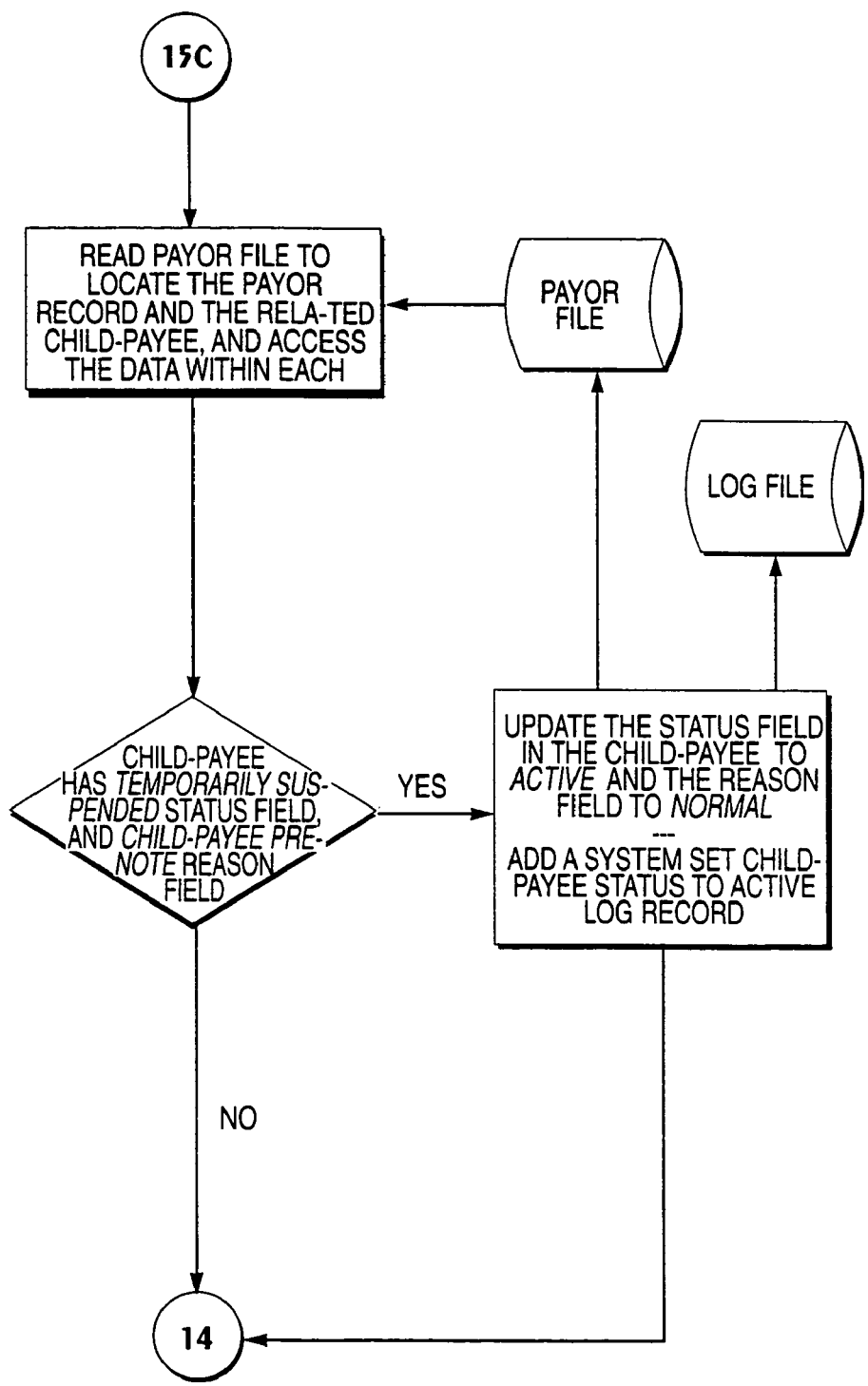

As seen in FIGS. 15A and 15C, if the Transaction Reference Record relates to an expired Pre-Note which pertains to the Payor Record or a Child-Payee record of a Payor, the status of the applicable Payor Record or Child-Payee record is updated to Active in the Payor File in on-line files 160. Similarly, as shown in FIG. 15B, a Transaction Reference Record which pertains to an expired Payee Pre-Note causes the status of the applicable Payee Record to be updated to Active in the Payee File. If the Transaction Reference Record pertains to a Payor Child-Transfer, no further processing is required, since the applicable Payor Child-Transfer record already has a Paid status. Had a Payor Child-Transfer item been returned within the preset period, the Transaction Reference File is accessed for further processing, as shown in FIG. 13.

Log File Pre-Processing and Warehouse File Processing

Figure 16A:
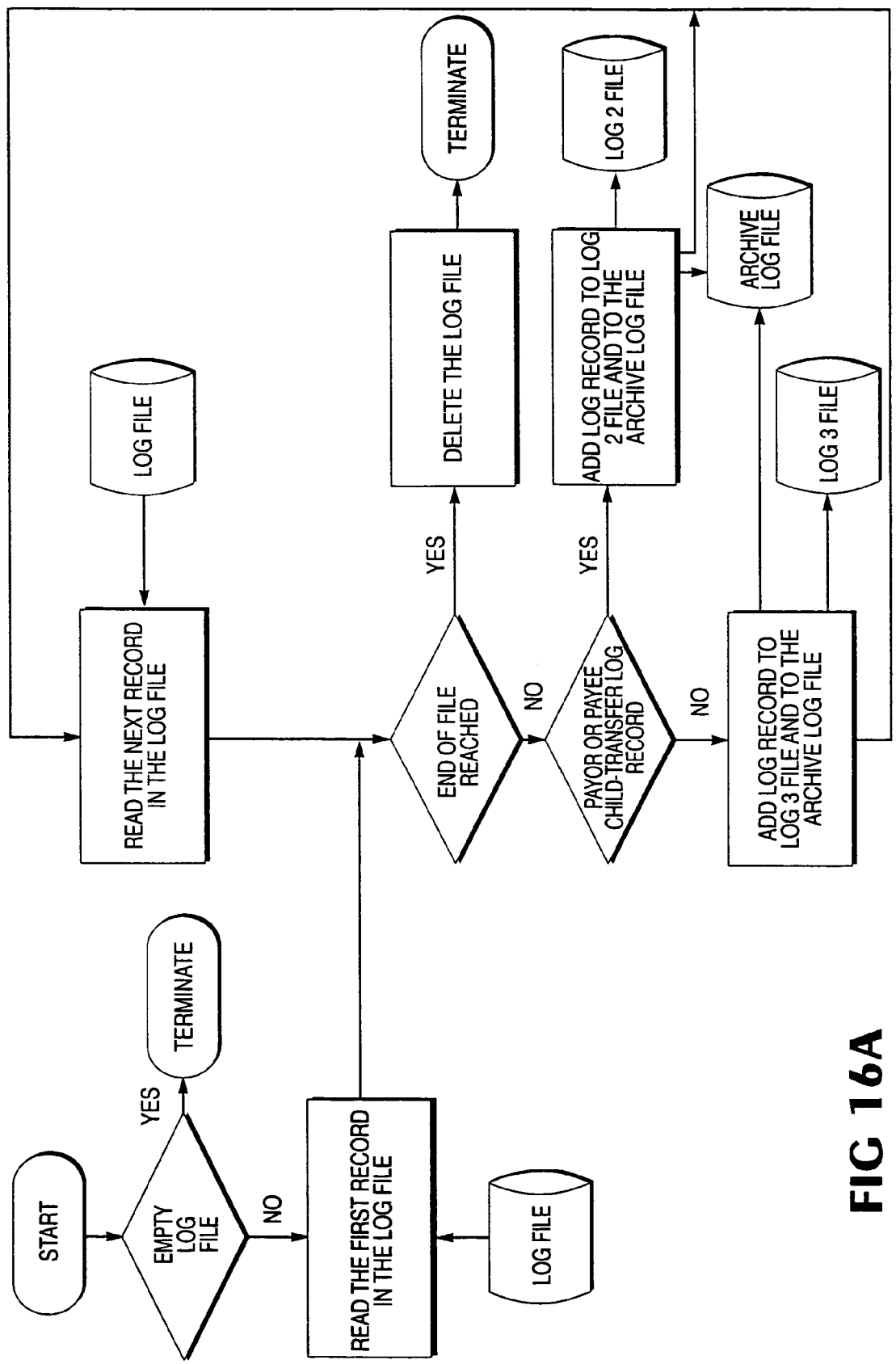
FIGS. 16A–16C are flowcharts depicting additional periodic scheduled processing for the system shown in FIG. 3.
Figure 16B:
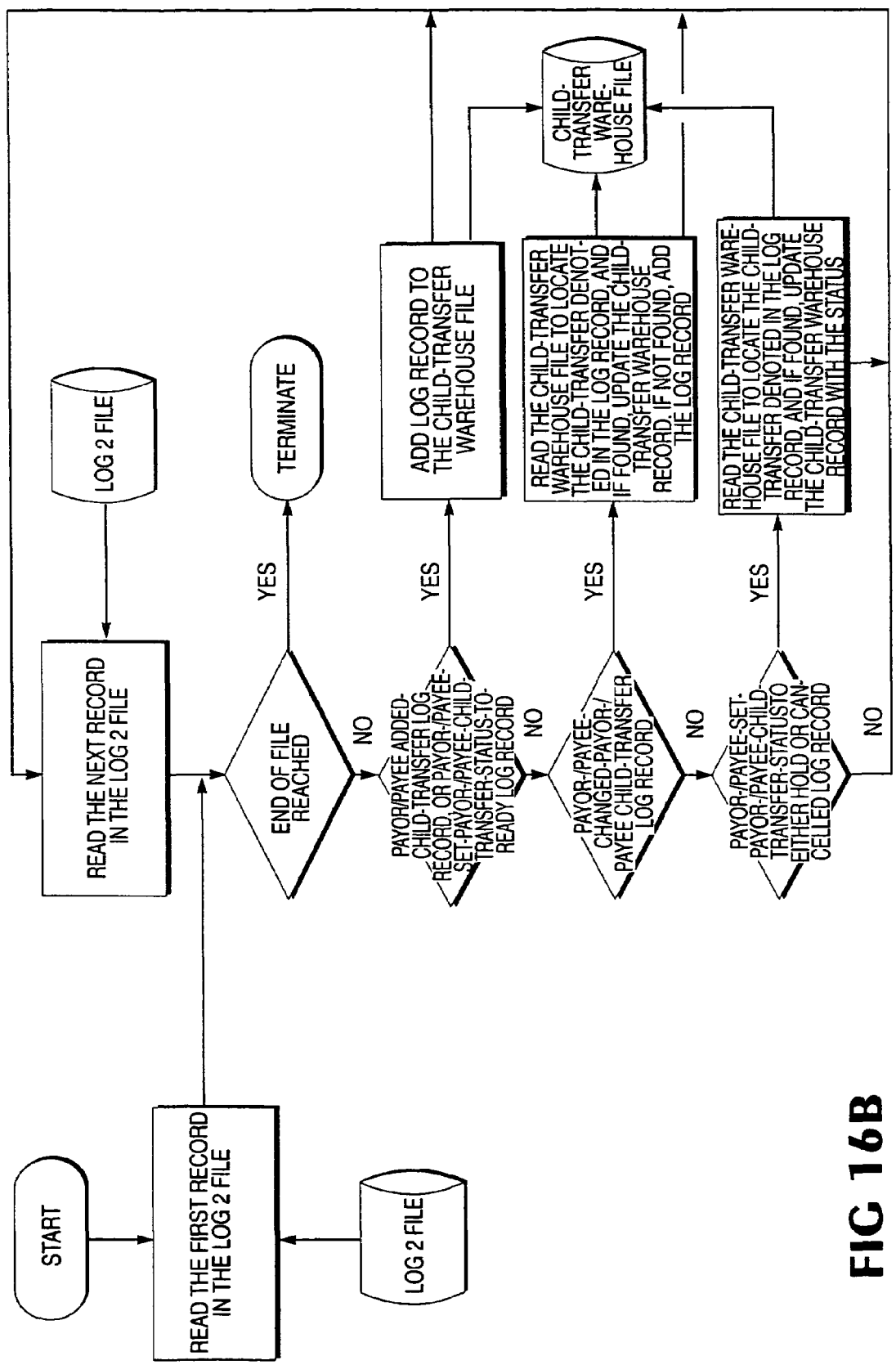
Figure 16C:
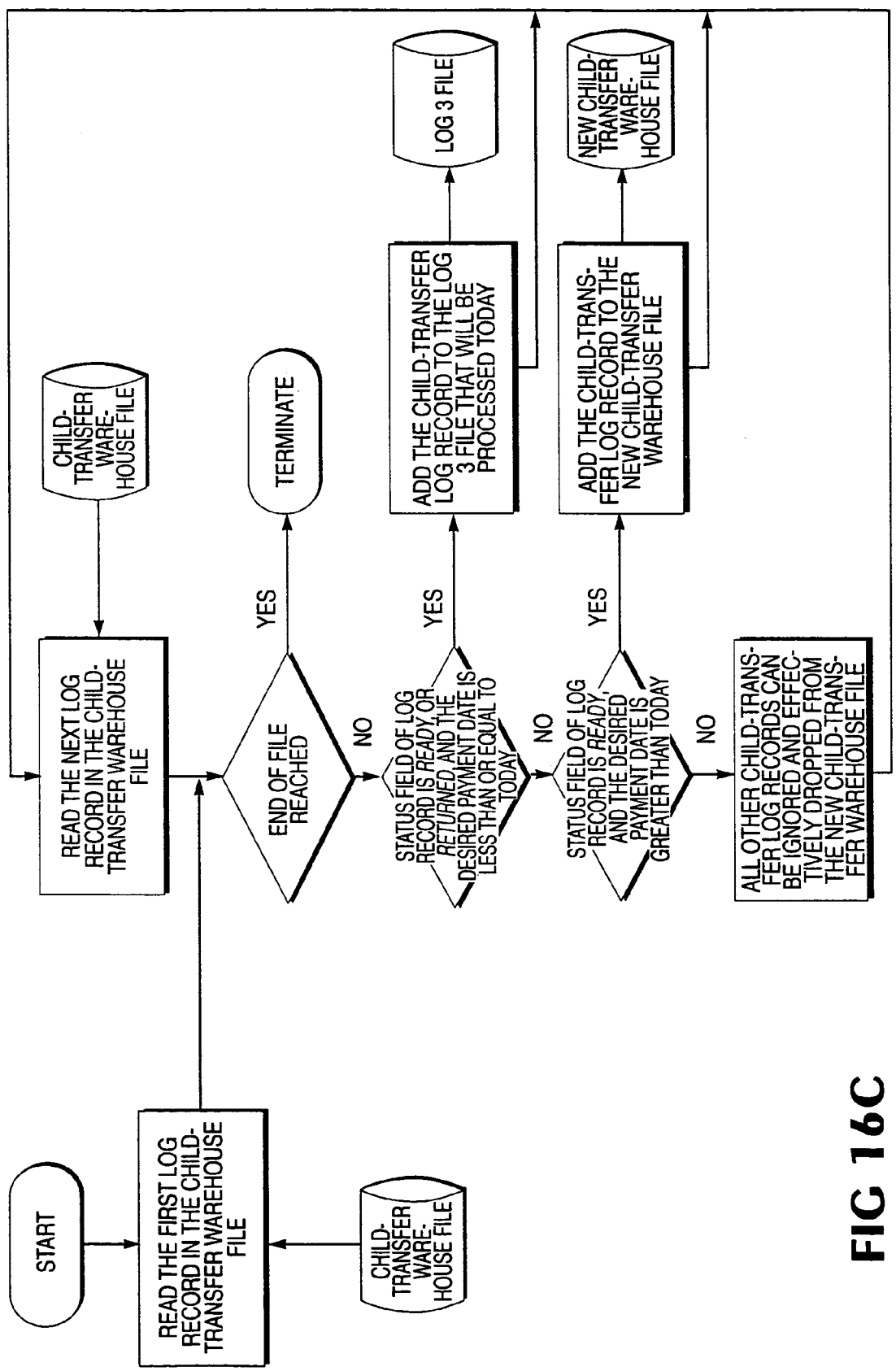

The second set of preferably periodic scheduled activities is references in FIG. 5 as main Log File split and warehouse file processing, which is described in more detail in FIGS. 16A, 16B, and 16C. Generally, over the course of each period, each Log Record is added to the Log File in the on-line files 160. Periodically, and preferably daily, the system 100 needs to perform additional processing using these Log Records. Since the Log File contains both payment-related Log Records and non-payment-related Log Records, a first pass is preferably made through the Log File to split the file into two sub-files ("Log 2 File" and "Log 3 File", as shown in FIG. 16A). The Log 2 File preferably contains all of the payment-related Log Records (e.g., Child-Transfer Log Records), while the Log 3 File contains all of the non-payment-related Log Records. The segregated Log Records are all preferably also saved in an archive Log File which is available in the off-line files 165 for use in research, historical documentation, and periodic statements and reports. This effective segregation is seen best in FIG. 16A, and is preferably implemented by central computer 170. As seen in FIG. 168, the entire Log 2 File is then read and each Child-Transfer Log Record is used to update the existing warehouse file (which is a temporary working file in the off-line files 165 where all of the Child-Transfer Log Records are placed).

Once these procedures have been completed, as seen in FIG. 16C, the entire warehouse file is then read and each Child-Transfer Log Record is analyzed. If a Child-Transfer Log Record is to be processed "today" and it has a Ready or Returned status, then the Child-Transfer Log Record is added to the Log 3 File for imminent processing. If the Child-Transfer Log Record has a Ready status, but its payment date is scheduled for the future, the Log Record is added to a new warehouse file for storage until future batch-processing iterations. Any other Child-Transfer Log Records may be discarded (i.e. deleted). Child-Transfer Log Records on Hold are deleted from the warehouse file, but remain in the system in the Payor File or Payee File.

The Log 3 File now contains all of the non-payment-related Log Records and all of the Child-Transfer Log Records that need to be processed immediately or "today".

Log File Processing

Figure 17:
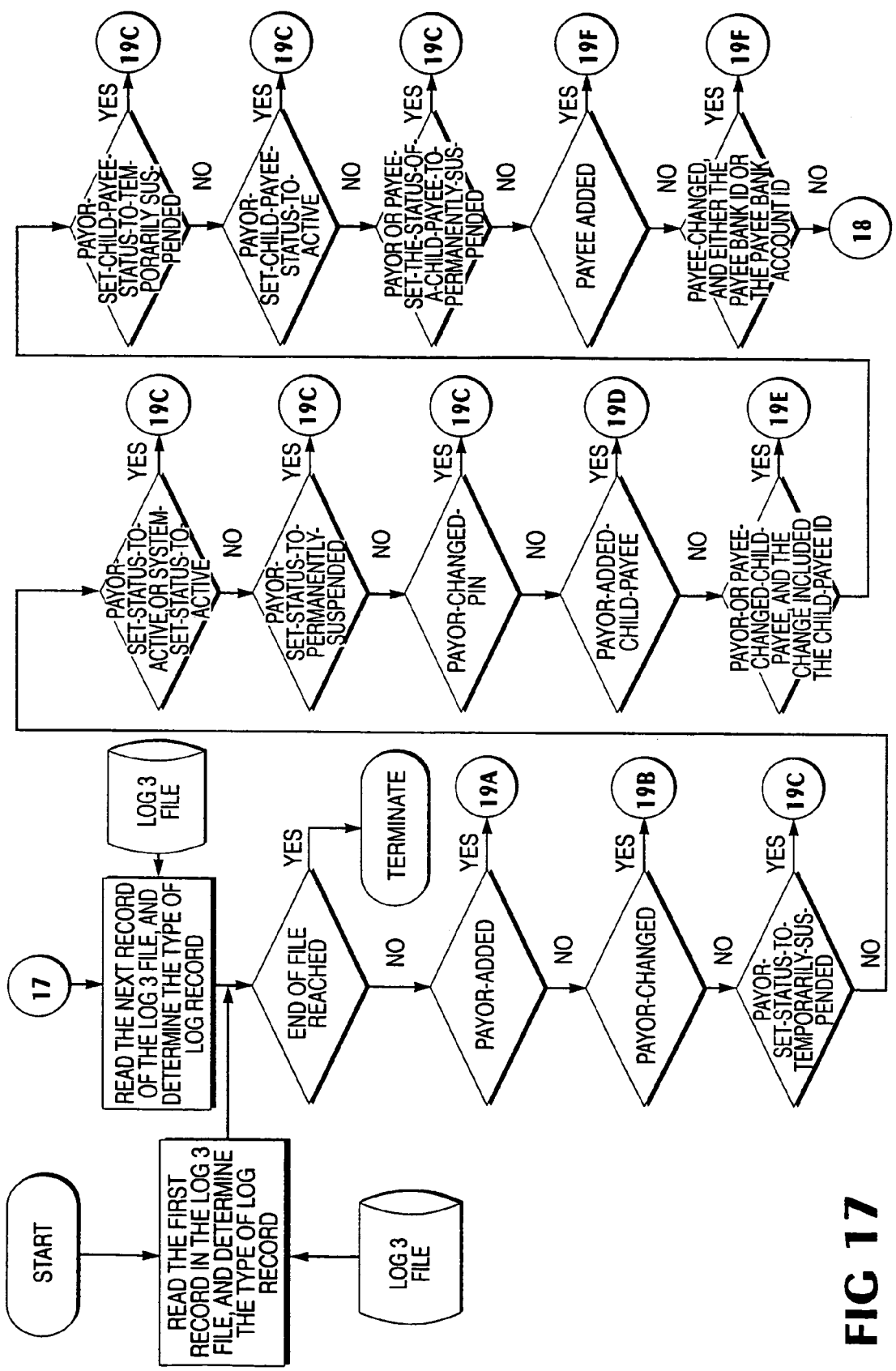
Figure 18:
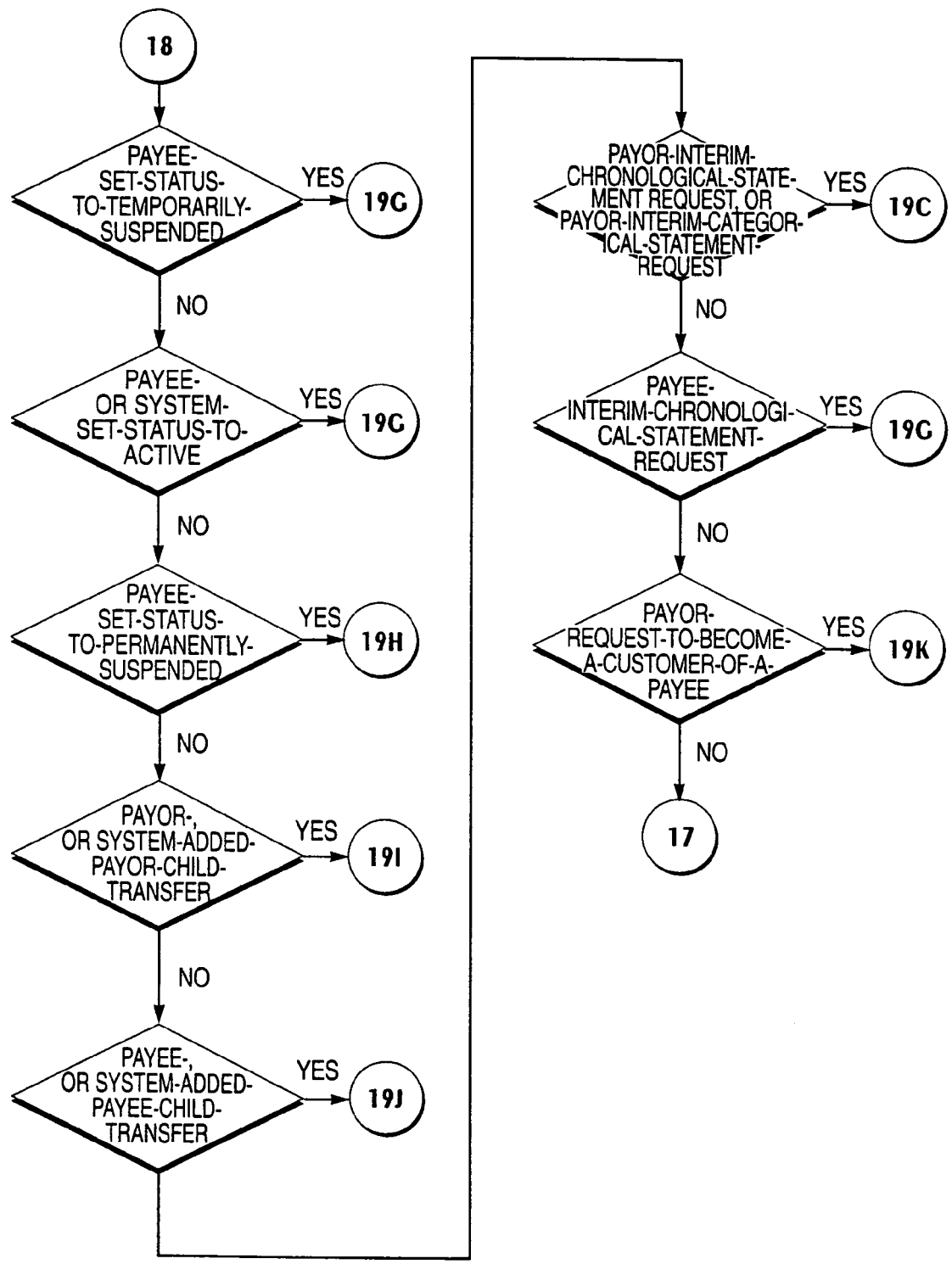
Figure 19A:
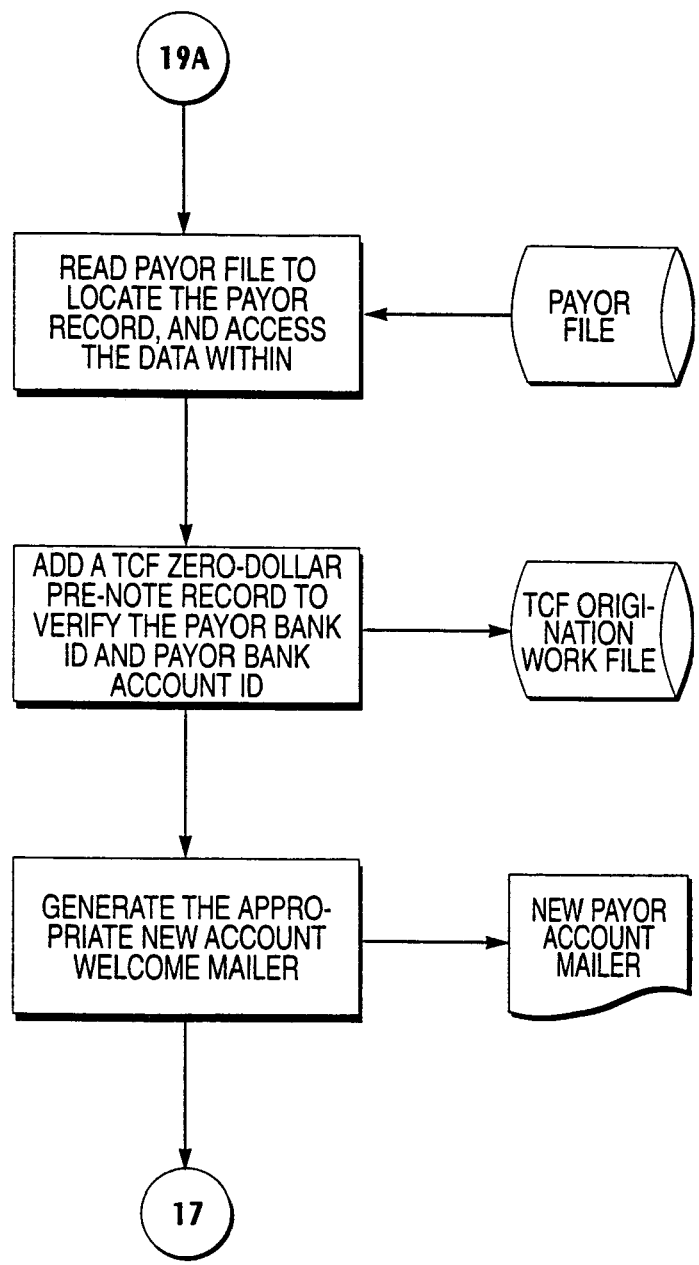

The third set of preferably daily scheduled activities is referred to in FIG. 5 as Log 3 File processing, which is illustrated in more detail in FIGS. 17, 18, and 19A through 19K. Turning to FIG. 17, the main loop of preferred processing parameters for the Log 3 File records is illustrated, where batch mode processing is implemented to handle all non-payment related Log Records (i.e. maintenance of the system), as well as the Child-Transfer Log Records. The reader understands that this is literally where the Payor Information and Payee Information is periodically taken from the on-line files and used to update the system and to process Child-Transfer Log Records. The central computer 170 accesses both the on-line files 160 and off-line files 165 to undertake this periodic processing. For example, where a Payor Record has been added to the system, the process of FIG. 19A is implemented, whereby a Pre-Note is provided to verify the applicable Payor Information. This Pre-Note is placed in the temporary TCF format origination work file of off-line files 165.

Figure 19B:
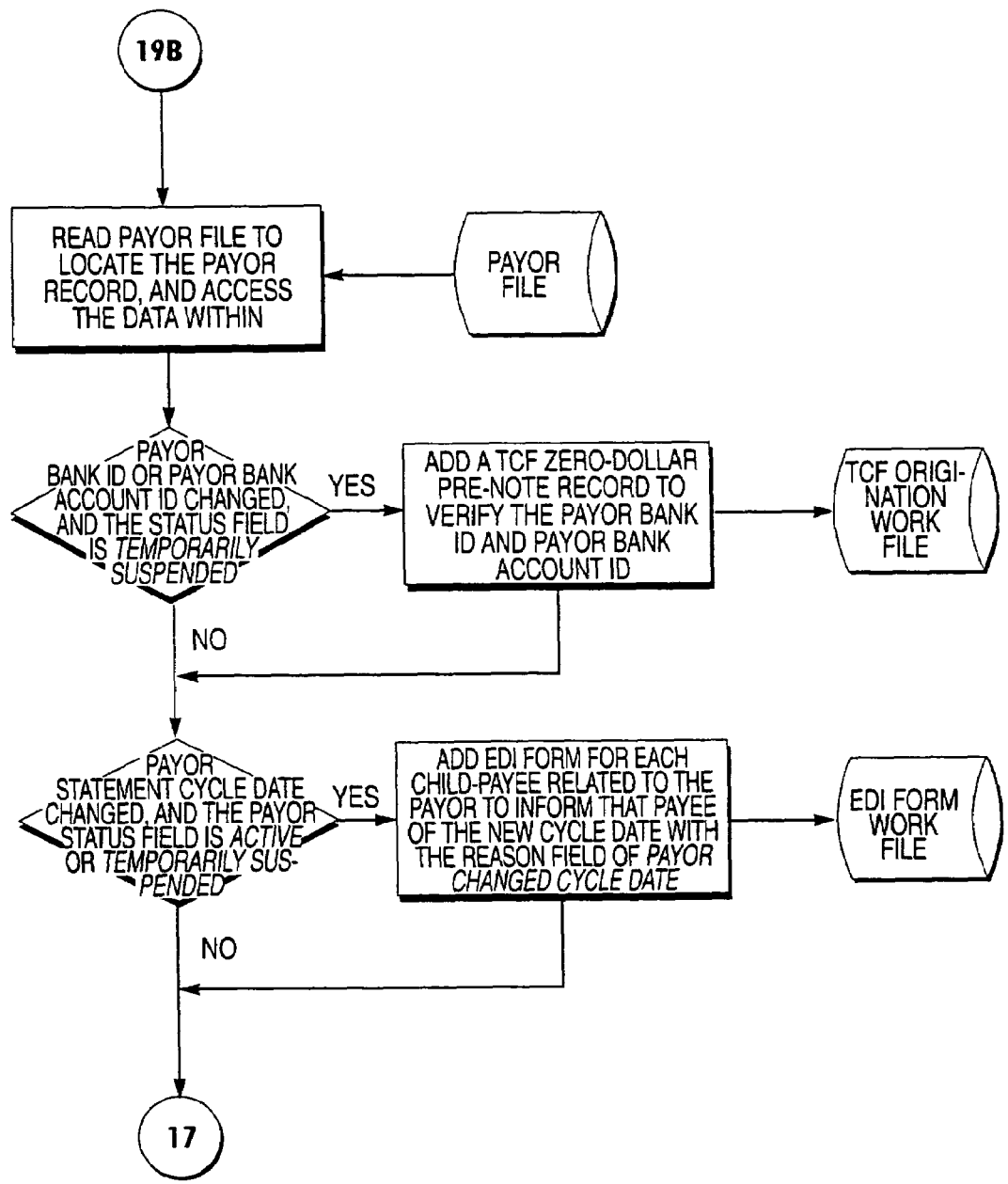
Figure 19C:
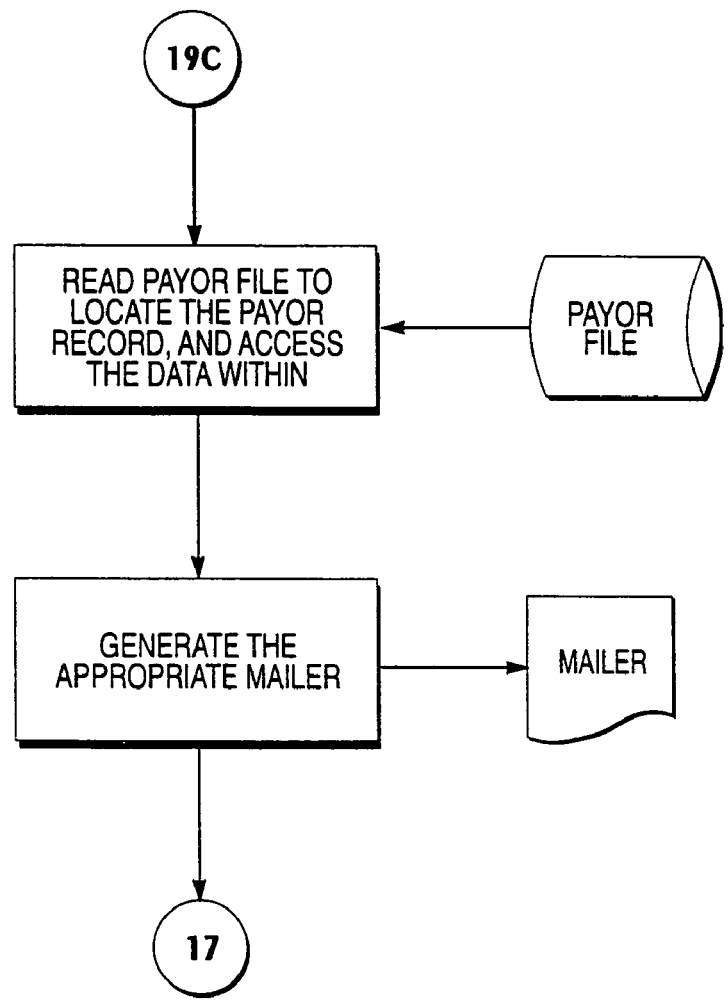
Figure 19D:
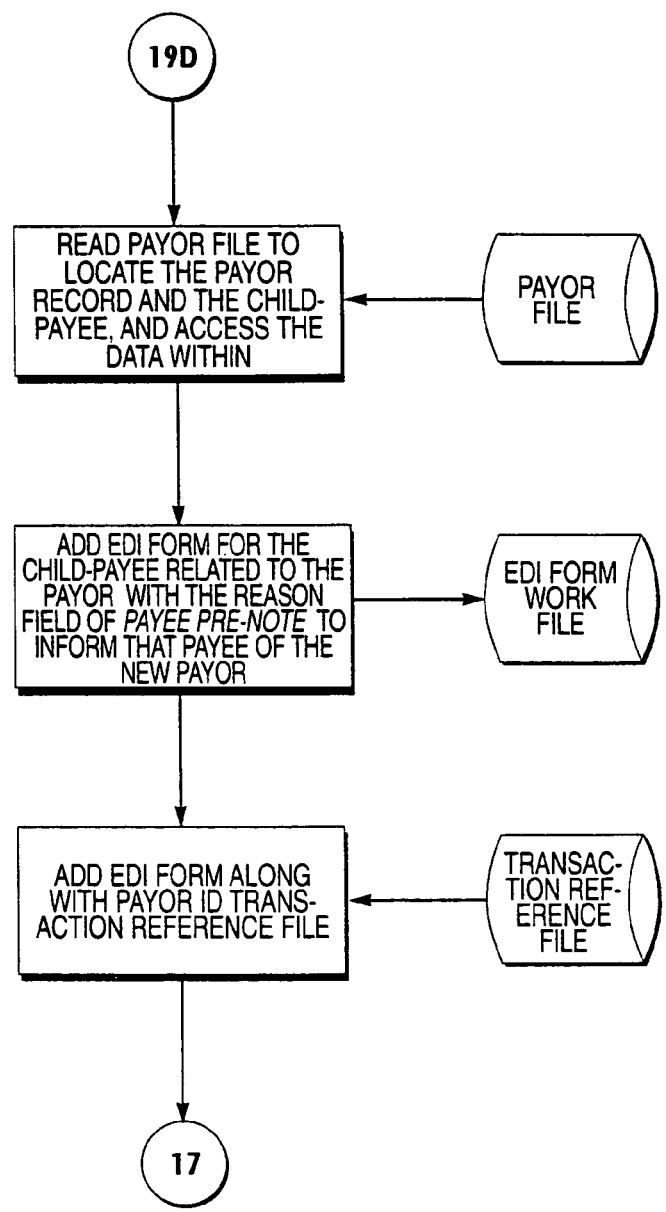

Similarly, where a Payor has changed a portion of its Payor Information in the system, FIG. 19B illustrates the process for handling these changes, including determining whether such information changes affect the Payor Bank or Payor BankAccount information. If it does, a Pre-Note is issued to verify the new information. If other Payor Information has been changed which affects a Payee in the system, an appropriate EDI Form for delivery to particular Payees is provided as appropriate. FIG. 19C illustrates processing of Log Records which require mailers or other notifications, some of which have been described above. FIG. 19D illustrates batch processing of Log Records wherein a Child-Payee record has been added which requires the addition of a Pre-Note to the Payee (i.e. EDI Form), as well as an addition of a Transaction Reference Record to the Transaction Reference File for future reference in the off-line files 165.

Figure 19E:
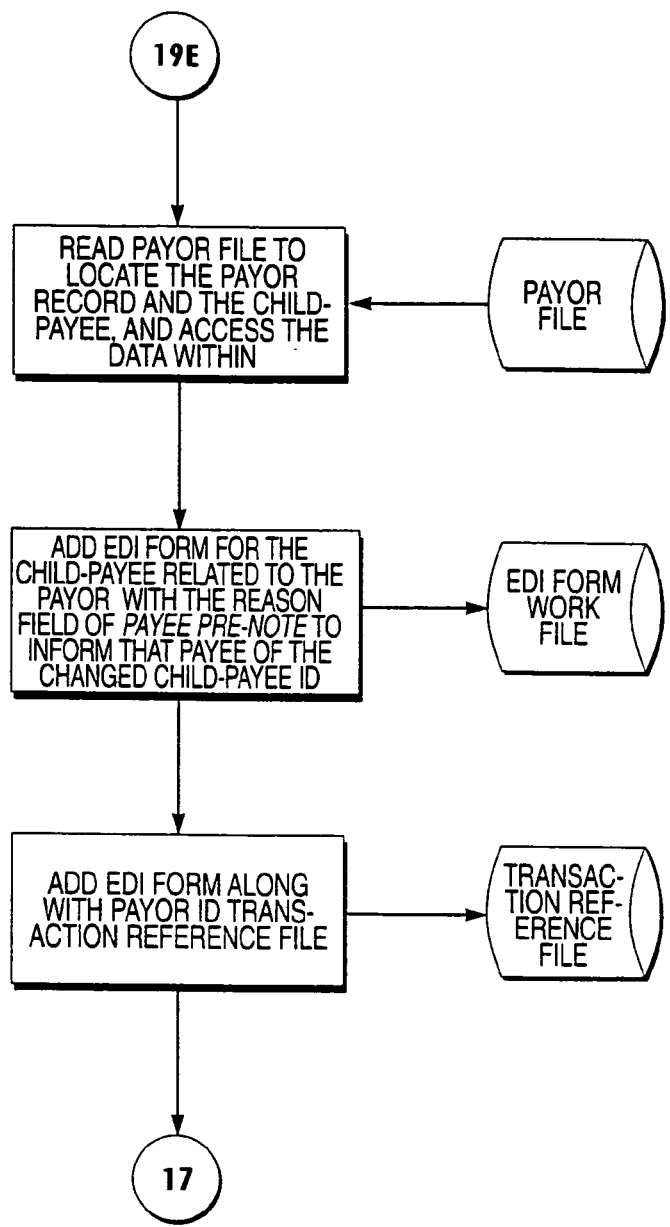
Figure 19F:
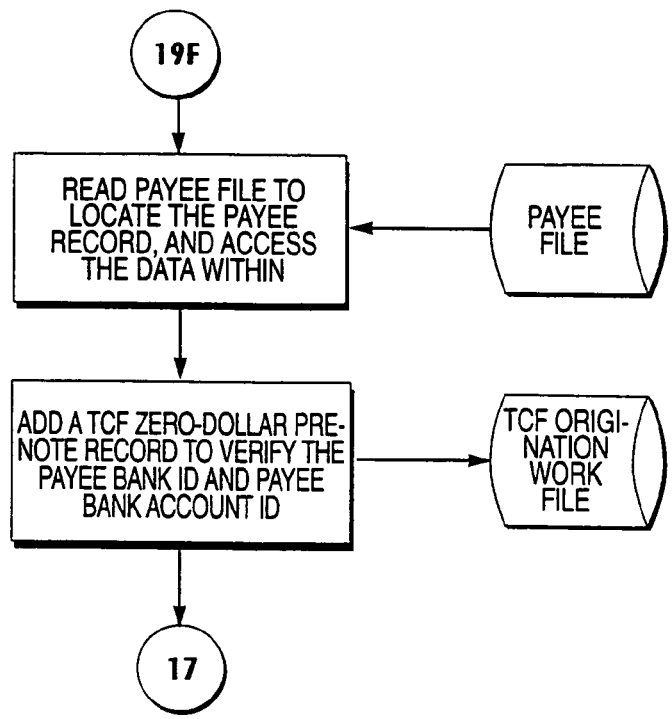
Figure 19G:
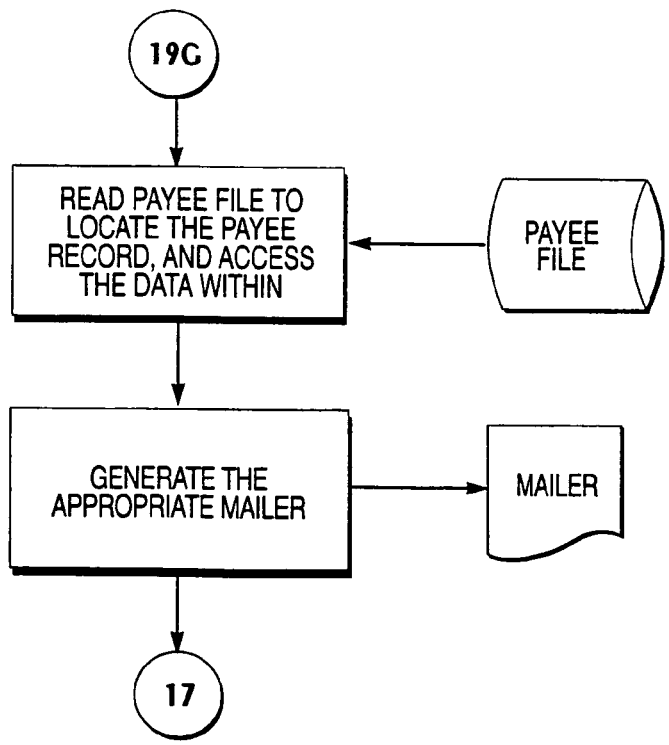

FIG. 19E illustrates the situation where a Payor has initiated a change to a Child-Payee record, and the Child-PayeeID has been changed. This situation arises, for example, where a Payor has changed his account number with a Payee due to a lost credit card or the like. In this situation, the on-line Payor File with the changed information is accessed, an appropriate EDI Form Pre-Note to the Payee is provided, and a Transaction Reference Record is added to the Transaction Reference File. FIG. 19F is quite similar to FIG. 19A, and provides the details for processing the addition of a Payee Record and the generation of an appropriate Pre-Note for verification. FIG. 19G is similar to FIG. 19C, and applies to processing of Log Records which require mailers or notices from the system.

Figure 19H:
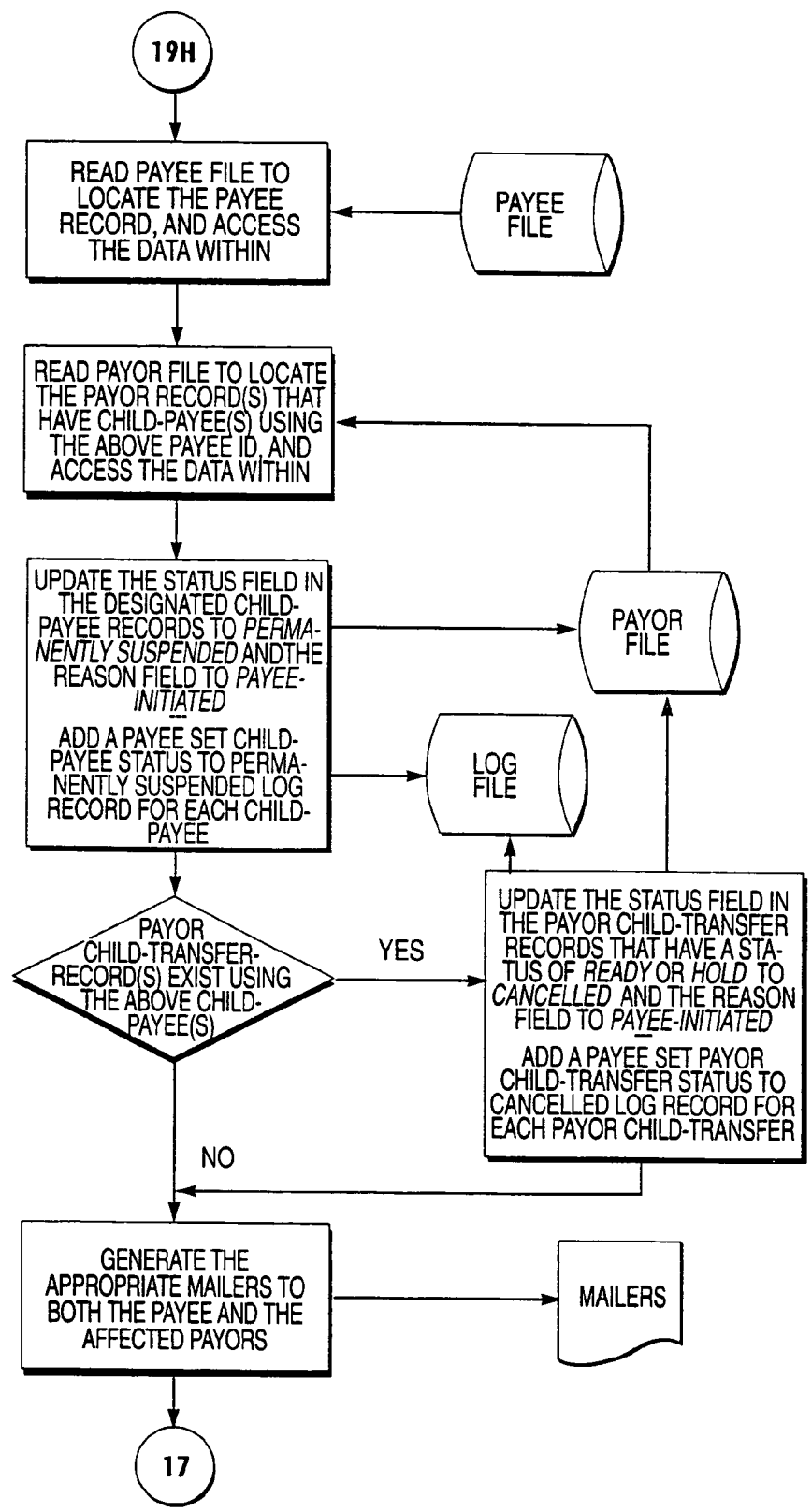

As previously discussed there may be situations in which, the status field of a Payee Record is set at the value of Permanently Suspended. FIG. 19H illustrates the batch processing of such a situation, wherein all Child-Payee records are located from the various Payor Records in order to be updated to the status of Permanently Suspended, and the generation of appropriate notification to both Payee and affected Payors.

Figure 19I:
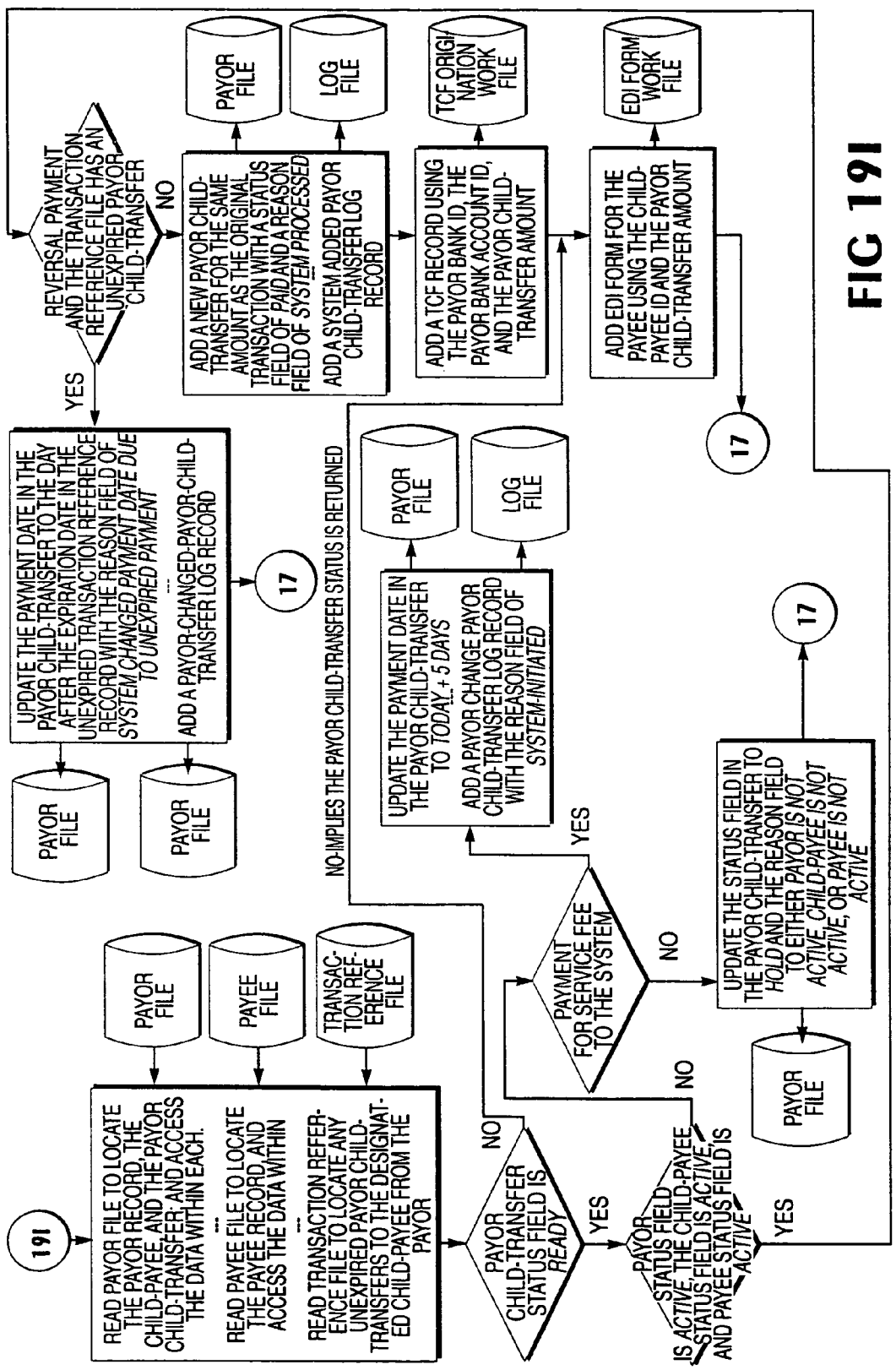

FIG. 19I illustrates the processing of Payor Child-Transfers for various Payors in the system. This procedure facilitates provision of one of the advantageous features of the overall system, wherein periodic Bill Data in the form of Payor Child-Transfer records are automatically paid to a plurality of Payees on behalf of a Payor, unless that Payor undertakes positive action to prevent a particular payment from being made, to modify the payment amount, or to reverse a payment made by the system within an allowed Provisional Period. As illustrated, the central computer 170 accesses the Payor File, Payee File, and Transaction Reference File from both the on-line files 160 and the off-line files 165 in order to process the Payor Child-Transfer records and to initiate payments. If the Payor Child-Transfer status field is Ready and the Payor Record status field, Child-Payee record status field, and Payee Record status field are all Active, the Payor Child-Transfer is processed, and a new Payor Child-Transfer record with a status field having a value of Paid is added in the Payor File. A record is also created utilizing the Payor BankID and Payor BankAccountID. and this information is stored in the temporary TCF format origination work file. Notification to the Payee of payment is also generated via an EDI Form which is stored in the EDI Form work file in the off-lines 165.

If the status field in the Payor Record, Child-Payee record, or Payee Record status fields is not Active, the status field of the Payor Child-Transfer record (if not for Operator fees) is set to Hold until that situation is rectified. It should be noted that once a Payor Child-Transfer record is placed in the Hold status, it is only changed to an Active status by positive action by the Payor in order to be processed by the system. If the status field in the Payor Record, Child-Payee record, or Payee Records are not Active, and the Payor Child-Transfer record is one for Operator fees to be paid by the Payor to the Operator (i.e., the Operator fee Payor Child-Transfer record is ready for payment today, see FIG. 23A), the system marks the Payor Child-Transfer record to be queued for processing in a predetermined number of days (e.g. five days), and the record is replaced in the Payor File and a new Child-Transfer Log Record is added to the Log File so that the system retries the processing of the Child-Transfer Log Record for Operator fees later. FIG. 19I also illustrates the situation where a Payor has directed a "reversal of payment" of a Payor Child-Transfer with a status field value of Paid, but the Transaction Reference Record relating to such Paid Payor Child-Transfer has not yet expired (as described below with reference to FIG. 21). In this situation, the payment date of the reversal Payor Child-Transfer record is updated to ensure that the reversal is initiated one day after the expiration date of related Transaction Reference Record and a new Child-Transfer Log Record is added to the Log File.

Figure 19K:
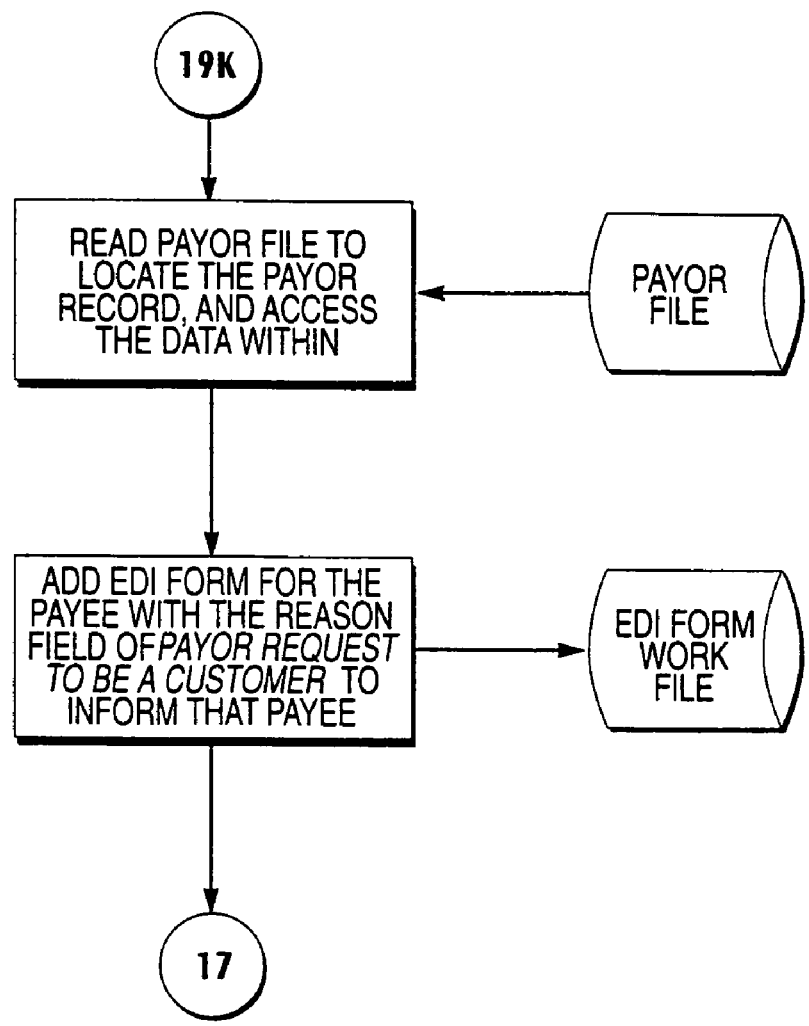

FIG. 19J illustrates the processing of Payee Child-Transfer for various Payees in system 100. This procedure facilitates the collection of services fees due the Operator for services provided to the Payee. The processing that is performed in FIG. 19J is much like that of 19I for Payor Child-Transfers. FIG. 19K illustrates the processing that is required to properly inform the Payee when a Payor has requested to become a new customer of such Payee (e.g. FIG. 8K). System 100 allows the Payor to request that certain Payor Information be provided to a Payee for this purpose.

EDI Forms Origination Processing

Figure 20:
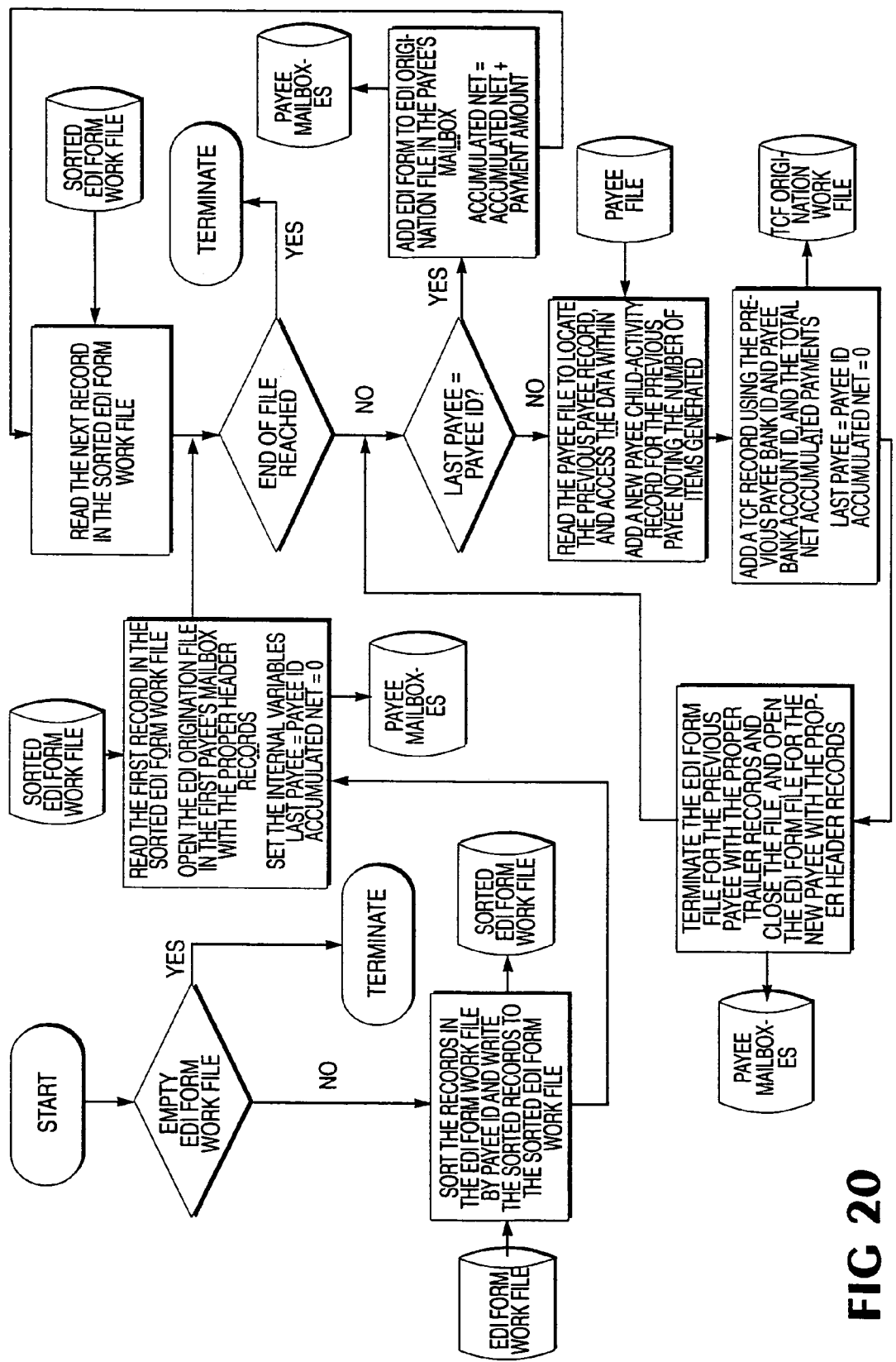
FIG. 20 is a flowchart depicting further detailed processing for EDI Forms to be originated to payees for the system shown in FIG. 3.

The fourth set of preferably daily scheduled activities is referenced in FIG. 5 as EDI Form processing, and is described in more detail in FIG. 20. In this portion of the inventive system, all of the forms written to the EDI Form work file are sorted by Payee, are separated into individual EDI Form files for each Payee, and are stored in the respective Payee's mailbox. In the preferred embodiment, the Payor Child-Transfer information and Child-Payee information provided to the Payees is communicated from the central computer 170 in EDI formats as currently specified by the Accredited Standards Committee (ASC) X.12 Electronic Data Interchange within the American National Standards Institute (ANSI). In the event that the Payee is unable to communicate electronically within the EDI X.12 standard, the central computer 170 can translate the EDI X.12 format to the one used by the Payee using a data re-formatter, such as the Vector:Connexion program discussed above, or make available the information to the Payee via other means (e.g., reports).

FIG. 20 also illustrates the accumulation and netting procedures of system 100, wherein all payments and reversals for a particular Payee are netted so that a single net debit or credit position may be determined for that Payee. This single net debit or credit position or amount is used to generate the settlement message sent to a TCF as described below with reference to FIG. 21. It is contemplated that this arrangement may save transaction costs and simplify the overall implementation of the system among the various Banks and Payees. The process illustrated in FIG. 20 automatically updates the Payee File and TCF format origination work file with the accumulated amounts when the last record pertaining to a particular PayeeID has been processed by central computer 170.

TCF Item Origination

Figure 21:
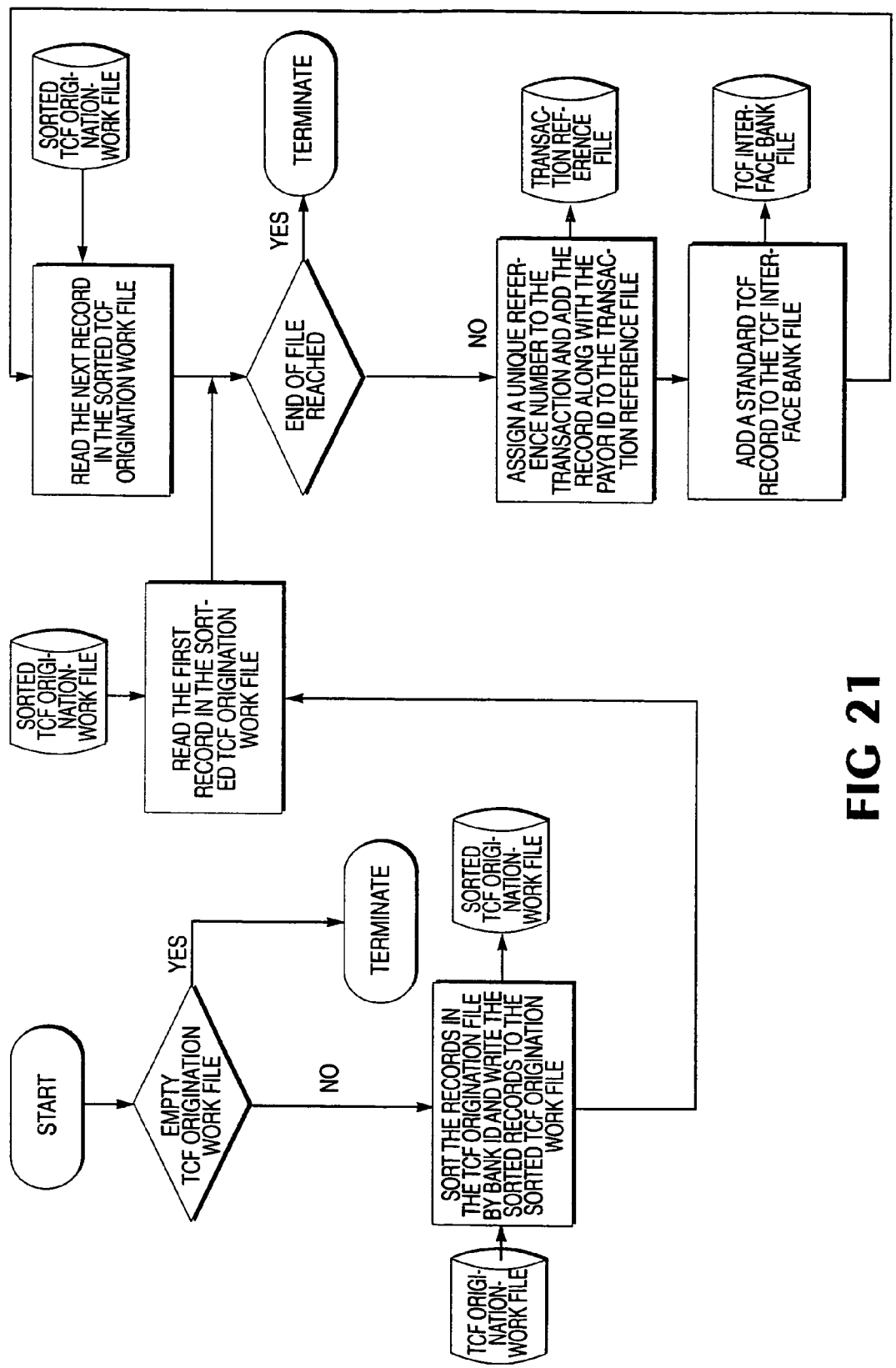
FIG. 21 is a flowchart of the origination of, forwarding, and date control processing of items to be sent by the system shown in FIG. 3.

The fifth and final set of preferably daily scheduled activities is referred to in FIG. 5 as TCF item origination, which is illustrated in more detail in FIG. 21. This process simply sorts the records in the TCF format origination work file and writes them to an TCF format origination file that may be sent (preferably electronically through interactive equipment) to the applicable Payor Banks and Payee Banks, to the applicable TCFs for distribution to Payor Banks and Payee Banks and/or to the TCFlnterfaceBank for distribution to the applicable TCFs. In addition, a corresponding Transaction Reference Record for each record sent by system 100 is written to the Transaction Reference File in off-line files 165 with a proper expiration date. It is contemplated that a Bank may return an item to the applicable originator within a predetermined time period (e.g. 24 hours) after receiving the item. With the inherent delays in transferring data the system 100 maintains a later expiration date (e.g. four days) after the origination date within the Transaction Reference File. This is done for several reasons.

First, if an item is returned, the Transaction Reference File is used to identify the PayorID from which the Payor Child-Transfer originated through the use of the reference number field. If a Payor attempts to reverse a Payor Child-Transfer prior to the expiration date of the related Transaction Reference Record, the system automatically schedules the initiation of such reversal for the next business day following such expiration date. This safeguard tends to minimize the potential of fraudulent transactions, where a Payor could otherwise initiate a Payor Child-Transfer to a Payee, then reverse the Payor Child-Transfer back from the Payee. If the funds in the Payor BankAccount are insufficient to cover the original Payor Child-Transfer, the Payor Bank returns such item unpaid, but the Payor Child-Transfer reversal generates a credit to the Payor BankAccount giving the Payor funds to which it is not entitled. The expiration date within the Transaction Reference Record for each Child-Transfer Log Record prevents this scenario from happening.

Referring to FIG. 21, it is preferred that the TCF format origination file be sorted so that items destined for the same end point (e.g. destined for the same TCF) are grouped together, with the sorted files being temporarily maintained in the off-line files 165 as sorted TCF format origination work file. As each record from the sorted TCF format origination work file is processed, a unique reference number is preferably added to the record along with the Payor BankID and Payor BankAccountID, or the Payee BankID and Payee BankAccountID, as appropriate. The unique reference number, along with other necessary information, is stored in a Transaction Reference Record in the Transaction Reference File for future use, and a monetary transfer of funds record compatible with the applicable end point, preferably in a standard TCF format such as the National Automated Clearinghouse Associations (NACHA) format, is added to a new TCF format origination file. Upon completion of the daily scheduled processing tasks (e.g., FIG. 5), appropriate records are forwarded to the appropriate end point to complete the payment transaction, and settle monetary amounts between and among Payors, Payees and/or the Operator. Such forwarding and settlement can be accomplished by sending the TCF format origination file to the TCFlnterfaceBank which in turn originates such information to the TCF for ultimate distribution to and settlement with applicable Banks. It is also contemplated that the settlement of funds for Payor Child-Transfer transaction, particularly credits to Payees, could be accomplished by any number of means such as issuance of a paper check, wire transfer, TCF or other arrangements.

Other Scheduled Processing Tasks

In addition to the unscheduled transactions that are performed within the system on a periodic basis, and the set of scheduled processing tasks that occur on a periodic basis, there is also preferably another set of scheduled processing tasks. The scheduled processing tasks are generally grouped into five defined sets of activities, as illustrated in FIG. 6.

Child-Payment Fixed Payment Processing

Figure 22:
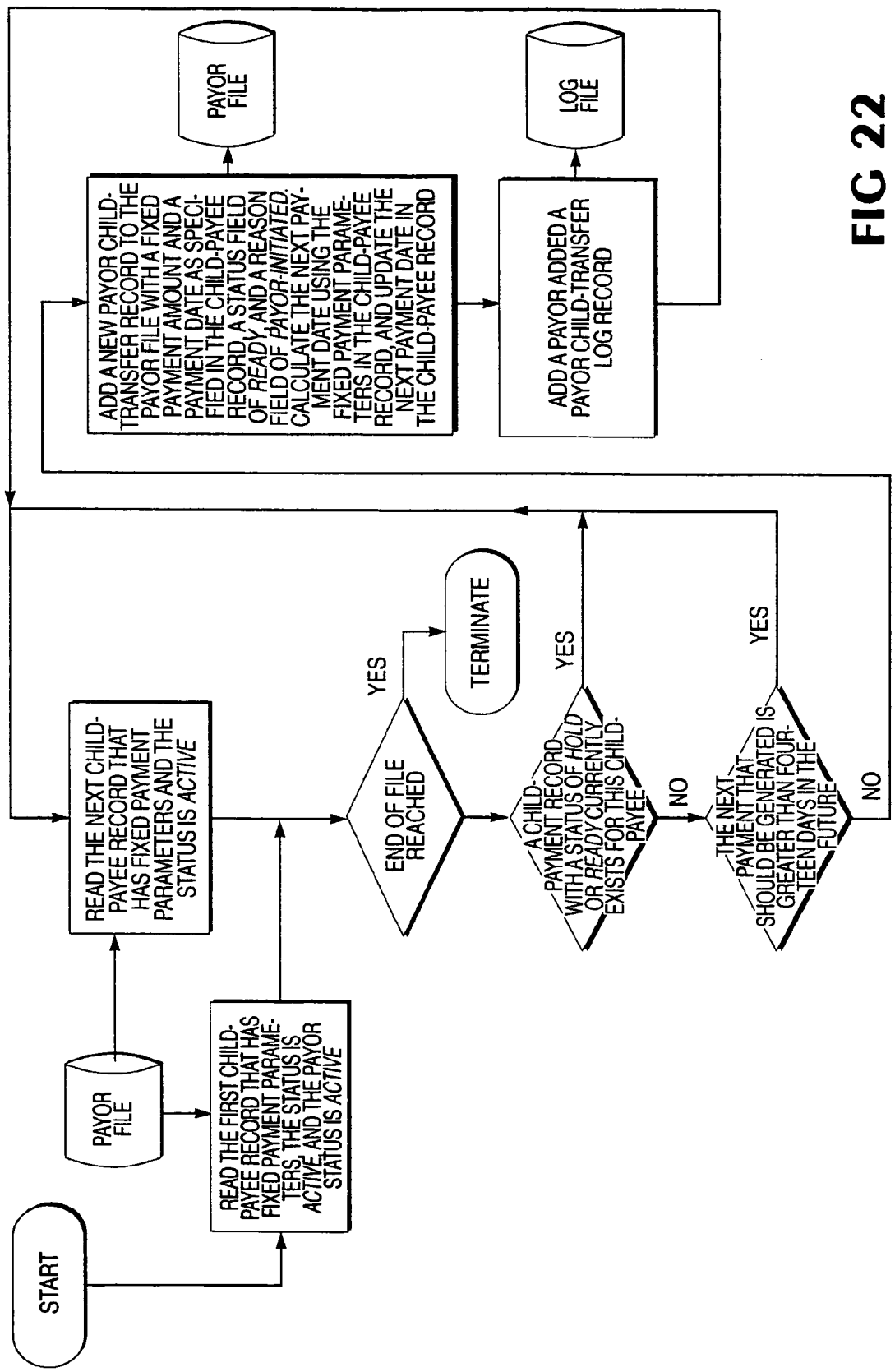
FIG. 22 is a flowchart depicting the creation of payor child-transfer records on a periodic basis for a fixed amount for the system shown in FIG. 3.

The first set of scheduled activities is Child-Payee fixed payment processing which is described in more detail in FIG. 22. This process is performed periodically (e.g. once a week) for those Child-Payee records that have fixed payment parameters and a next due date within some predetermined period (e.g. 14 days). This allows generation of the applicable Payor Child-Transfer records sufficiently in advance to permit a Payor to change, modify or cancel such Payor Child-Transfer prior to initiation of payment. Only those Payors that have a status field value of Active and a related Child-Payee status field value of Active are processed under this scheduled activity. If a Payor Child-Transfer record for the same Payee (e.g. same Child-PayeeID) currently exists for the Payor and has a status field of Ready or Hold, then the process in FIG. 22 is bypassed for such Child-Payee but is considered during the next periodic fixed payment processing. Once the Payor Child-Transfer record is created and added to system 10, the Payor Child-Activities shown in FIGS. 10B–10G are available to the Payor.

Chronological Statement Processing

Figure 23A:
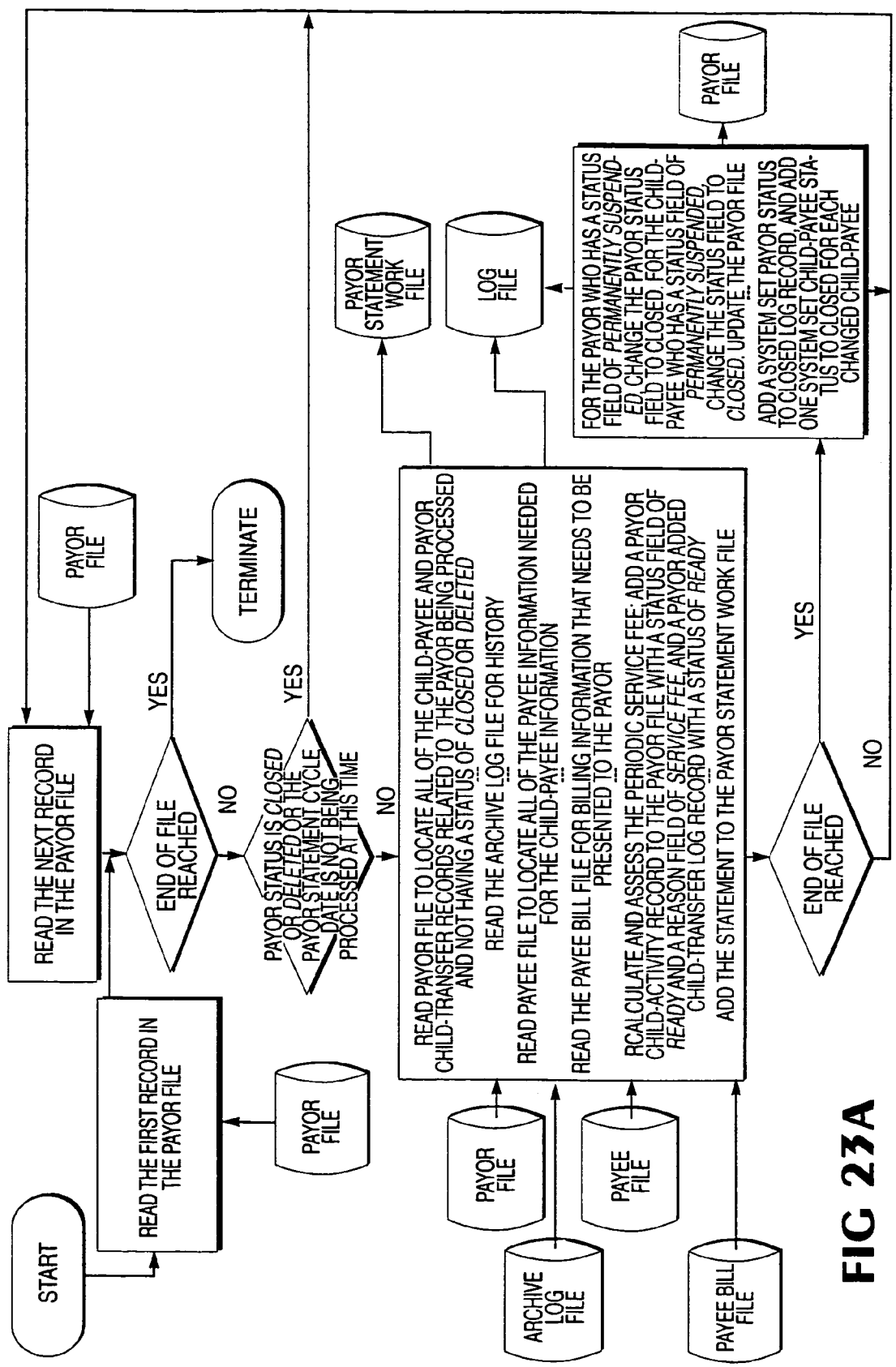
FIGS. 23A–23B, 24A–24B and 25A–25B are flowcharts illustrating a preferred process for providing periodic scheduled processing and reports for the system shown in FIG. 3.
Figure 23B:
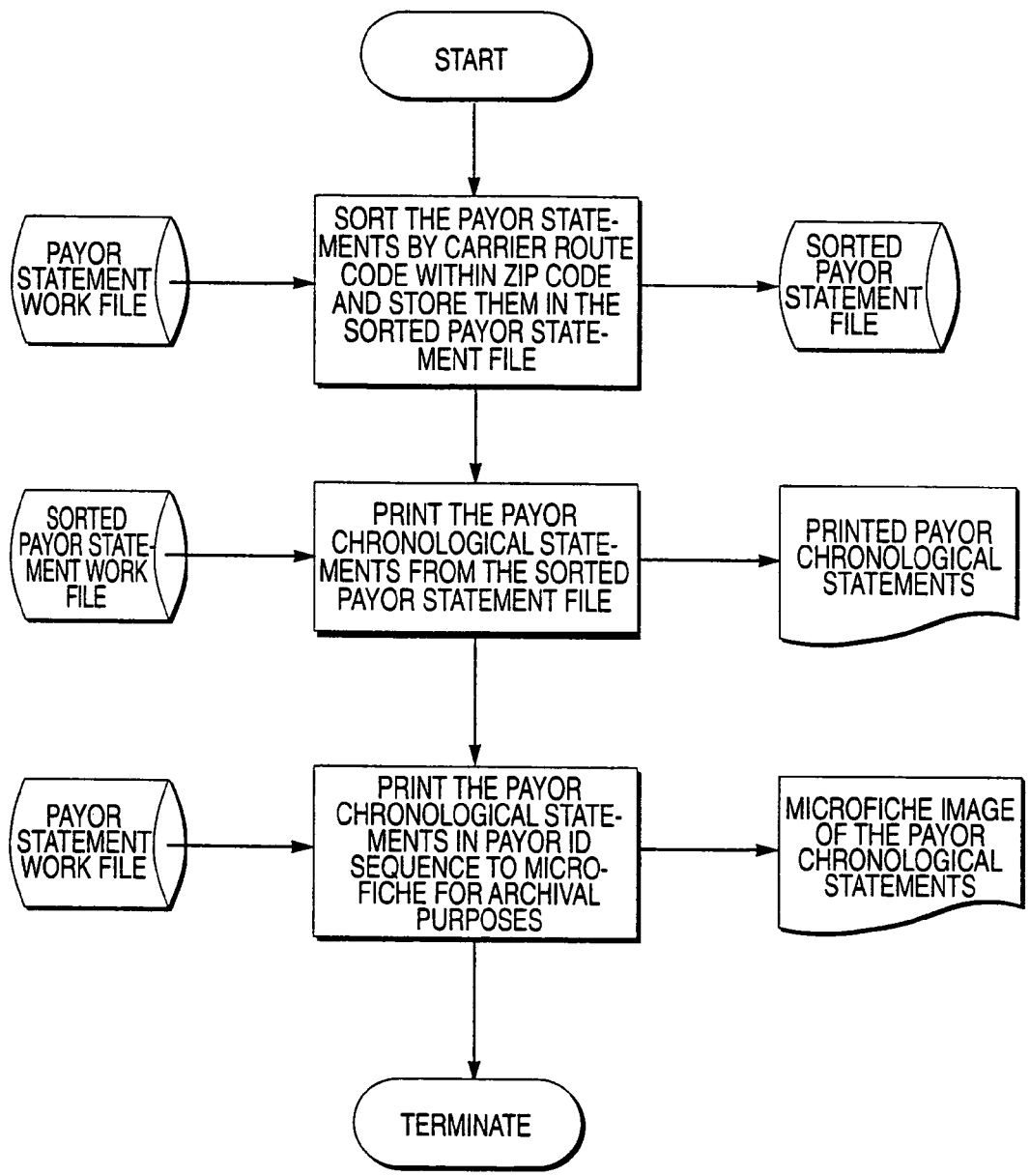

The second set of scheduled activities is chronological statement processing, which is described in more detail in FIGS. 23A and 23B, and is preferably performed periodically (e.g. on a monthly basis) or on request. Based upon the statement cycle date chosen by the Payor (i.e. the preferred periodic timing chosen by the Payor), this set of tasks are performed on days that facilitate the creation of the statement at the proper time. For example, if the Payor elects to receive the system statement by the fifteenth of each month, then the Payor selected statement cycle date may cutoff transactions to be included in the statement at the tenth of each month to ensure that the Payor receives the statement by the fifteenth. Additionally, the Payor may request through interactive means that a statement be created. The important point to note is that only those Payors that have a status field value of Active, Temporarily Suspended, or Permanently Suspended receive a statement. Whenever a Payor Record has a status field value of "Closed," the system 100 initially sets the status field value to Permanently Suspended for the Payor Record. After the first statement is generated for each Payor with a Permanently Suspended status, the status field is updated to the Closed value. This mechanism is used to ensure that only one statement is generated for a Closed Payor Record. This obviates superfluous paperwork once a Payor is no longer active, and allows keeping the system's data bases current.

As illustrated in FIG. 23A, the central computer 110 reads the Payor File to locate all of the Child-Payee records that did not have a status of Closed or Deleted, and accesses the Payee File to locate all of the necessary information needed to provide an understandable and complete periodic statement of activities. Additionally, the periodic service fee may be automatically included with this statement, whether that fee is based upon actual transactions, a flat service fee, or a combination of flat fee plus service transaction costs. Service fee information for the Payor is collected in the Payor Child-Activity record which is used to create an appropriate Payor Child-Transfer record with a status field value of Ready. The service fee is then debited from the Payor BankAccount by the initiation of such Payor Child-Transfer record. The information from the Log File, Payor File, and Payee File, along with the service fee record is added to the Payor's chronological statement work file, which is a temporary work file in the off-line files 165. If the Payor Record or Child-Payee record being processed has a status field value of Permanently Suspended, this status field is changed in this process to Closed to ensure a final cutoff of statements for inactive Payors, as discussed above.

FIG. 23B shows the preferred process and interaction of system 100 with apparatus for making available reports (e.g. printers, microfiche, imaging equipment, magnetic tape devices, etc.). Particularly, the Payor chronological statement work file is preferably sorted in some predetermined manner (preferably by zip code and carrier route code to minimize mailing costs) to consolidate reports to be mailed in a most efficient way. The sorted chronological statement work file for the Payor is then printed on-line or downloaded for remote printing and such information is made available to individual Payors. For archival purposes, the Payor statements are saved such as by microfiche imaging or other compressed storage facilities.

Categorical Statement Processing

Figure 24A:
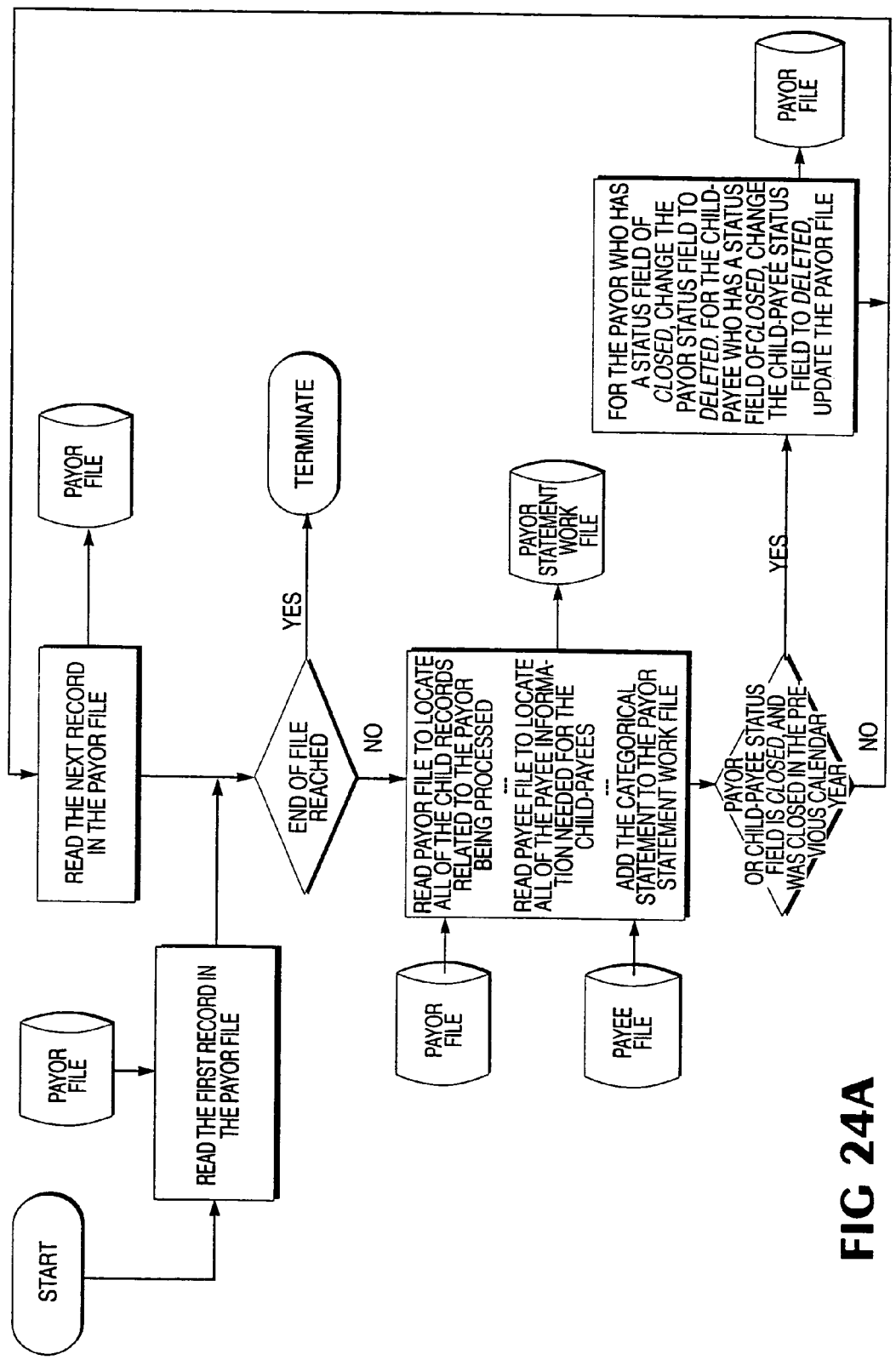
Figure 24B:
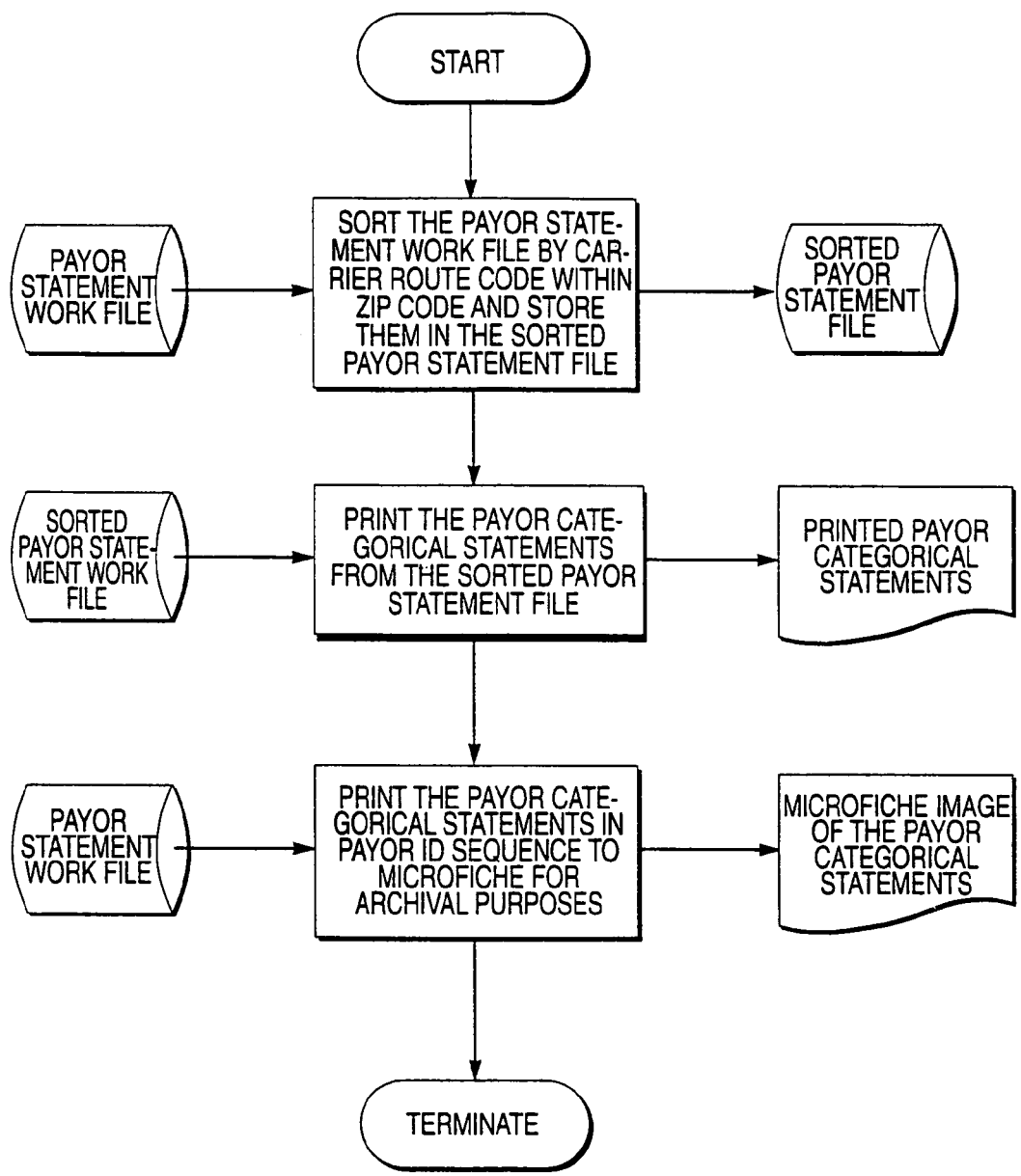

The third set of scheduled activities is categorical statement processing, which is illustrated in more detail in FIGS. 24A and 24B. This set of processing tasks is preferably performed periodically (e.g. at the end of each calendar year) or upon request of the Payor, and generates a statement for each Payor that has a status field value of Active, Temporarily Suspended, Permanently Suspended, or Closed. After the statement is generated for each Payor with a Closed status, the status field is updated to Deleted. This mechanism ensures that when purge processing occurs in the future, those Payors that have a Deleted status are removed from the system. FIGS. 24A and 24B similarly comprise steps and equipment interfaces which correspond to that described in FIGS. 23A and 23B.

Periodic Statement/Invoice Processing

Figure 25A:
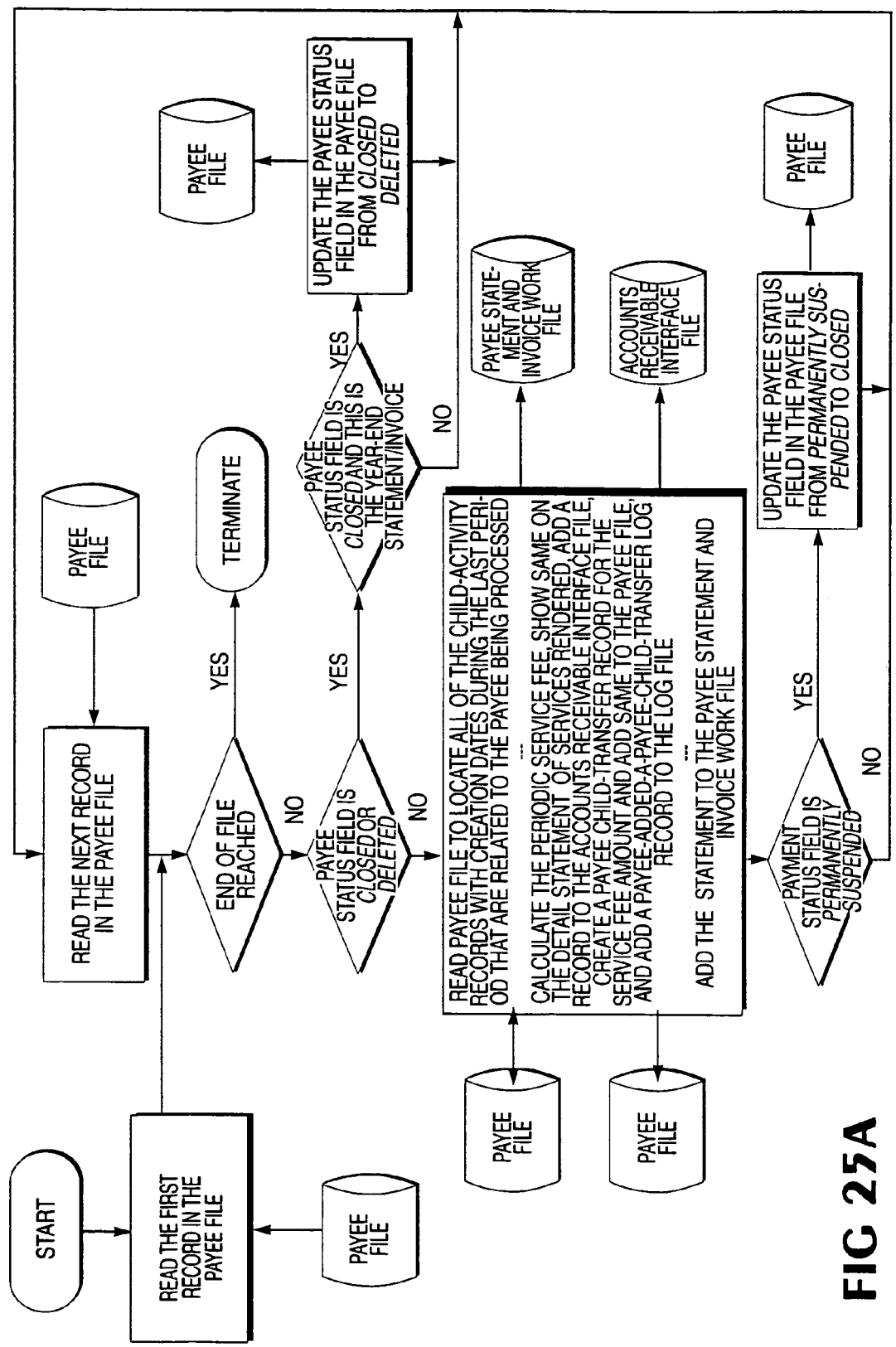
Figure 25B:
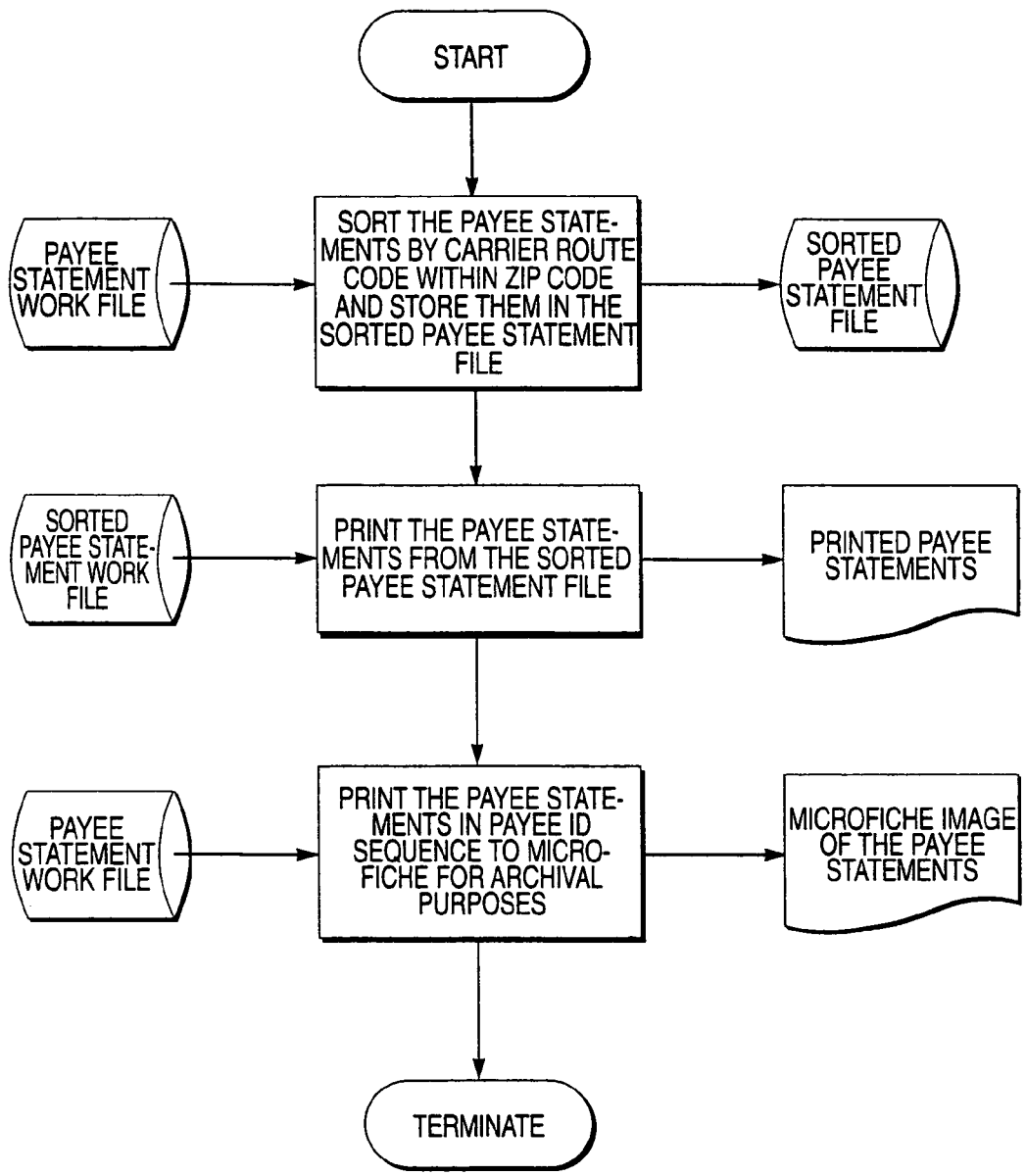

The fourth set of scheduled activities is Member Payee periodic statement/invoice processing, which is illustrated in more detail in FIGS. 25A and 25B. On a periodic basis a statement may be generated for each Member Payee, listing the invoice amount for services provided over the past period. Like Payor statements, Member Payee statements are generated for those Member Payees that have a status field value of Active, Temporarily Suspended, or Permanently Suspended. Whenever a Member Payee Record is closed, the system places a Permanently Suspended status on the Payee Record. After the statement is generated for each Member Payee with a Permanently Suspended status field value, the system updates the status field value to Closed. This mechanism is used to ensure that only one statement is generated for a Closed Payee Record. In addition, periodically all those Payee Records that have a Closed status field value are updated by the system to a status field value of Deleted. This mechanism ensures that when the subsequent purge processing occurs only those Member Payees that have a Deleted status field value are removed from the system. FIGS. 25A and 25B similarly comprise steps and equipment interfaces which correspond to that described in FIGS. 23A and 23B. An accounts receivable file is preferably shown in FIG. 25A as a temporary work file in the off-line files 165 as a location for storing information for billing users of system 100 for service fees. For example, this information may be utilized for billing Member Payees for service fees and the like.

Periodic Record Purge

The fifth set of scheduled activities is periodic purge-records-with-deleted-status processing. This set is not illustrated in any figures due to the optional and relatively simple nature of the task. The task comprises a re-organization of the database structures such that all Payor Records and Payee Records that have a status field value of Deleted, including their related Child-Payee and Payor Child-Transfer records, are not written to the new re-organized database structure. In addition, any Child-Payee records that have a status field value of Deleted, regardless of the Payor status, are also not written to the new re-organized database structure.

The reader understands from the detailed discussion above, the inventive system and method for automatically paying recurring Bills specifically includes selective Payor payment and reversal controls which have heretofore been unavailable in automatic, or Negative, payment arrangements. The above-described apparatus and equipment interfaces preferably enable the automatic settling of Bills by Payors with a variety of Payees, wherein the system comprises a set of electronically accessible files for receiving and at least temporarily storing Payor Information from one or more Payors, which preferably includes the name, address, Payor BankID, Payor or BankAccountID, and preferences for Bill payment timing and statement cycle timing. Similarly, Payee Information for Payees is received and stored, including allowed Provisional Periods, and Payee name, address, Payee BankID and Payee BankAccountID.

The system also enables ongoing receipt of new and modified information, including possibly payor control messages, from Payors, as well as Bill Data from the Payees. The payor control messages may include data that corresponds to the Bill Data received from the Payees. The system continually collects both Payor Information and Payee Information, and, at least periodically, matches Bill Data received by the system with Payor related data to establish Bills to be paid and due dates therefore. The system automatically pays the established Bills of Payors in accordance with the corresponding due dates, other Bill Data and preferences of each such Payor. Payment of Bills on behalf of the Payor to participating Payees is automatic, or Negative, and requires no initiation from a Payor, and, in fact, is completed unless positive action is initiated by the Payor to stop or modify such payment.

Payors are able to implement additional control over otherwise automatic payments by modifying payment timing or amounts, placing particular Payor Child-Transfers on hold, and/or by reversing payments actually made by the system within an applicable Provisional Period established by that particular Payee. The present system further automatically provides statements to Payors and Payees concerning various Bills which are to be paid, payments and charges made, and Bills which have been held and/or reversed. As described above, the continual input of information from Payees and Payors can be received in an unscheduled manner, while processing of such information to update and maintain the system record and to process payments and payment reversals in accordance with payor control messages provided by such information is preferably completed in a predetermined periodic or batch mode manner. Settling of net payments between Payors and Payees is also preferably undertaken in a batch mode manner, whereby initiation of net payments to individual Payees may be accomplished in single periodic transactions.

As mentioned at various places above, while a particular equipment and apparatus preferred for implementation of the present invention has been set forth in detail herein, it is believed that the function and operation of these various elements may be achieved by a variety of alternative combinations and equipment arrangements by those skilled in the art. Having shown and described the preferred embodiments of the automatic bill paying system and method of the present invention, it is contemplated that further adaptations of the system and method of the present invention may be accomplished by appropriate modifications by one skilled in the art without departing from the scope of the present invention. Several of such potential modifications have been mentioned, and others will be apparent to those skilled in the art. For example, while the payment processing and maintenance portions of the method have been described as batch-mode oriented, it may become desirable and/or feasible in some applications to implement these steps in real time. Similarly, while it is preferred to provide the on-line processing in the form of a computer (e.g. computer 110 described above) which operates separately from the batch processor (e.g. central computer 170 described above), it is contemplated that these elements might be combined in the form of a multiple server system arrangement, or another functional unitary setup. Accordingly, the scope of the present invention should be considered in terms of the following claims, and is understood not to be limited to the details of structure and operation shown and described in the specification and drawings.

What is claimed is:

1. A bill paying method performed by a third party for a payee and payor, comprising the following steps performed by the third party
   storing payee information,
   storing payor information, the payor information identifying one or more payees authorized by the payor to receive transfers of funds from the payor, and including control parameters defining the manner in which transfers of funds are to be performed,
   communicating with the payee and receiving for use, bill data electronically delivered from said payee to the third party without payor intervention,
   generating one or more electronic funds transfer messages transferring funds for a payor and a payee using bill data received from the payee, the stored payee information for the payee, and/or the stored payor information for the payor, a date of transfer for at least one bill being determined absent payor intervention based on at least one of bill data for the bill, stored payor information and stored payee information, without regard to due dates of bills of other payees.

2. The method of claim 1 further comprising generating one or more electronic funds transfer messages in the absence of specific authorization from a payor.

3. The method of claim 1, wherein the stored control parameters for a payor identify a maximum amount to be transferred between a payor and each of the payees authorized by the payor to receive transfers of funds from the payor, and further comprising generating an electronic funds transfer message for a payor and payee only if the amount to be thereby transferred does not exceed the maximum amount identified for the payee in the stored control parameters of the payor.

4. The method of claim 1, wherein the stored control parameters for a payor identify a minimum interval of time between generation of electronic funds transfer messages, and further comprising generating an electronic funds transfer message for a payor and payee only if no other transfer of funds for the payor and payee occurred during the minimum interval of time identified for the payee in the stored control parameters of the payor.

5. The method of claim 1 wherein said bill data identifies a date by which funds are to be transferred from the payor to a payee in payment of a bill.

6. The method of claim 1 wherein said bill data identifies an amount of funds to be transferred from the payor to a payee in payment of a bill.

7. The method of claim 1 wherein said bill data identifies a payee originating a bill.

8. The method of claim 7 wherein a payee is identified by name.

9. The method of claim 7 wherein a payee is identified by an identifier.

10. The method of claim 1 wherein the stored payor information includes a financial institution account number that corresponds to a government account.

11. The method of claim 1 further comprising storing bill records corresponding to generated electronic funds transfer messages, and presenting stored bill records to a payor so that a payor may review an account of fund transfer activity.

12. The method of claim 11 further comprising receiving a reversal directive from a payor corresponding to a reverseable stored bill record, and responding to the reversal directive by generating one or more reverse electronic funds transfer message transferring funds from the payee identified in the reverseable bill record and to the payor identified in the reverseable bill record.

13. The method of claim 12 further comprising identifying a provisional period indicating a period of time during which the payor may cause a reverse transfer, and ignoring a reversal directive received from a payor outside of the provisional period.

14. The method of claim 1 further comprising receiving a payor control message from a payor identifying at least one of a payment amount and payment date for a payment to be made to an identified payee, and further comprising using the payment amount or payment date identified by the payor control message when generating an electronic funds transfer message transferring funds for the payor originating the payor control message and the payee identified in the payor control message.

15. The method of claim 1 further comprising receiving a payee control message from a payee, and modifying the payee information for the payee originating the payee control message in response to the content of the payee control message.

* * * * *